US00RE50103E

(19) United States
(12) Reissued Patent
Puggelli et al.

(10) Patent Number: US RE50,103 E
(45) Date of Reissued Patent: Aug. 27, 2024

(54) CIRCUITS FOR A HYBRID SWITCHED CAPACITOR CONVERTER

(71) Applicant: Lion Semiconductor Inc., Austin, TX (US)

(72) Inventors: Alberto Alessandro Angelo Puggelli, Cupertino, CA (US); Thomas Li, Mountain View, CA (US); Wonyoung Kim, Los Altos, CA (US); John Crossley, Oakland, CA (US); Hanh-Phuc Le, San Diego, CA (US)

(73) Assignee: Lion Semiconductor Inc., Austin, TX (US)

(21) Appl. No.: 17/578,331

(22) Filed: Jan. 18, 2022

Related U.S. Patent Documents

Reissue of:
(64) Patent No.: 10,541,603
Issued: Jan. 21, 2020
Appl. No.: 15/695,955
Filed: Sep. 5, 2017

U.S. Applications:
(63) Continuation-in-part of application No. 15/487,659, filed on Apr. 14, 2017, now Pat. No. 10,274,987.

(51) Int. Cl.
*H02M 3/07* (2006.01)
*H02M 1/00* (2007.01)
(Continued)

(52) U.S. Cl.
CPC ..... *H02M 3/07* (2013.01); *H02M 3/157* (2013.01); *H02M 3/158* (2013.01);
(Continued)

(58) Field of Classification Search
CPC ..... H02M 3/07; H02M 3/157; H02M 3/158; H02M 3/1588; H02M 3/335; H02M 5/32; H02M 1/0045; H02M 1/007
See application file for complete search history.

(56) References Cited

U.S. PATENT DOCUMENTS 5,642,267 A * 6/1997 Brkovic ..... G05F 1/613 323/224
7,271,505 B1 9/2007 Miettinen
(Continued)

FOREIGN PATENT DOCUMENTS

CN 101057386 A 10/2007
CN 101540548 A 9/2009
(Continued)

OTHER PUBLICATIONS

Examination Report dated Sep. 26, 2022 in EP Patent Application No. 18854933.1, pp. 1-8.
(Continued)

*Primary Examiner* — Kenneth Whittington
(74) *Attorney, Agent, or Firm* — Byrne Poh LLP

(57) ABSTRACT

Circuits comprising: an inductor having a first side connected to $V_{IN}$; a first switch having a first side connected to a second side of the inductor; a second switch having a first side connected to $V_{IN}$; a first capacitor having a first side connected to a second side of the second switch; a third switch having a first side connected to a second side of the first switch; a fourth switch having a first side connected to a second side of the third switch; a fifth switch having a first side connected to a second side of the first capacitor and to a second side of the fourth switch, and having a second side coupled to a voltage source; and a second capacitor having a first side connected to the first side of the fourth switch, and having a second side connected to the second side of the fifth switch.

31 Claims, 40 Drawing Sheets

State 0

(51) Int. Cl.

| | |
|---|---|
| ***H02M 3/157*** | (2006.01) |
| ***H02M 3/158*** | (2006.01) |
| ***H02M 3/335*** | (2006.01) |
| ***H02M 5/32*** | (2006.01) |

(52) U.S. Cl.

CPC ..... *H02M 3/1588* (2013.01); *H02M 3/335* (2013.01); *H02M 5/32* (2013.01); *H02M 1/0045* (2021.05); *H02M 1/007* (2021.05)

(56) References Cited

U.S. PATENT DOCUMENTS

| | | | | |
|---|---|---|---|---|
| 7,400,114 | B2 | 7/2008 | Anzawa et al. | |
| 7,531,987 | B2 | 5/2009 | Ohasi et al. | |
| 8,212,541 | B2 * | 7/2012 | Perreault | H02M 3/07 323/282 |
| 8,259,476 | B2 * | 9/2012 | Ben-Yaakov | H02M 3/07 363/60 |
| 8,693,224 | B1 | 4/2014 | Giuliano | |
| 8,817,501 | B1 | 8/2014 | Low et al. | |
| 9,143,032 | B2 | 9/2015 | Le et al. | |
| 9,203,299 | B2 * | 12/2015 | Low | H02M 3/073 |
| 9,966,852 | B1 * | 5/2018 | Chen | H02J 7/0052 |
| 10,050,515 | B1 * | 8/2018 | Chakraborty | H02M 1/32 |
| 10,110,130 | B2 | 10/2018 | Salem | |
| 2001/0026460 | A1 | 10/2001 | Ito et al. | |
| 2004/0263121 | A1 | 12/2004 | Thrap | |
| 2005/0140336 | A1 | 6/2005 | Anzawa et al. | |
| 2008/0007891 | A1 | 1/2008 | Doljack | |
| 2008/0203991 | A1 | 8/2008 | Williams | |
| 2009/0140706 | A1 * | 6/2009 | Taufik | H02M 3/1584 323/272 |
| 2011/0101938 | A1 * | 5/2011 | Ma | H02M 3/07 323/282 |
| 2011/0169474 | A1 | 7/2011 | Cuk | |
| 2011/0285369 | A1 * | 11/2011 | Cuk | H02M 3/158 323/282 |
| 2012/0069604 | A1 * | 3/2012 | Yagyu | H02M 1/34 363/20 |
| 2012/0187932 | A1 | 7/2012 | Singnurkar | |
| 2012/0195074 | A1 | 8/2012 | Lehn | |
| 2013/0229841 | A1 * | 9/2013 | Giuliano | H02M 3/158 363/60 |
| 2014/0043010 | A1 * | 2/2014 | Salem | H02M 3/1584 323/311 |
| 2014/0184189 | A1 | 7/2014 | Salem | |
| 2015/0022173 | A1 | 1/2015 | Le et al. | |
| 2015/0061613 | A1 | 3/2015 | Kondou | |
| 2015/0097538 | A1 * | 4/2015 | Le | H02M 3/158 323/271 |
| 2015/0171768 | A1 | 6/2015 | Perreault | |
| 2016/0036330 | A1 | 2/2016 | Strucken et al. | |
| 2016/0190921 | A1 | 6/2016 | Pavan et al. | |
| 2016/0285371 | A1 | 9/2016 | Fu | |
| 2016/0352219 | A1 | 12/2016 | Abdallah et al. | |
| 2017/0222538 | A1 * | 8/2017 | Jung | H02M 3/07 |
| 2017/0300078 | A1 | 10/2017 | Puggelli et al. | |
| 2017/0300079 | A1 * | 10/2017 | Pugelli | G05F 5/00 |
| 2018/0019667 | A1 * | 1/2018 | Salem | H02M 3/07 |
| 2018/0309372 | A1 * | 10/2018 | Leong | H02M 3/33546 |

FOREIGN PATENT DOCUMENTS

| | | | | |
|---|---|---|---|---|
| CN | 105229908 | A | 1/2016 | |
| CN | 105229909 | A | 1/2016 | |
| CN | 105556820 | A | 5/2016 | |
| CN | 105612470 | A | 5/2016 | |
| CN | 106664020 | A | 5/2017 | |
| CN | 107124101 | A | 9/2017 | |
| JP | 2014212654 | A | 11/2014 | |
| TW | I239437 | | 9/2005 | |
| TW | 200735007 | | 9/2007 | |
| TW | 201428444 | | 7/2014 | |
| TW | 201440403 | | 10/2014 | |
| WO | WO2015/066087 | * | 5/2015 | H02M 3/158 |
| WO | WO 2017/007991 | | 1/2017 | |

OTHER PUBLICATIONS

Examination Report dated Nov. 28, 2023 in EP Patent Application No. 22163341.5, pp. 1-4.

Examination Report dated Dec. 7, 2023 in EP Patent Application No. 18854933.1, pp. 1-4.

Extended European Search Report dated Apr. 19, 2021 in EP Application No. 18854933.1, pp. 1-10.

Extended European Search Report dated Jun. 28, 2022 in EP Patent Application No. 22163341.5, pp. 1-8.

International Preliminary Report on Patentability dated Mar. 19, 2020 in International Patent Application No. PCT/US2018/049491, pp. 1-6.

International Preliminary Report on Patentability dated Oct. 23, 2018 in International Patent Application No. PCT/US2017/027555, pp. 1-8.

International Search Report and Written Opinion dated Oct. 2, 2017 in International Patent Application No. PCT/US2017/027555, pp. 1-10.

International Search Report and Written Opinion dated Nov. 20, 2018 in International Patent Application No. PCT/US2018/049491, pp. 1-7.

Kim, W., et al., "A Fully Integrated 3-Level DC-DC Converter for Nonsecond-Scale DVFS", in IEEE Journal of Solid-State Circuits, vol. 47, No. 1, Jan. 2012, pp. 206-219.

Kim, W., et al., "System Level Analysis of Fast, Per-Core DVFS Using On-Chip Switching Regulators", in IEEE International Symposium of High-Performance Computer Architecture (HPCA), Feb. 2008, pp. 1-12.

Le, H.P., et al., "Design Techniques for Fully Integrated Switched-Capacitor DC-DC Converters", in IEEE Journal of Solid-State Circuits, vol. 46, No. 9, Sep. 2011, pp. 2120-2131.

Notice of Allowance dated Jan. 17, 2019 in U.S. Appl. No. 15/487,682, pp. 1-19.

Notice of Allowance dated Feb. 27, 2019 in U.S. Appl. No. 15/487,659, pp. 1-20.

Notice of Allowance dated Mar. 11, 2020 in U.S. Appl. No. 16/410,917, pp. 1-18.

Notice of Allowance dated Apr. 29, 2020 in KR Patent Application No. 10-2020-7009539, pp. 1-6.

Notice of Allowance dated Jun. 8, 2022 in KR Patent Application No. 10-2018-7033009, pp. 1-6.

Notice of Allowance dated Jul. 6, 2021 in CN Patent Application No. 201880070698.0, pp. 1-4.

Notice of Allowance dated Aug. 16, 2018 in U.S. Appl. No. 15/487,682, pp. 1-20.

Notice of Allowance dated Sep. 12, 2019 in U.S. Appl. No. 15/695,955, pp. 1-28.

Office Action dated Jan. 16, 2020 in EP Patent Application No. 17734522.0, pp. 1-4.

Office Action dated Mar. 9, 2021 in CN Patent Application No. 201780037808.9, pp. 1-8.

Office Action dated May 15, 2020 in CN Patent Application No. 201780037808.9, pp. 1-14.

Office Action dated Jul. 31, 2020 in TW Patent Application No. 106112890, pp. 1-15.

Office Action dated Aug. 10, 2018 in U.S. Appl. No. 15/487,659, pp. 1-16.

Office Action dated Sep. 27, 2023 in CN Patent Application No. 202111108802.0, pp. 1-19.

Office Action dated Sep. 28, 2023 in CN Patent Application No. 202110891693.8, pp. 1-17.

Office Action dated Oct. 14, 2021 in KR Patent Application No. 10-2018-7033009, pp. 1-8.

Office Action dated Nov. 2, 2020 in EP Patent Application No. 17734522.0, pp. 1-5.

Office Action dated Nov. 4, 2019 in U.S. Appl. No. 16/410,917, pp. 1-21.

(56) References Cited

OTHER PUBLICATIONS

Office Action dated Nov. 21, 2022 in TW Patent Application No. 110141094, pp. 1-10.
Office Action dated Dec. 19, 2018 in EP Patent Application No. 17734522.0, pp. 1-3.
Uno, M., et al., "Multi-Port Converter Integrating Boost and Switched Capacitor Converters for Single Cell Battery Power System in Small Satellite", In IEEE ECCE Asia DownUnder, Jun. 3, 2013, pp. 747-752.
Notice of Allowance dated Jan. 17, 2019 in U.S. Appl. No. 15/487,682.
International Search Report and Written Opinion dated Feb. 10, 2017 in International Patent Application No. PCT/US2017/027555.

* cited by examiner

FIG. 3B
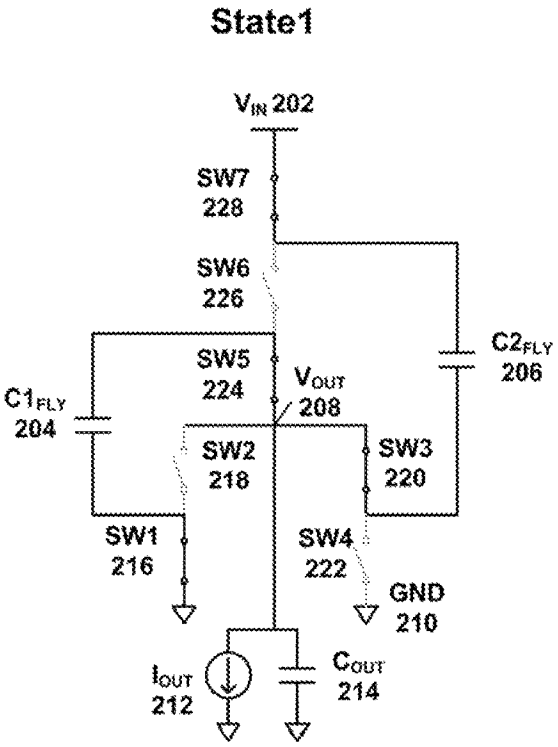
FIG. 3A
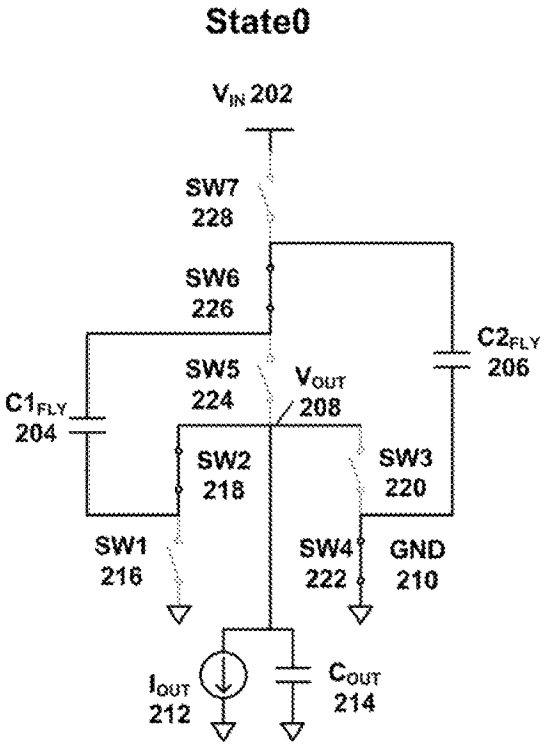
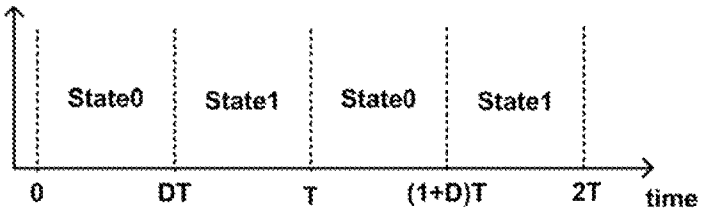
FIG. 3C

FIG. 5B
State1
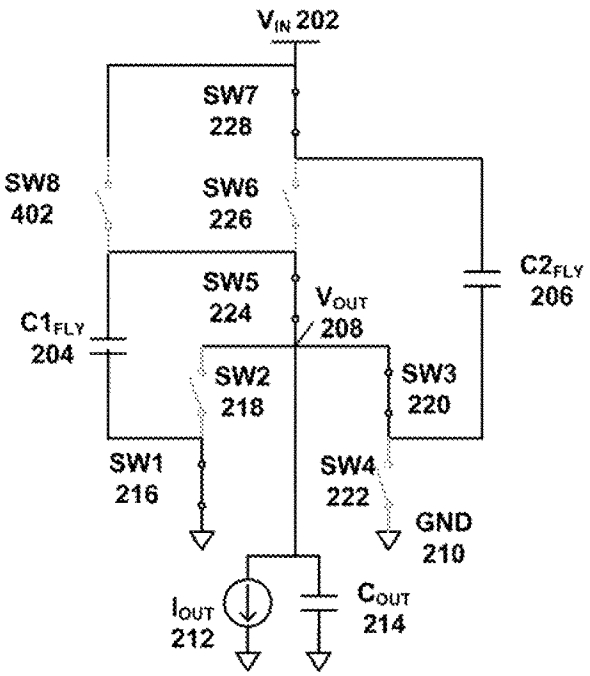
FIG. 5A
State0
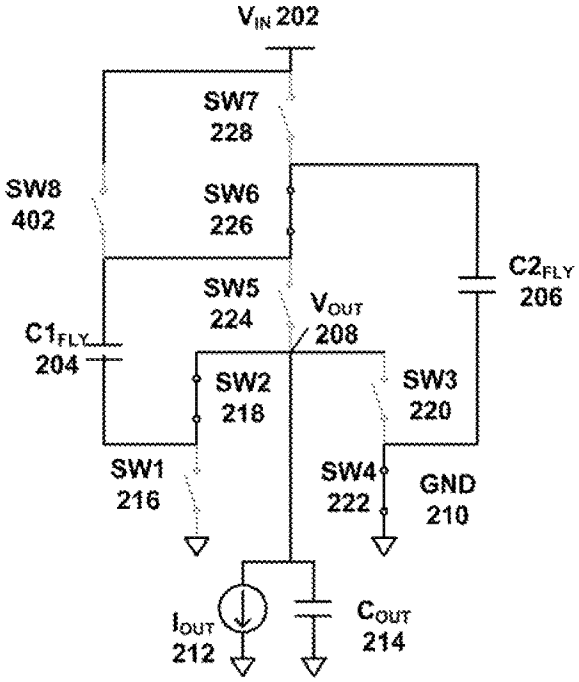
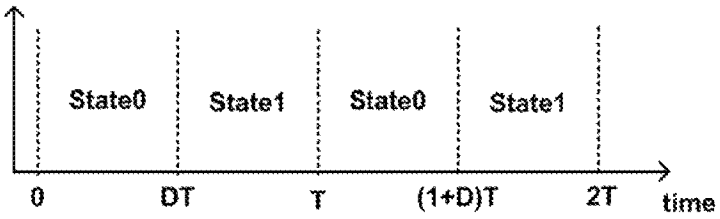
FIG. 5C

FIG. 6B
State1
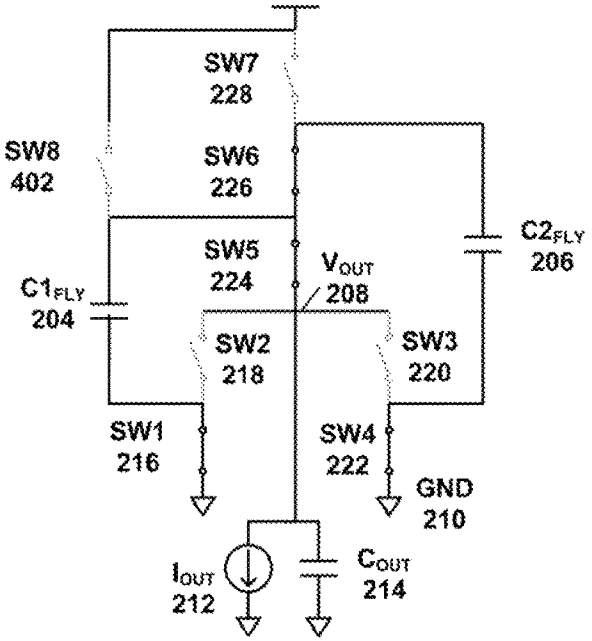
FIG. 6A
State0
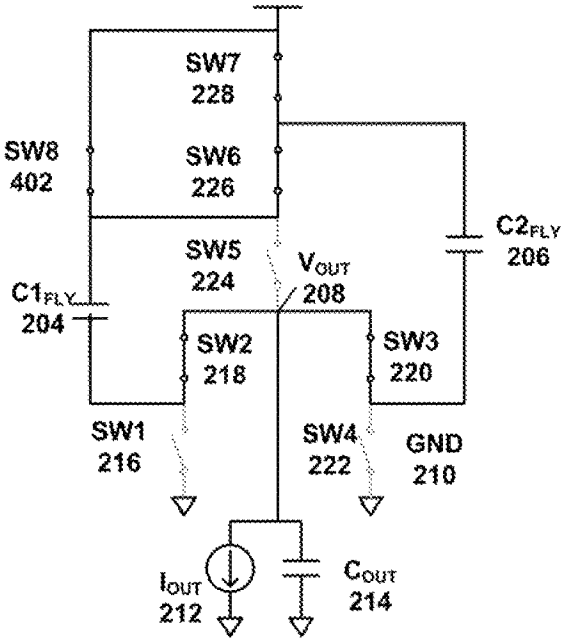
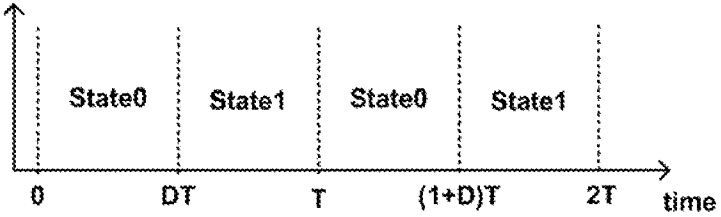
FIG. 6C

FIG. 7A
State0
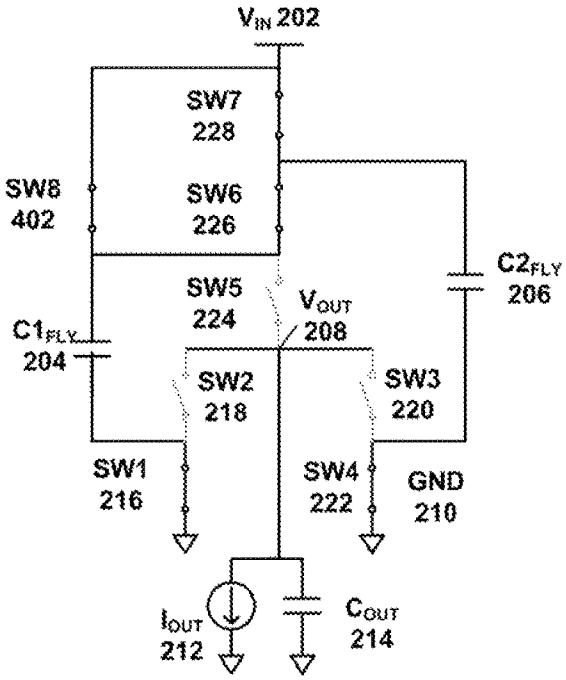
FIG. 7B
State1
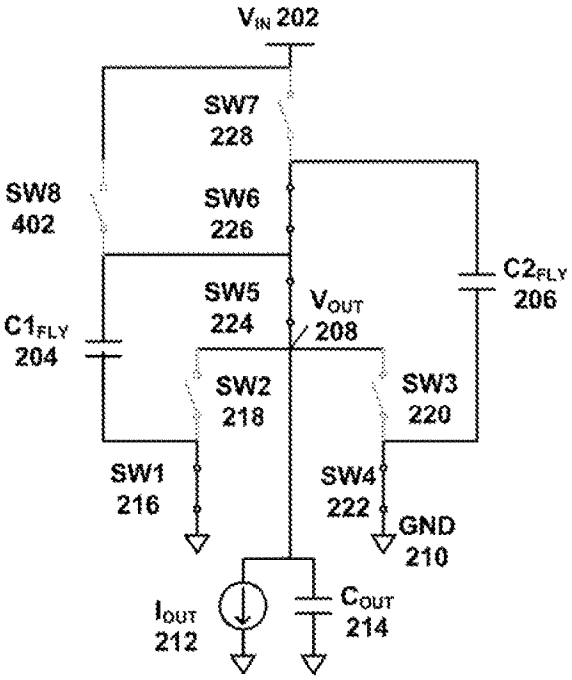
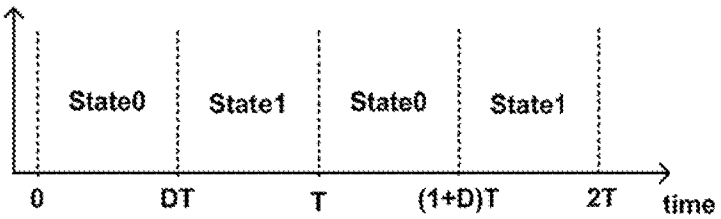
FIG. 7C

State0

State1

$V_{IN}$ 202
SW9 804
SW7 228
SW6 226
SW5 224
SW2 218
SW1 216
SW3 220
SW4 222
$C1_{FLY}$ 204
$C2_{FLY}$ 206
$C3_{FLY}$ 802
$V_{OUT}$ 208
GND 210
$I_{OUT}$ 212
$C_{OUT}$ 214
State0
State1
State0
State1
0
DT
T
(1+D)T
2T
time State1

State0

State1

State0

FIG. 17B
State1
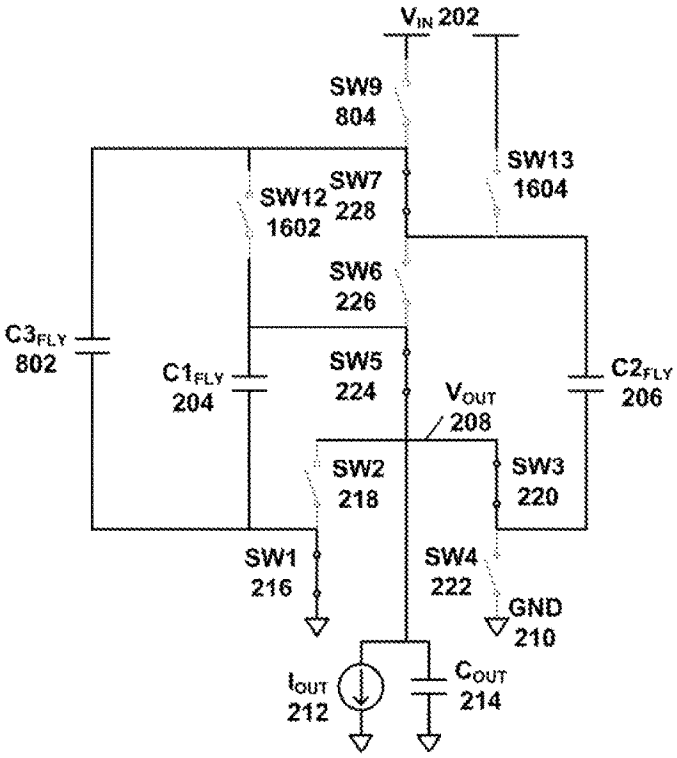
FIG. 17A
State0
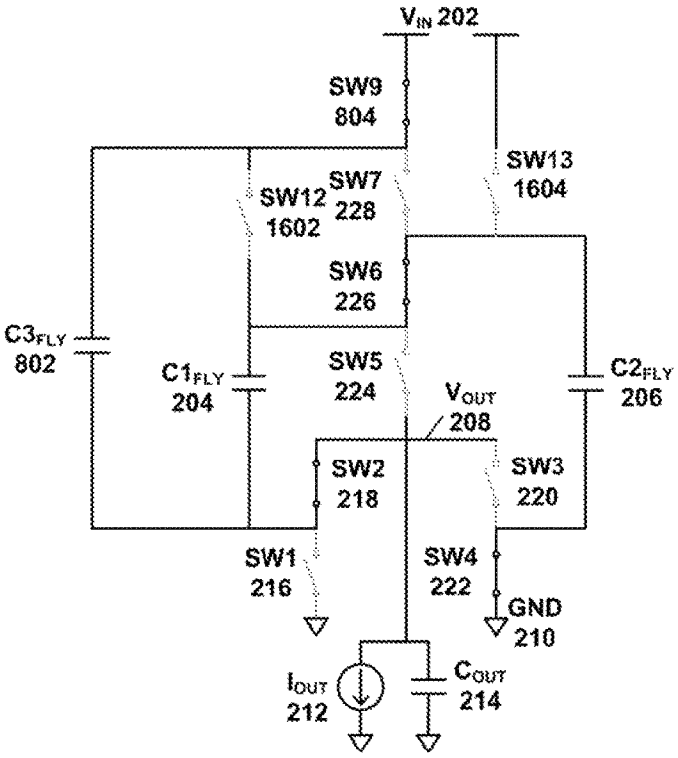
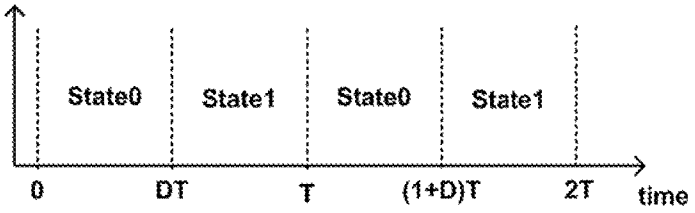
FIG. 17C

FIG. 18B
State1
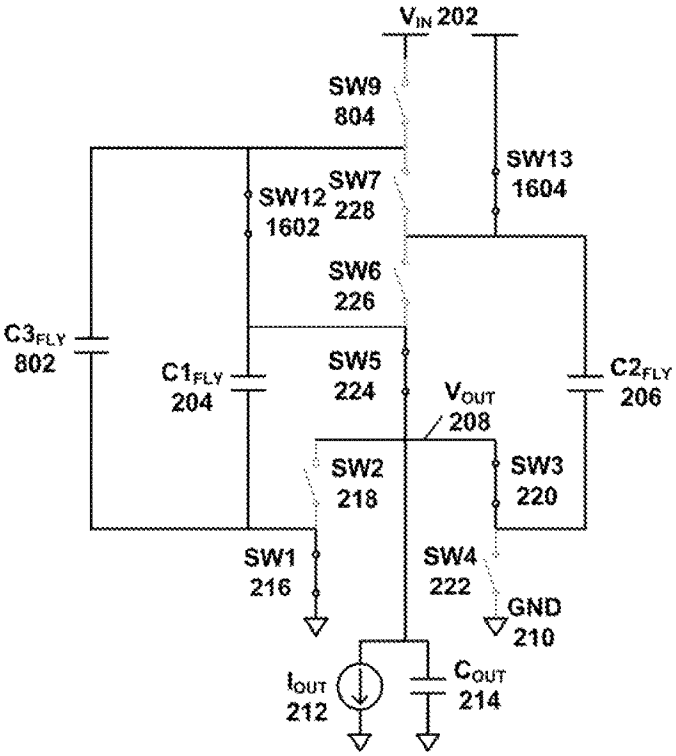
FIG. 18A
State0
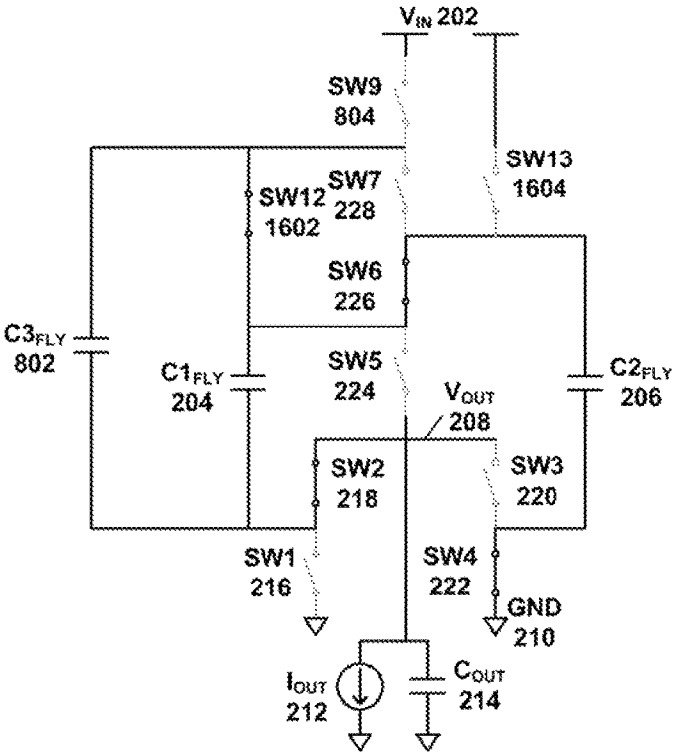
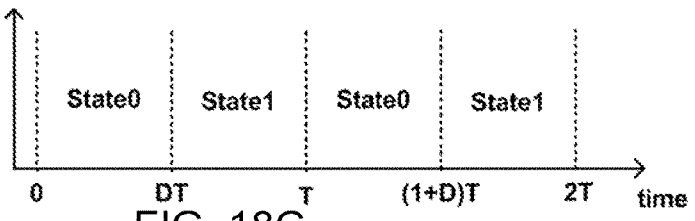
FIG. 18C

FIG. 19B
State1
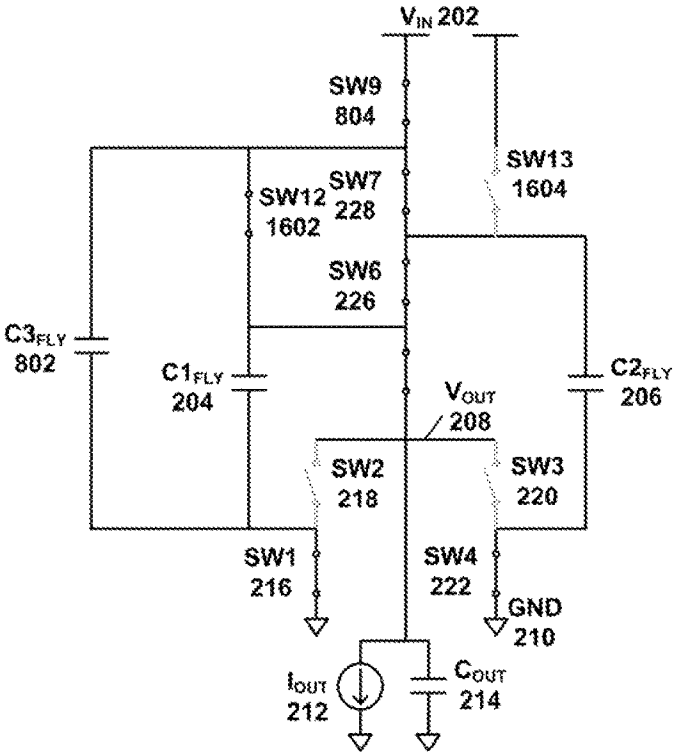
FIG. 19A
State0
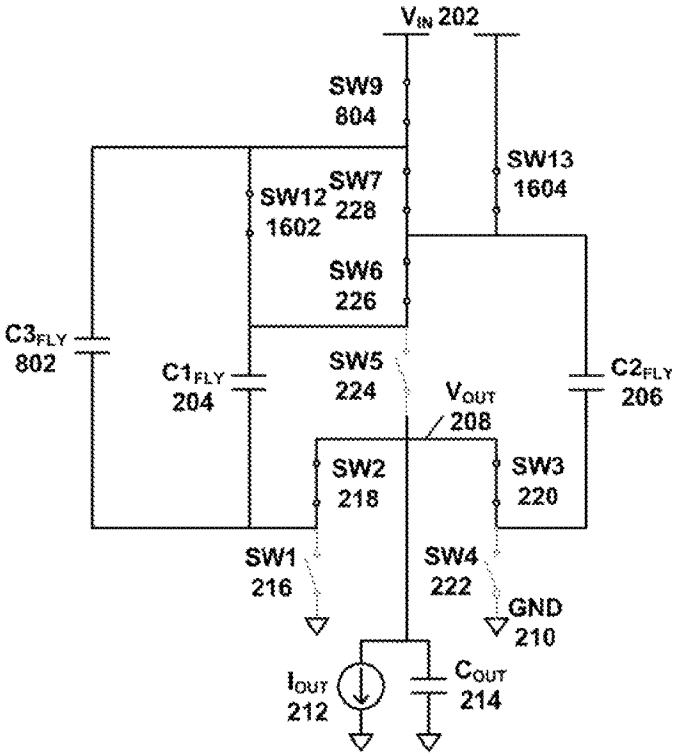
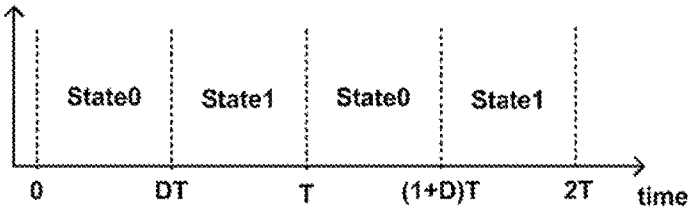
FIG. 19C

State1

State0

FIG. 36A
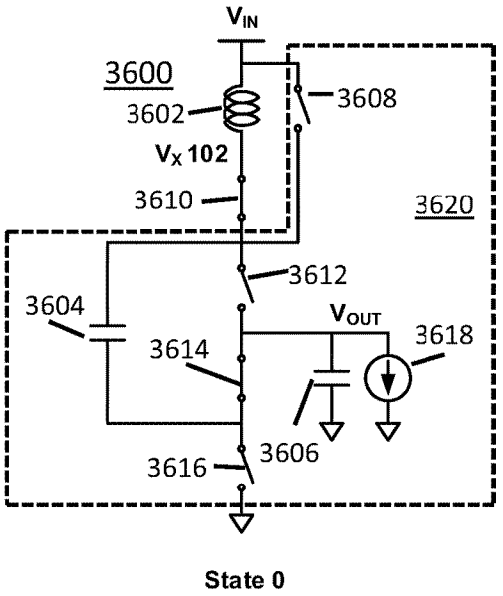
FIG. 36B
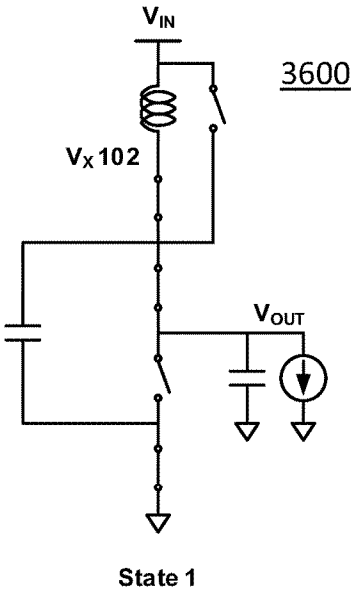
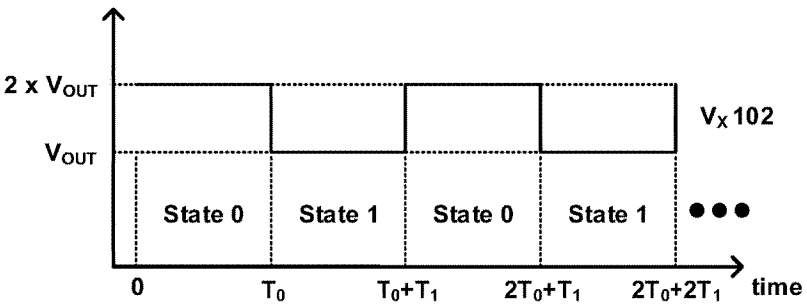
FIG. 36C

FIG. 37A
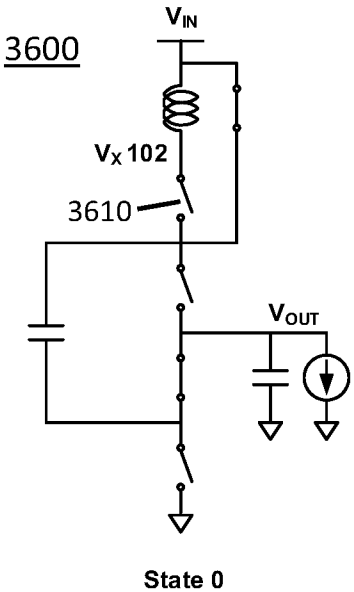
FIG. 37B
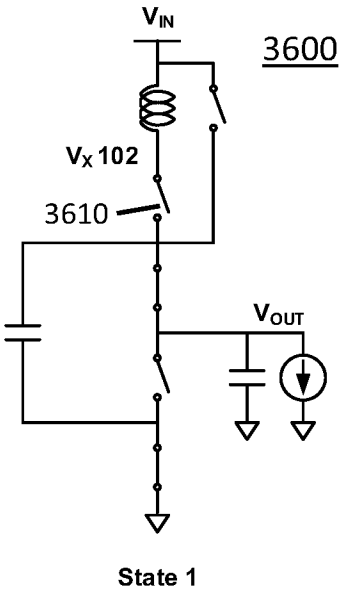
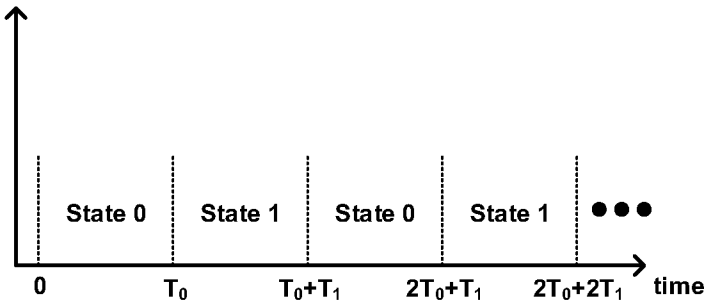
FIG. 37C

State 1

State 0

FIG. 39D
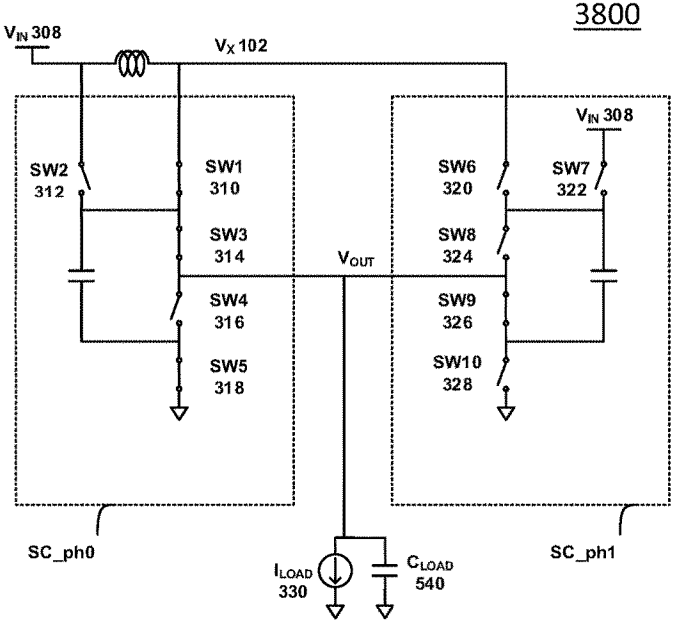
FIG. 39C
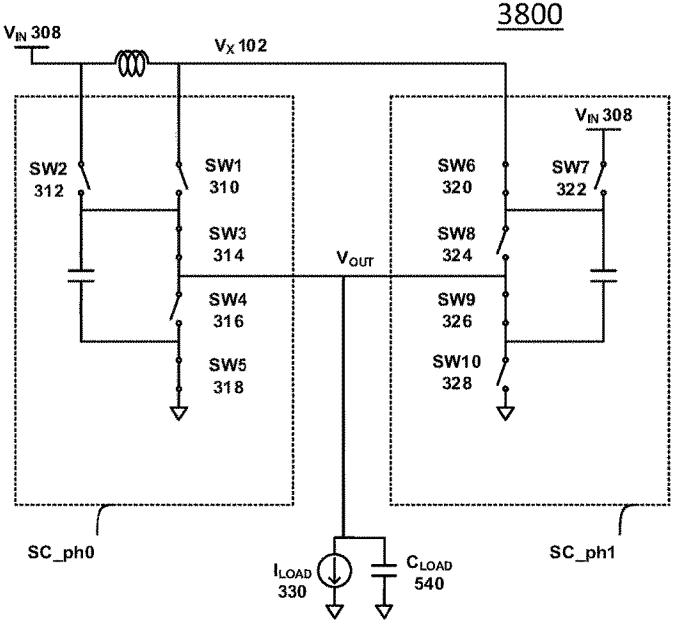
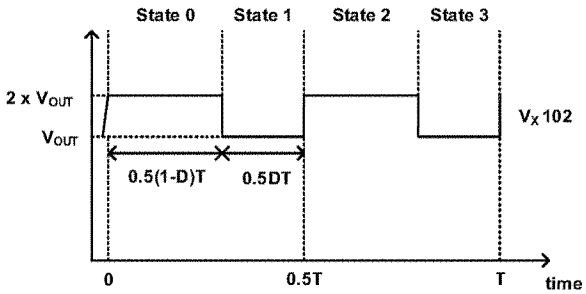
FIG. 39E

CIRCUITS FOR A HYBRID SWITCHED CAPACITOR CONVERTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation-in-part of U.S. patent application Ser. No. 15/487,659, filed Apr. 14, 2017, which claims benefit of U.S. Provisional Application No. 62/324,091, filed Apr. 18, 2016, each of which is hereby incorporated by reference herein in its entirety.

TECHNICAL FIELD

The present disclosure relates to apparatuses, systems, and methods for providing a reconfigurable Dickson Star switched capacitor voltage regulator and/or providing a hybrid (e.g., two-stage) voltage regulator.

BACKGROUND

There is a strong demand to reduce the size of electronic systems. The size reduction is especially desirable in mobile electronics where space is a premium, but is also desirable in servers that are placed in big data centers since it is important to squeeze as many servers as possible into a fixed-size real estate.

Some of the largest components in electronic systems are voltage regulators (also referred to as power regulators). Voltage regulators often include a large number of bulky off-chip components and are used to deliver voltages to circuits such as integrated chips, including processors, memory devices (e.g., a dynamic read access memory (DRAM)), radio-frequency (RF) chips, WiFi combo chips, and power amplifiers.

To efficiently deliver power, a voltage regulator can use a "buck" topology. Such a regulator is referred to as a buck regulator. A buck regulator transfers charge from a power source to an output load using an inductor. A buck regulator can use power switches to connect/disconnect the inductor to/from different voltages (each at a different point in time), thereby providing an output voltage that is a weighted average of the different voltages. A buck regulator can adjust the output voltage by controlling the amount of time the inductor is coupled to the different voltages.

Unfortunately, a buck regulator is not well suitable for highly integrated electronic systems. The conversion efficiency of a buck regulator depends on the size of the inductor, in particular when the power conversion ratio is high and when the amount of current consumed by the output load is high. Because an inductor can occupy a large area and is bulky to integrate on-die or on-package, existing buck regulators often use a large number of off-chip inductor components. This strategy often requires a large area on the printed circuit board, which in turn increases the size of the electronic device. The challenge is exacerbated as mobile system-on-chips (SoCs) become more complex and need increasingly larger number of voltage domains to be delivered by the voltage regulator.

Accordingly, new voltage regulator circuits are desirable.

SUMMARY

Circuits for a hybrid switched capacitor converter are provided. In some embodiments, circuits are provided, the circuits comprising: an inductor having a first side and a second side, wherein the first side is connected to an input voltage; a first switch having a first side and a second side, wherein the first side is connected to the second side of the inductor; a second switch having a first side and a second side, wherein the first side is connected to the input voltage; a first capacitor having a first side and a second side, wherein the first side is connected to the second side of the second switch; a third switch having a first side and a second side, wherein the first side is connected to the second side of the first switch; a fourth switch having a first side and a second side, wherein the first side is connected to the second side of the third switch; a fifth switch having a first side and a second side, wherein the first side is connected to the second side of the first capacitor and to the second side of the fourth switch, and wherein the second side is coupled to a voltage source; a second capacitor having a first side and a second side, wherein the first side is connected to the first side of the fourth switch, and wherein the second side is connected to the second side of the fifth switch.

In some of these embodiments, at least one of the first switch, the second switch, the third switch, the fourth switch, and the fifth switch is a transistor.

In some of these embodiments, at least one of the first switch, the second switch, the third switch, the fourth switch, and the fifth switch is a MOSFET.

In some of these embodiments, at least one of the first switch, the second switch, the third switch, the fourth switch, and the fifth switch is a transistor, and the at least one of the first switch, the second switch, the third switch, the fourth switch, and the fifth switch is controlled by a controller.

In some of these embodiments, when the circuit is in a first state: the first switch is closed; the second switch is open; the third switch is open; the fourth switch is closed; and the fifth switch is open; and when the circuit is in a second state: the first switch is closed; the second switch is open; the third switch is closed; the fourth switch is open; and the fifth switch is closed.

In some of these embodiments, when the circuit is in a first state: the first switch is closed; the second switch is open; the third switch is open; the fourth switch is closed; and the fifth switch is open; when the circuit is in a second state: the first switch is closed; the second switch is open; the third switch is closed; the fourth switch is open; and the fifth switch is closed; when the circuit is in a third state: the first switch is open; the second switch is closed; the third switch is open; the fourth switch is closed; and the fifth switch is open; and when the circuit is in a fourth state: the first switch is open; the second switch is open; the third switch is closed; the fourth switch is open; and the fifth switch is closed.

In some of these embodiments, the circuits further comprise: a sixth switch having a first side and a second side, wherein the first side is connected to the second side of the inductor; a seventh switch having a first side and a second side, wherein the first side is connected to the input voltage; a third capacitor having a first side and a second side, wherein the first side is connected to the second side of the seventh switch; a eighth switch having a first side and a second side, wherein the first side is connected to the second side of the sixth switch; a ninth switch having a first side and a second side, wherein the first side is connected to the second side of the eighth switch; a tenth switch having a first side and a second side, wherein the first side is connected to the second side of the third capacitor and to the second side of the ninth, and wherein the second side is coupled to the voltage source.

In some of these embodiments, the circuits further comprise: a sixth switch having a first side and a second side, wherein the first side is connected to the second side of the inductor; a seventh switch having a first side and a second side, wherein the first side is connected to the input voltage; a third capacitor having a first side and a second side, wherein the first side is connected to the second side of the seventh switch; a eighth switch having a first side and a second side, wherein the first side is connected to the second side of the sixth switch; a ninth switch having a first side and a second side, wherein the first side is connected to the second side of the eighth switch; a tenth switch having a first side and a second side, wherein the first side is connected to the second side of the third capacitor and to the second side of the ninth, and wherein the second side is coupled to the voltage source, wherein, when the circuit is in a first state: the first switch is open; the second switch is closed; the third switch is open; the fourth switch is closed; the fifth switch is open; the sixth switch is open; the seventh switch is open; the eighth switch is closed; the ninth switch is open; and the tenth switch is closed; and when the circuit is in a second state: the first switch is open; the second switch is open; the third switch is closed; the fourth switch is open; the fifth switch is closed; the sixth switch is open; the seventh switch is closed; the eighth switch is open; the ninth switch is closed; and the tenth switch is open.

In some of these embodiments, the circuits further comprise: a sixth switch having a first side and a second side, wherein the first side is connected to the second side of the inductor; a seventh switch having a first side and a second side, wherein the first side is connected to the input voltage; a third capacitor having a first side and a second side, wherein the first side is connected to the second side of the seventh switch; a eighth switch having a first side and a second side, wherein the first side is connected to the second side of the sixth switch; a ninth switch having a first side and a second side, wherein the first side is connected to the second side of the eighth switch; a tenth switch having a first side and a second side, wherein the first side is connected to the second side of the third capacitor and to the second side of the ninth, and wherein the second side is coupled to the voltage source, wherein, when the circuit is in a first state: the first switch is open; the second switch is closed; the third switch is open; the fourth switch is closed; the fifth switch is open; the sixth switch is open; the seventh switch is open; the eighth switch is closed; the ninth switch is open; and the tenth switch is closed; when the circuit is in a second state: the first switch is open; the second switch is open; the third switch is closed; the fourth switch is open; the fifth switch is closed; the sixth switch is open; the seventh switch is closed; the eighth switch is open; the ninth switch is closed; and the tenth switch is open; when the circuit is in a third state: the first switch is closed; the second switch is open; the third switch is open; the fourth switch is closed; the fifth switch is open; the sixth switch is open; the seventh switch is open; the eighth switch is closed; the ninth switch is open; and the tenth switch is closed; when the circuit is in a fourth state: the first switch is open; the second switch is open; the third switch is open; the fourth switch is closed; the fifth switch is open; the sixth switch is closed; the seventh switch is open; the eighth switch is closed; the ninth switch is open; and the tenth switch is closed; when the circuit is in a fifth state: the first switch is open; the second switch is open; the third switch is closed; the fourth switch is open; the fifth switch is closed; the sixth switch is closed; the seventh switch is open; the eighth switch is open; the ninth switch is closed; and the tenth switch is open; and when the circuit is in a sixth state: the first switch is closed; the second switch is open; the third switch is closed; the fourth switch is open; the fifth switch is closed; the sixth switch is open; the seventh switch is open; the eighth switch is open; the ninth switch is closed; and the tenth switch is open.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A-3C illustrate an example of the operation of a 3:1 step-down Dickson Star SC regulator as known in the prior art.

FIGS. 5A-5C illustrate an example of the operation of the reconfigurable regulator in FIG. 4 for a conversion ratio of 3:1 in accordance with some embodiments.

FIGS. 6A-6C illustrate an example of the operation of the reconfigurable regulator in FIG. 4 for a conversion ratio of 2:1 in accordance with some embodiments.

FIGS. 7A-7C illustrate an example of the operation of the reconfigurable regulator in FIG. 4 for a conversion ratio of 1:1 in accordance with some embodiments.

FIGS. 17A-17C illustrate an example of the operation of a 4:1 reconfigurable Dickson Star SC regulator in a 4:1 conversion mode in accordance with some embodiments.

FIGS. 18A-18C illustrate an example of the operation of a 4:1 reconfigurable Dickson Star SC regulator in a 3:1 conversion mode in accordance with some embodiments.

FIGS. 19A-19C illustrate an example of the operation of a 4:1 reconfigurable Dickson Star SC regulator in a 2:1 conversion mode in accordance with some embodiments.

FIGS. 36A-36C illustrate an example of a hybrid converter (including an inductor and a 2:1 switch capacitor regulator) and its operation, when in a H21 mode, in accordance with some embodiments.

FIGS. 37A-37C illustrate an example of a hybrid converter (including an inductor and a 2:1 switch capacitor regulator) and its operation, when in a 2:1 SC mode, in accordance with some embodiments.

FIGS. 39A-39E illustrate an example of a multi-phase hybrid converter (including an inductor and a 2:1 switch capacitor regulator) and its operation, when in a H21 mode, in accordance with some embodiments.

DETAILED DESCRIPTION

Figure 1A:
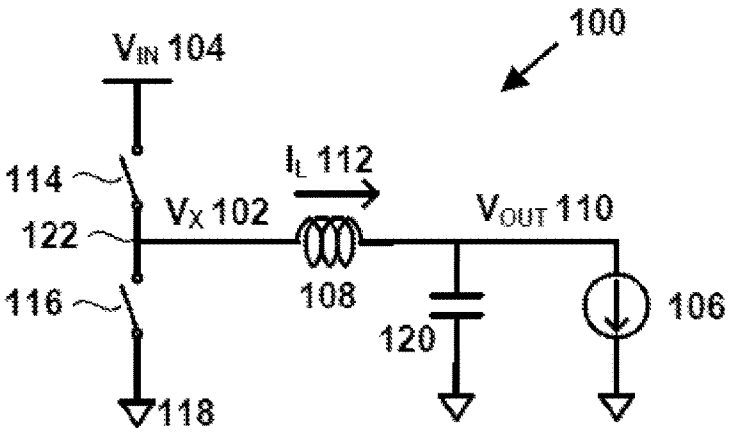
FIGS. 1A-1B illustrate an example of a buck regulator and its operation as known in the prior art.

In the following description, numerous specific details are set forth regarding the apparatuses, systems, and methods of the disclosed subject matter and the environment in which such apparatuses, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are for purposes of illustration, and that it is contemplated that there are other apparatuses, systems, and methods that are within the scope of the disclosed subject matter.

Modern electronic systems have been tightly integrated as a system-on-chip (SoC) that incorporates multiple processing cores and heterogeneous components (e.g., memory controllers, hardware accelerators) within a single chip. The popularity of SoCs, coupled with tighter power budgets, motivates controlling the voltage and frequency at a block-specific granularity. The block-specific voltage control can allow the electronic system to raise only the voltage of the core(s) that desires higher performance. Such a block-specific voltage control can improve power and/or performance.

However, traditional approaches of dynamic voltage and frequency scaling (DVFS) have been performed at a coarse-grain level due to cost and size limitations of off-chip voltage regulators. Moreover, traditional DVFS schemes were limited to a slow voltage/frequency scaling at the micro-second timescale due to the slow speed of off-chip voltage regulators. Faster DVFS in nano-second timescale can save significantly more power consumed by the SoC by closely tracking the SoC voltage to the rapidly changing computation demand.

Given these drawbacks of off-chip voltage regulators, there has been a surge of interest in building integrated voltage regulators (IVR) to reduce board size and enable nanosecond timescale, per-core DVFS. An IVR can include a variety of voltage regulators, including a switching regulator and a low-dropout linear regulator. IVRs that can reduce the board size and can enable nanosecond timescale, per-core DVFS are disclosed in articles authored by inventors of the present application, including an article entitled "System Level Analysis of Fast, Per-Core DVFS using On-Chip Switching Regulators," published in IEEE International Symposium on High-Performance Computer Architecture (HPCA) in February 2008, by Wonyoung Kim et al.; an article entitled "Design Techniques for Fully Integrated Switched-Capacitor DC-DC Converters," published in IEEE Journal of Solid-State Circuits (JSSC) in September 2011, by Hanh-Phuc Le et al.; and an article entitled "A Fully-Integrated 3-Level DC/DC Converter for Nanosecond-Scale DVFS," published in IEEE Journal of Solid-State Circuits (JSSC) in January 2012, by Wonyoung Kim et al., each of which is hereby incorporated herein by reference in its entirety.

Figure 1B:
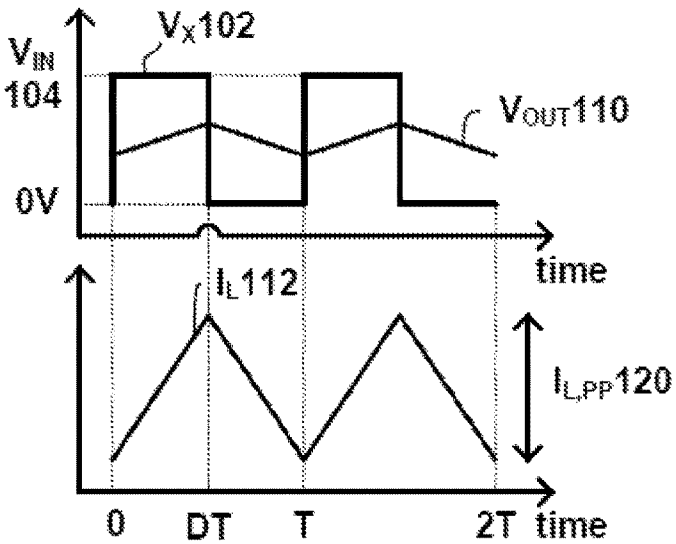

An example of a switching regulator is a buck regulator. FIGS. 1A-1B illustrate examples of a buck regulator and its operation as known in the prior art. As illustrated in FIG. 1A, a buck regulator 100 can include an inductor 108 and two switches 114, 116. Buck regulator 100 can connect inductor 108 to a first voltage source $V_{IN}$ 104 and a second voltage source 118 through a set of power switches 114, 116. In some cases, second voltage source 118 can be a ground voltage source. Power switches 114, 116 can be turned on and off using external controls. In some cases, power switches 114, 116, can be controlled so that the two switches are not turned on at the same time.

Power switches 114, 116 can be formed from any suitable transistors in some embodiments. For example, the transistors can be implemented using MOSFET transistors. More particularly, for example, switch 114 can be implemented using a P-channel MOSFET transistor, and switch 116 can be implemented using an N-channel MOSFET transistor in some embodiments.

As illustrated in FIG. 1B, as power switches 114, 116 turn on and off with a period T, the input of inductor $V_X$ 102 can swing between 0 and $V_{IN}$ with a period T. Inductor 108 and capacitor 120 operate as a low-pass filter that averages $V_X$ 102 over time, thereby creating a signal at regulator output $V_{OUT}$ 110 with a small voltage ripple. Output voltage $V_{OUT}$ 110 can depend on the amount of time that inductor 108 is coupled to first voltage source $V_{IN}$ 104 and the amount of time that inductor 108 is coupled to second voltage source 118 (which for purposes of illustration is 0V). For example, buck regulator 100 can adjust the level of $V_{OUT}$ 510 to $V_{IN}D+(0V)(1-D)$, where D, a number between 0 and 1, is the portion of time $V_X$ is coupled to $V_{IN}$. D is also referred to as the duty cycle of $V_X$ 102. The output load that consumes current 106 can be any type of an electronic device, including a processor, memory (DRAM, NAND flash), an RF chip, a WiFi combo chip, a power amplifier, etc.

The efficiency of buck regulator 100 can be computed as:

$$\eta = \frac{P_L}{P_O}$$

where $P_L$ indicates the power delivered to the output load and $P_O$ indicates the output power of buck regulator 108. $P_L$ can be computed as follows: $P_L=P_O-P_{LOSS}$, where $P_{LOSS}$ includes the amount of power losses during the voltage regulation process.

One of the major power losses $P_{Loss}$ associated with buck regulator 100 includes a resistive loss $P_R$ incurred by the parasitic resistance of inductor 108. When buck regulator 100 delivers power to the output load by providing current 112, ideally, buck regulator 100 provides all of its output power to output load 106. However, in a practical scenario, buck regulator 100 dissipates some of its output power internally at inductor 108. Ideally, an inductor has zero resistance. Therefore, a current through inductor 108 would not dissipate any power. However, in a practical scenario, an inductor is associated with a finite resistance, primarily due to the resistance of the material forming the inductor. This undesirable, finite resistance of an inductor is referred to as a parasitic resistance. The parasitic resistance can incur a resistive power loss since the parasitic resistance can cause the current through an inductor to dissipate energy. Therefore, the resistive power loss can reduce the power conversion efficiency of buck regulator 100.

When the current is alternating, then the resistive power loss can be computed as $P_R=I_{L,RMS}^2R_L$, where $R_L$ is the value of the parasitic resistance of inductor 108, and $I_{L,RMS}$ is the root-mean square of the current through inductor 108. $I_{L,RMS}$ can be reduced by reducing the peak-to-peak ripple of the inductor current ($I_{L,PP}$ 120). Therefore, buck regulator 100 can reduce the resistive loss $P_R$ by reducing the peak-to-peak ripple of inductor current $I_{L,PP}$ 120.

There are two ways to reduce the peak-to-peak ripple of inductor current $I_{L,PP}$ 120. First, buck regulator 100 can switch at a high frequency and reduce the period of the switching regulator T. However, this solution can increase the power consumed to charge and discharge the parasitic capacitance at junction 122 between switches 114, 116. This capacitive power loss can be significant because the size of switches 114, 116 can be large, which increases the parasitic capacitance, and because the voltage swing on $V_X$ 102 is large. This capacitive power loss can be computed as follows: $P_C=fCV^2$, where C is the amount of parasitic capacitance at junction 122, f is the frequency at which buck regulator 100 switches, and V is the voltage swing at junction 122. This power loss can be significant because the size of switches 114, 116 is large, which increases the parasitic capacitance, and because the voltage swing on $V_X$ 102 is large.

Second, buck regulator 100 can use an inductor 108 with a high inductance value, thereby reducing the parasitic resistance $R_L$. However, this approach makes inductor 108 large, which makes integration difficult.

Another example of a switching regulator is a switched-capacitor (SC) regulator. An SC regulator can use one or more capacitors, instead of an inductor, to transfer charge from a power source to an output load. An SC regulator can use power switches to connect/disconnect one or more capacitors to/from different voltages (each different voltage being connected at a different point in time), thereby providing an output voltage that is a weighted average of the different voltages. The SC regulator can control the output voltage by changing the configuration, the sequence, and the duty cycle with which capacitors are coupled to one another. Because capacitors are easier to integrate on-die or on-package than inductors, it is easier to implement SC IVRs with a small size.

Figure 2:
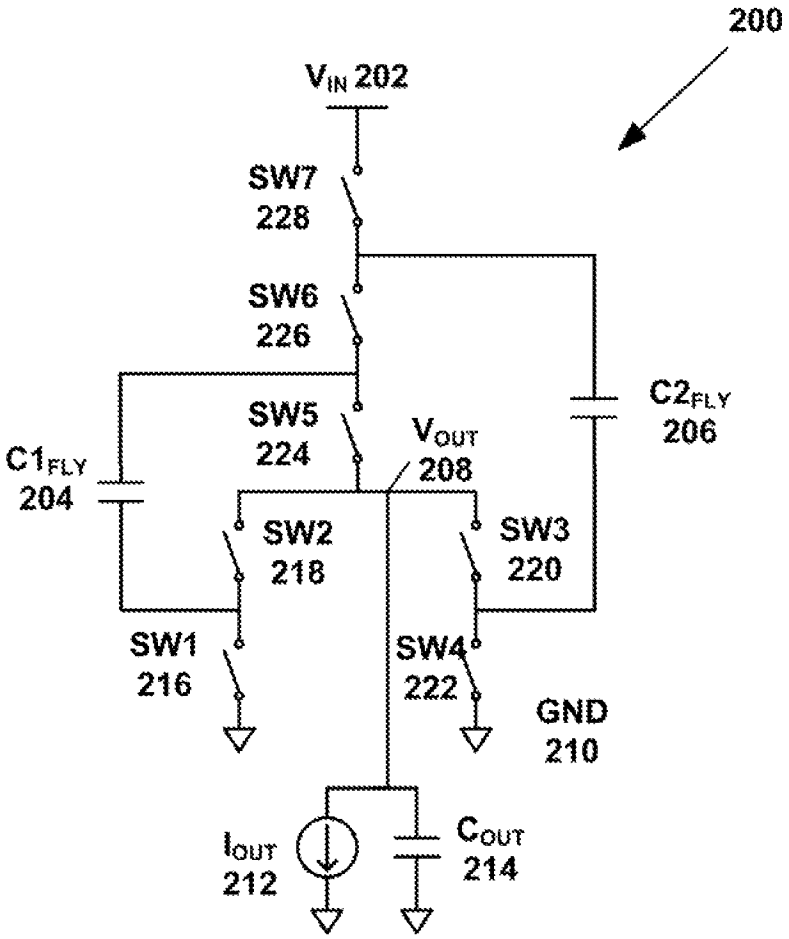
FIG. 2 shows an example of a 3:1 step-down Dickson Star SC regulator as known in the prior art.

One type of an SC regulator is a Dickson Star SC regulator. An example of a 3:1 step-down Dickson Star SC regulator (a step-down Dickson Star SC regulator that is configured to divide an input voltage level by ⅓) is illustrated in FIG. 2. The Dickson Star SC regulator has several advantages compared to other SC regulator topologies. First, it uses fewer capacitors compared to other SC regulator topologies, such as a ladder type SC regulator. Second, it can use, as switches, transistors with lower voltage ratings compared to other SC regulator topologies, such as a series-to-parallel SC regulator. Third, it can be more easily scaled to higher input voltages compared to other SC regulator topologies, such as a series-to-parallel SC regulator.

A Dickson Star SC regulator 200 can include switching capacitors $C1_{FLY}$ 204 and $C2_{FLY}$ 206, and a switch matrix including a plurality of switches 216, 218, 220, 222, 224, 226, and 228 configured to electrically couple the switching capacitors $C1_{FLY}$ 204 and $C2_{FLY}$ 206 to an input voltage node $V_{IN}$ 202, an output voltage node $V_{OUT}$ 208, and a ground node GND 210. Output node $V_{OUT}$ 208 is coupled to an output load $I_{OUT}$ 212 and a decoupling capacitor $C_{OUT}$ 214.

FIGS. 3A-3C illustrate the basic operation of Dickson Star SC regulator 200. As shown in FIG. 3C, Dickson Star SC regulator 200 is duty-cycled between State0 (illustrated in FIG. 3A) and State 1 (illustrated in FIG. 3B) over time with a duty cycle D. The value of the duty cycle (D) can be any value between 0 and 1, and preferably between 0.25 and 0.75.

When switching capacitors $C1_{FLY}$ 204 and $C2_{FLY}$ 206 are large enough, the voltages across these switching capacitors, $V_{C1FLY}$, $V_{C2FLY}$, respectively, stay roughly constant between State0 and State1. Additionally, decoupling capacitor $C_{OUT}$ 214, which is often large, is always coupled to output $V_{OUT}$ 208 to reduce noise on the output. Therefore, output voltage $V_{OUT}$ 208 stays roughly constant in State0 and State1. Based on these characteristics, the following voltage relationships can be derived:

$$V_{OUT}208+V_{C1FLY}=V_{C2FLY} \quad \text{State0:}$$

$$V_{OUT}208=V_{C1FLY} \quad \text{State1:}$$

$$V_{OUT}208+V_{C2FLY}=V_{IN}202 \quad \text{State1:}$$

By eliminating $V_{C1FLY}$ and $V_{C2FLY}$ from these relationships, the following relationship can be derived:

$$V_{OUT}=(1/3)\times V_{IN}$$

This shows that alternating between State0 and State1 provides a 3:1 step-down voltage regulation. This 3:1 step-down Dickson Star SC regulator design can be extended to an N:1 step-down Dickson Star SC regulator, where N is a number greater than 3.

Figure 35B:
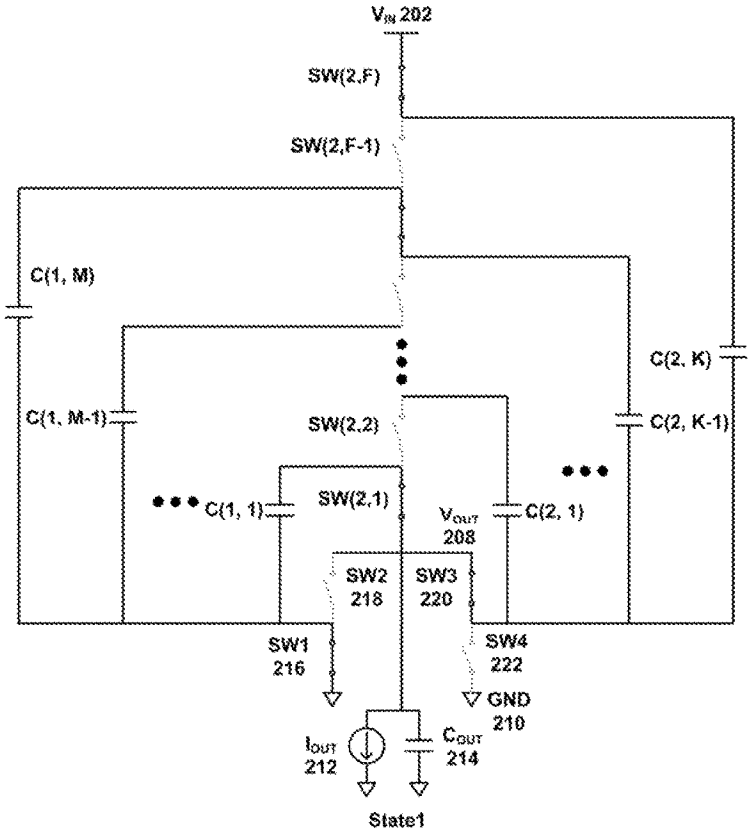
FIGS. 35A-35C show an example of the operation of an N:1 step-down Dickson Star SC regulator in the N:1 conversion mode in accordance with some embodiments.
Figure 35A:
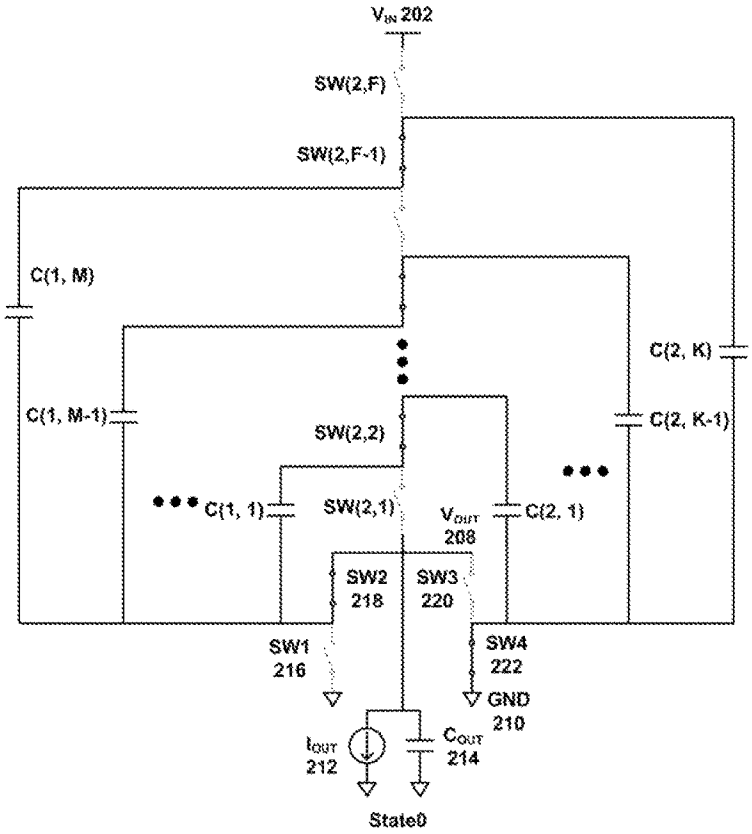

FIGS. 35A-35B show the topology and operation of an N:1 step-down Dickson Star SC regulator. The N:1 step-down Dickson Star SC regulator can include a capacitor matrix (also referred to as a capacitor bank). The capacitor matrix can include a first capacitor sub-matrix and a second capacitor sub-matrix. The capacitors in the first capacitor sub-matrix are referred to as C(1, j), where the first index "1" refers to the "first" capacitor matrix, and the second index "j" refers to the $j^{th}$ capacitor in the first capacitor sub-matrix. Likewise, the capacitors in the second capacitor sub-matrix are referred to as C(2, j). In FIGS. 35A-35B, the first capacitor sub-matrix includes M number of capacitors; and the second capacitor sub-matrix includes K number of capacitors. M can be equal to floor(N/2), and K can be equal to floor ((N−1)/2).

The N:1 step-down Dickson-Star SC regulator includes a plurality of switch matrices. The switches in the first switch sub-matrix include the bottom four switches SW1 216, SW2 218, SW3 220, SW4 222. The switches in the second switch sub-matrix are referred to as SW(2, j), where the index "j" refers to the $j^{th}$ switch in the switch matrix.

In FIGS. 35A-35B, the number of switches, and the connections of the switches, in the first switch sub-matrix SW1 216, SW2 218, SW3 220, SW4 222 do not change regardless of the value of "N". The second switch sub-matrix includes F number of switches, and the value F can be equal to M+K+1.

SW1 216 is connected between GND 210 and one terminal of SW2 218. The other terminal of SW2 218 is connected to $V_{OUT}$ 208 and one terminal of SW3 220. SW4 222 is connected between GND 210 and the other terminal of SW3 220. SW(2,1) is connected between $V_{OUT}$ 208 and one terminal of C(1,1). The remaining switches in the second switch sub-matrix are connected between capacitors in the first capacitor sub-matrix and capacitors in the second capacitor sub-matrix. For example, SW(2, j) (where J>=2) is connected between one terminal of C(1,p) and one terminal of C(2, q), where the value p is equal to ceiling(j/2) and the value q is equal to floor(j/2). The connection between SW1 216 and SW2 218 is connected to the other terminal of C(1,p), while the connection between SW3 220 and SW4 222 is connected to the other terminal of C(2,q).

The N:1 step-down Dickson-Star SC regulator can be duty-cycled between State0 and State1, as shown in FIG. 35A and FIG. 35B, respectively, by turning on and off switches in the switch matrices.

FIGS. 35A-35B show the operation of the N:1 step-down Dickson Star SC regulator in the N:1 conversion mode. In State0, in the first switch sub-matrix, SW1 216 and SW3 220 are turned off (i.e., opened), while SW2 218 and SW4 222 are turned on (i.e., closed). In the second switch sub-matrix, all odd indexed switches are off (i.e., opened) while all even indexed switches are on (i.e., closed). Subsequently, in State1, all switch states are inverted compared to State0.

An advantage of this switch configuration is that all switches only have at most $V_{OUT}$, 208 applied across them, regardless of how large N is. One drawback is that some capacitors have high voltages applied across them, which requires high voltage rated capacitors that can be bulky and expensive. In some embodiments, the voltages $V_{C(1,p)}$ and $V_{C(2,q)}$ across the capacitors are equal to $((p-1)\times 2+1)\times V_{OUT}$ 208 and $q\times 2\times V_{OUT}$ 208. As a result, this Dickson Star configuration is useful when low voltage switches and high voltage capacitors are available.

Although Dickson Star SC regulators can be useful, such a design would still be limited to a single conversion ratio (a ratio between an input voltage $V_{IN}$ 202 and an output voltage $V_{OUT}$ 208 of N:1 and cannot efficiently regulate voltages to provide other conversion ratios.

One disadvantage of using a single-conversion ratio SC regulator is the limited range of output voltages. Oftentimes, efficiencies of SC regulators can degrade at output voltages that are not a predetermined fraction (e.g., 1/N) of the input voltage. An SC regulator is typically optimized to achieve high efficiency at a single conversion ratio. For example, when an SC regulator is coupled to a battery providing 3.3V, the SC regulator may be optimized to receive the 3.3V and provide a fixed output voltage of 1.1V. In this case, the efficiency of the SC regulator is optimized to provide an output voltage of 1.1V—the efficiency of the SC regulator would degrade as the output voltage deviates from 1.1V. Put another way, the SC regulator may be optimized to provide a high efficiency at a conversion ratio of 3:1, and the efficiency of the SC regulator may degrade as the conversion ratio deviates from 3:1. This efficiency degradation is unfortunate because a system on chip (SoC) may operate at many voltage levels, and it would be desirable to use a single SC regulator to accommodate all of those voltage levels in the SoC.

One way to support multiple conversion ratios is to provide a plurality of regulators each dedicated to a particular conversion ratio, and enable only one of these regulators depending on which conversion ratio needs to be supported. However, this requires many redundant capacitors and switches. For example, when the 3:1 regulator is being used, all switches and capacitors for 2:1 and 1:1 regulators stay idle without being used. The redundant capacitors and switches require real estate on an integrated circuit chip and add costs, both of which are undesirable.

Therefore, it would be desirable to provide a single SC regulator that could achieve high efficiencies at multiple conversion ratios. In other words, it would be desirable to provide a single SC regulator that could be reconfigured for one of many conversion ratios (e.g., ½, ⅓, ⅔, ⅖, ⅗, ⅘) so that a single SC regulator can accommodate one of many output voltage levels at high efficiency.

The present disclosure shows a reconfigurable Dickson Star SC regulator that can support multiple conversion ratios by reconfiguring between various modes. The reconfigurable Dickson Star SC regulator is designed to reduce the number of redundant capacitors by reusing capacitors and switches across multiple modes of operation (across multiple conversion ratios).

In some embodiments, a reconfigurable Dickson Star SC regulator includes a regular Dickson Star SC regulator and a mode switch matrix. The mode switch matrix includes a plurality of switches coupled to the regular Dickson Star SC regulator. Depending on the desired conversion ratio, one or more switches in the mode switch matrix may be enabled to reconfigure the arrangement of capacitors in the regular Dickson Star SC regulator. This way, the mode switch matrix is capable of reconfiguring the conversion ratio of the regular fixed-conversion mode Dickson Star SC regulator.

In some embodiments, depending on the reconfigured conversion ratio of the reconfigurable Dickson Star SC regulator, switches in the regular fixed-conversion mode Dickson Star SC regulator may be controlled differently (compared to its regular fixed-conversion mode operation) to account for the reconfigured arrangement of capacitors.

In the foregoing discussions, an N:1 reconfigurable Dickson Star SC regulator refers to a reconfigurable Dickson Star SC regulator that can be reconfigured to provide any one of M:1 conversion ratios, where M is a value between 1 and N.

Figure 4:
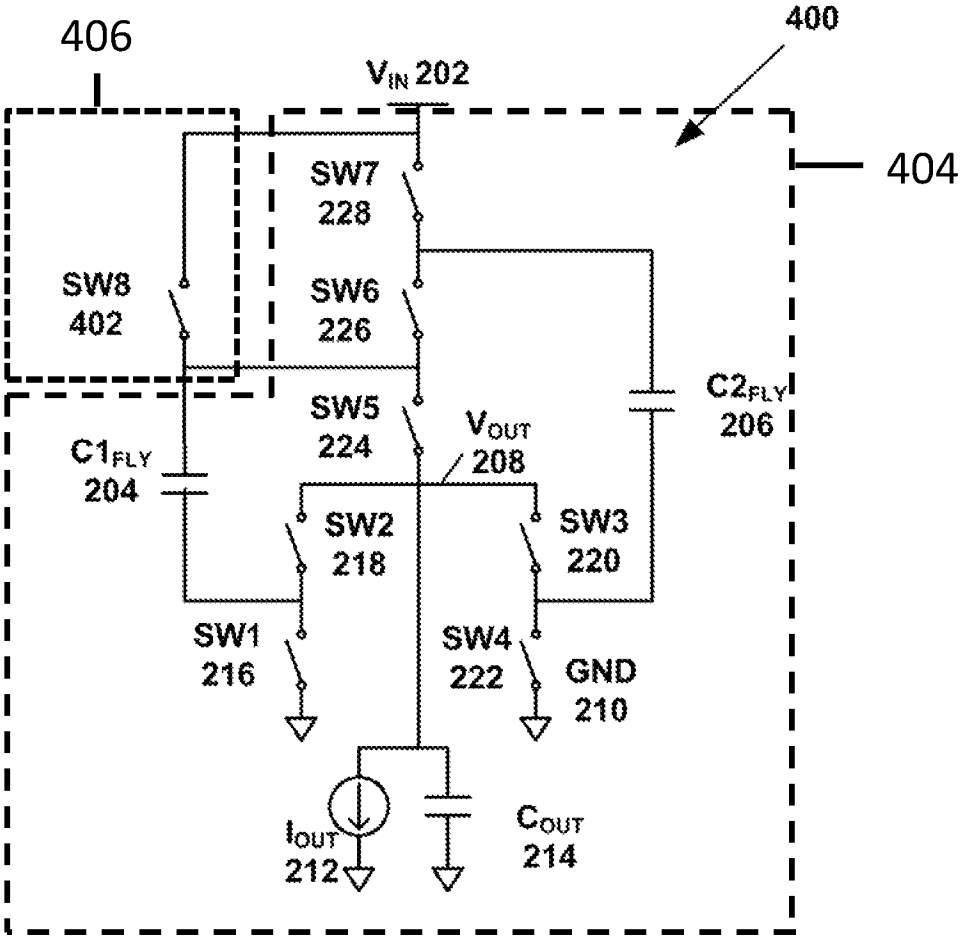
FIG. 4 illustrates an example of a reconfigurable Dickson Star SC regulator that can be reconfigured to support a plurality of conversion ratios in accordance with some embodiments.

FIG. 4 illustrates an example of a reconfigurable Dickson Star SC regulator that can be reconfigured to support a plurality of conversion ratios in accordance with some embodiments. FIG. 4 shows a 3:1 reconfigurable Dickson Star SC regulator 400 that can be reconfigured into one of conversion ratios: 3:1, 2:1, 1:1. The 3:1 reconfigurable Dickson Star SC regulator 400 includes a fixed 3:1 Dickson Star SC regulator 200 of FIG. 2, identified using the box 404, and a mode switch matrix 406 including a single mode switch SW8 402. This additional mode switch 402 can be selectively operated to transform a fixed 3:1 Dickson Star SC regulator of FIG. 2 into a 3:1 reconfigurable Dickson Star SC regulator.

FIGS. 5-7 illustrate the operation of the reconfigurable regulator in FIG. 4 for conversion ratios 3:1, 2:1, 1:1, respectively, in accordance with some embodiments. As shown in FIGS. 5A-5C, to operate the reconfigurable Dickson Star SC regulator 400 in a 3:1 conversion mode, the mode switch SW8 402 can be simply turned off (in an "open" position), and the fixed 3:1 Dickson Star SC regulator 404 in the reconfigurable regulator 400 can be operated the same way as in FIG. 3 (a plurality of switches can be duty-cycled to switch the regulator between State0 and State1).

As shown in FIGS. 6A-6C, to operate the reconfigurable Dickson Star SC regulator 400 in a 2:1 conversion mode, as the fixed 3:1 regulator 404 is duty-cycled between State0 and State1, the switch SW8 402 can be turned on (i.e., closed) during State0 and the switch SW8 402 can be turned off (i.e., opened) during State 1. In some sense, this 3:1 reconfigurable Dickson Star SC regulator operates in a 2:1 conversion mode because the mode switch SW8 402 ties together switching capacitors $C1_{FLY}$ 204 and $C2_{FLY}$ 206 in a parallel manner and makes them to operate collectively as a single large capacitor in State0, just as in a traditional 2:1 SC regulator. For example, in a traditional 2:1 SC regulator, a switching capacitor is, or several switching capacitors connected in parallel acting like one switching capacitor are, connected between the input and output voltages in one state, while being connected between the output voltage and ground in another state. By switching between these two states, the output voltage becomes half of the input voltage. The switches in FIGS. 6A-6B are turned on and off as shown in the figures so that the switching capacitors behave like as in a traditional 2:1 SC regulator.

As shown in FIGS. 7A-7C, to operate the reconfigurable Dickson Star SC regulator 400 in a 1:1 conversion mode, as the regulator is duty-cycled between State0 and State1, the switch SW8 402 can be turned on (i.e., closed) during State0 and the switch SW8 402 can be turned off (i.e., opened) during State 1. The remaining switches are turned on and off accordingly so that the switching capacitors behave like as in a traditional 1:1 SC regulator. For example, in a traditional 1:1 SC regulator, a switching capacitor is, or several switching capacitors connected in parallel acting like one switching capacitor are, connected between the input voltage and ground in one state, while being connected between the output voltage and ground in another state. By switching between these two states, the output voltage becomes similar to the input voltage. The switches in FIGS. 7A-7B are turned on and off as shown in the figures so that the switching capacitors behave like as in a traditional 1:1 SC regulator.

Figure 8:
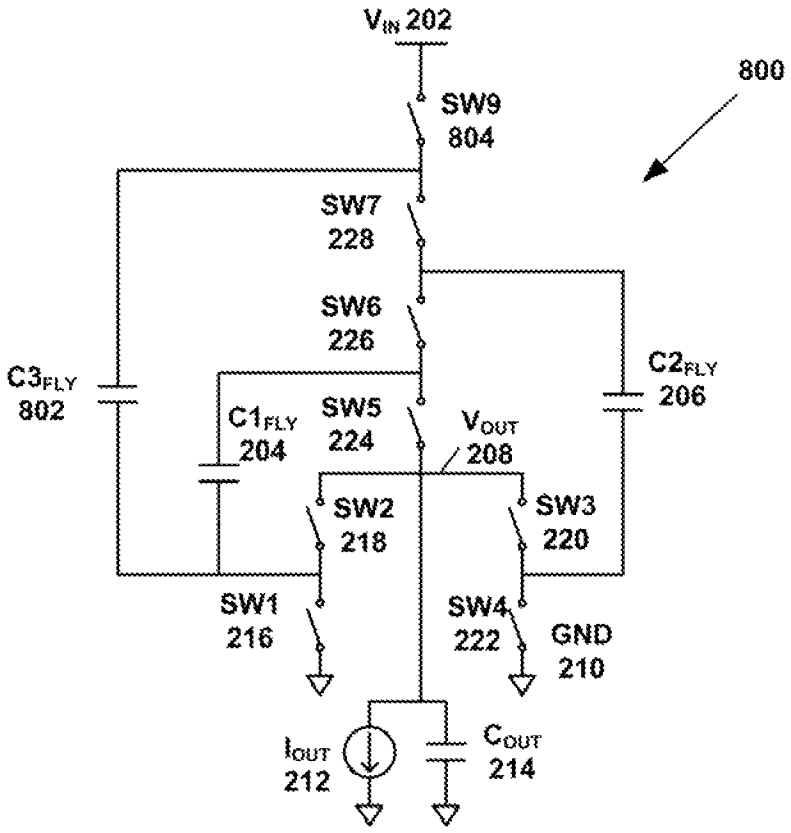
FIG. 8 illustrates an example of a fixed conversion ratio 4:1 Dickson Star SC regulator in accordance with some embodiments.

In some embodiments, the reconfigurable Dickson Star SC regulator can be a 4:1 reconfigurable Dickson Star SC regulator. In other words, the reconfigurable Dickson Star SC regulator can be configured to provide one of the following conversion ratios: 4:1, 3:1, 2:1, 1:1. To facilitate the discussion of the 4:1 reconfigurable Dickson Star SC regulator, FIG. 8 illustrates a fixed conversion ratio 4:1 Dickson Star SC regulator 800. Compared to the 3:1 Dickson Star SC regulator 200 in FIG. 2, the 4:1 Dickson Star SC regulator 800 has one more switching capacitor $C3_{FLY}$ 802 and one more switch SW9 804.

Figures 9A, 9B, 9C:
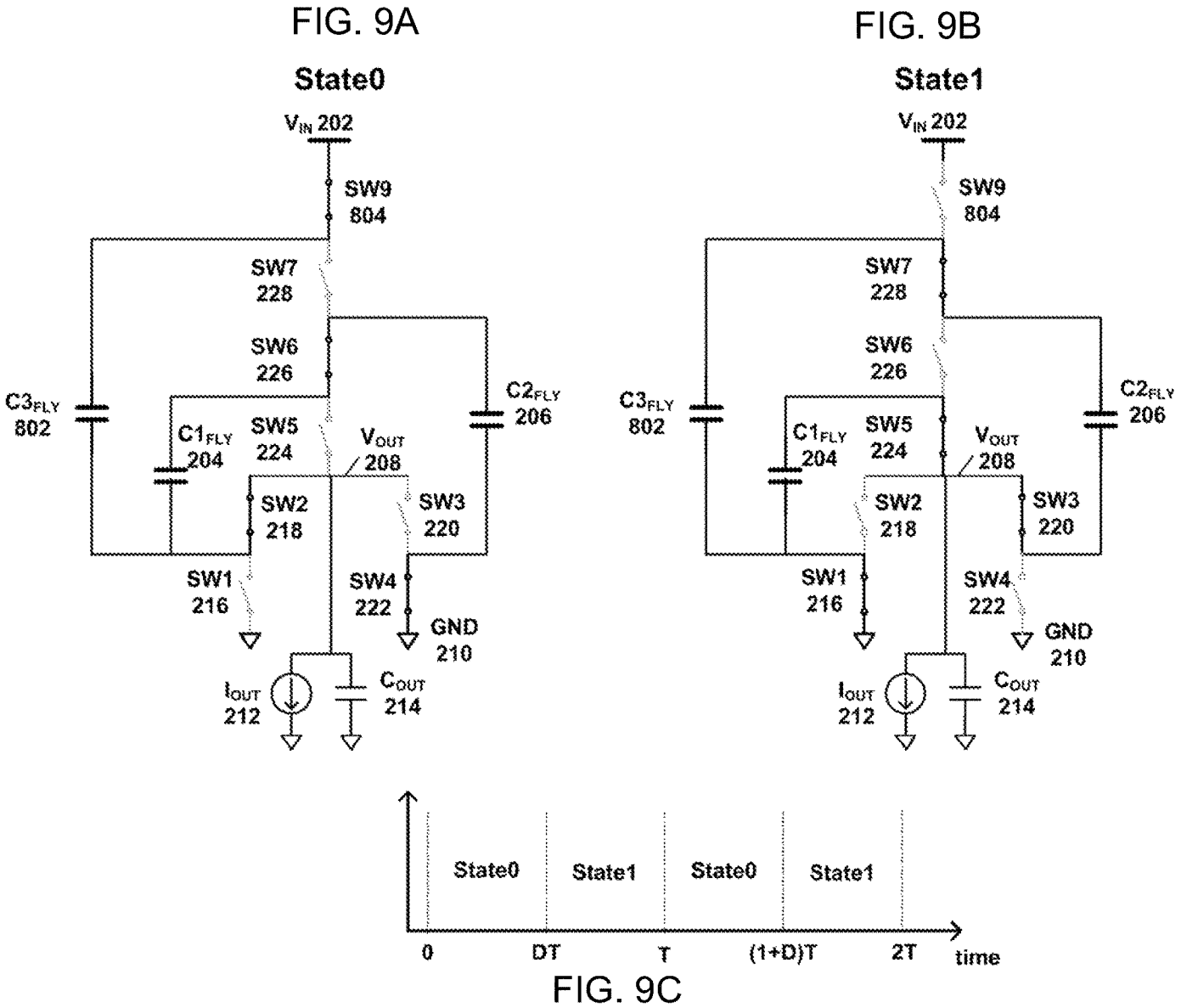
FIGS. 9A-9C show an example of the operation of the 4:1 Dickson Star SC regulator in accordance with some embodiments.

Similar to the 3:1 Dickson Star SC regulator 200, the 4:1 regulator 800 is duty-cycled between State0 and State1 to provide voltage regulation. FIGS. 9A-9C show the duty-cycling of the 4:1 regulator 800 between State0 and State1. Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{IN}202=V_{C3FLY}+V_{OUT}208 \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{C3FLY}=V_{OUT}208+V_{C2FLY} \quad \text{State1:}$$

where $V_{C1FLY}$ is a voltage across the first switching capacitor $C_{1FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}$$

$$V_{C3FLY}=3\times V_{OUT}$$

$$V_{OUT}=(1/4)\times V_{IN}$$

Therefore, the Dickson Star SC regulator illustrated in FIG. 8 operates as a 4:1 step-down Dickson Star SC regulator.

Figure 10:
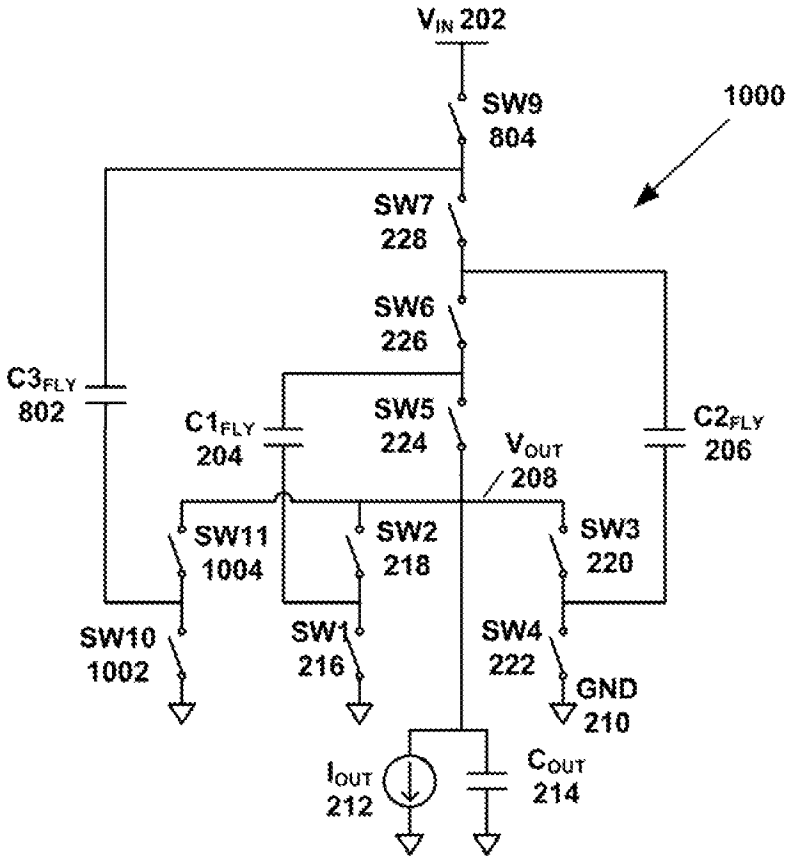
FIG. 10 shows an example of a 4:1 reconfigurable Dickson Star SC regulator in accordance with some embodiments.

In some embodiments, the fixed conversion mode 4:1 Dickson Star SC regulator can be augmented with a mode switch matrix to provide a 4:1 reconfigurable Dickson Star SC regulator. FIG. 10 shows a 4:1 reconfigurable Dickson Star SC regulator 1000 in accordance with some embodiments. 4:1 reconfigurable Dickson Star SC regulator 1000 includes a fixed conversion mode 4:1 Dickson Star SC regulator and a mode switch matrix with two mode switches SW10 1002 and SW11 1004. The mode switch matrix is designed to reconfigure the arrangement of capacitors in the fixed conversion mode 4:1 Dickson Star SC regulator to enable reconfiguration between 4:1, 3:1, 2:1, 1:1 conversion ratios.

Figure 11B:
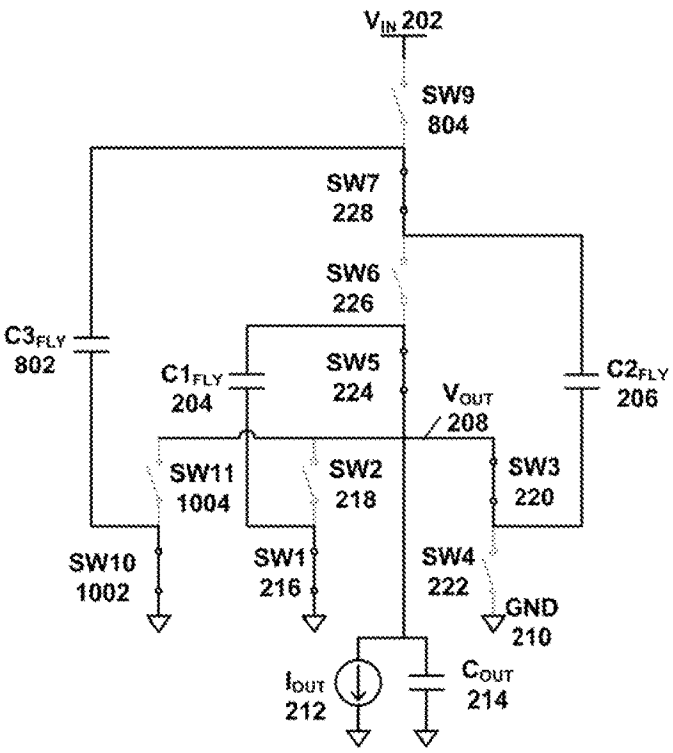
FIGS. 11A-11C illustrate an example of the operation of a 4:1 reconfigurable Dickson Star SC regulator in a 4:1 conversion mode in accordance with some embodiments.
Figure 11A:
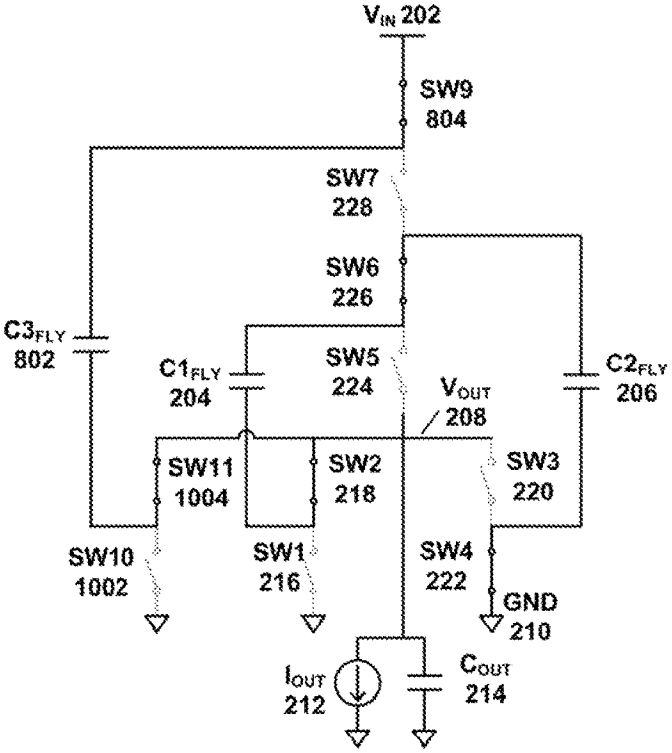
Figure 11C:
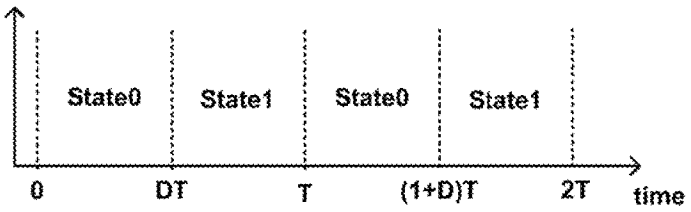

FIGS. 11A-11C illustrate the operation of a 4:1 reconfigurable Dickson Star SC regulator in a 4:1 conversion mode in accordance with some embodiments. In this mode of operation, while the Dickson Star SC regulator duty-cycles between State0 and State1 as shown in FIG. 11C, the mode switches SW10 1002 and SW11 1004 are also duty-cycled to provide a 4:1 conversion ratio, behaving similarly as SW1 216 and SW2 218. For example, in State0, the first mode switch SW10 1002 is turned off ("open") and the second mode switch SW11 1004 is turned on ("closed"), and in State1, the first mode switch SW10 1002 is turned on ("closed") and the second mode switch SW11 1004 is turned off ("open").

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{IN}202=V_{C3FLY}+V_{OUT}208 \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{C3FLY}=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}$$

$$V_{C3FLY}=3\times V_{OUT}$$

$$V_{OUT}=(1/4)\times V_{IN}$$

Therefore, the reconfigurable Dickson Star SC regulator illustrated in FIGS. 11A-11B operates as a 4:1 step-down Dickson Star SC regulator.

Figure 12B:
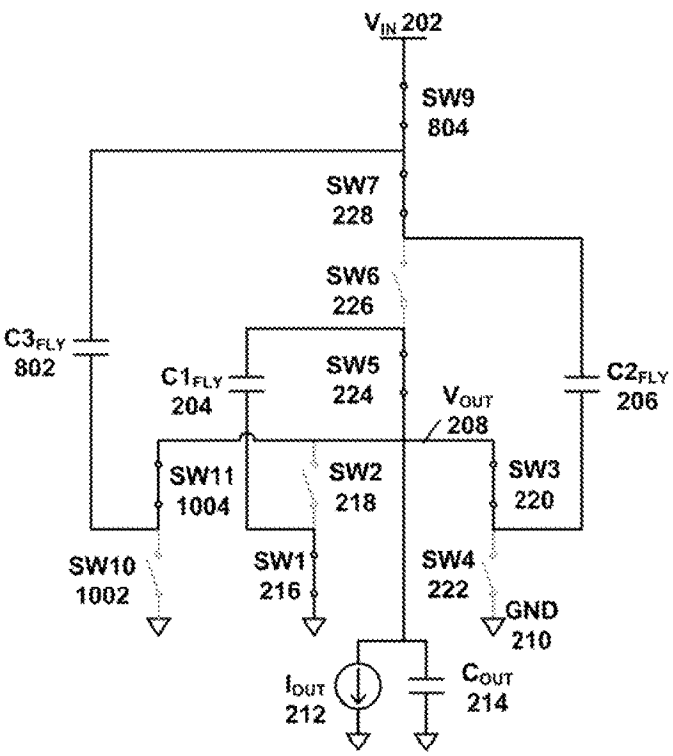
FIGS. 12A-12C illustrate an example of the operation of a 4:1 reconfigurable Dickson Star SC regulator in a 3:1 conversion mode in accordance with some embodiments.
Figure 12A:
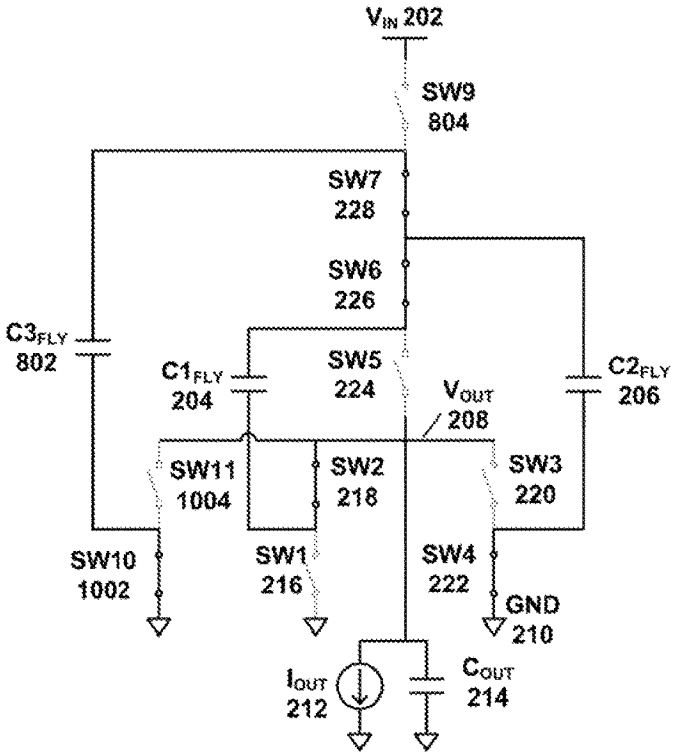
Figure 12C:
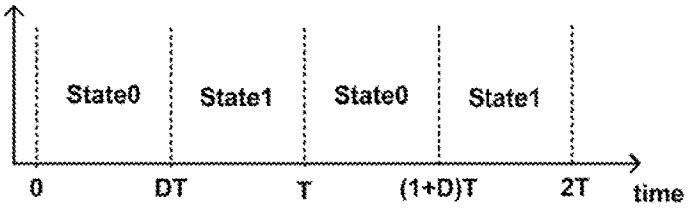

FIGS. 12A-12C illustrate the operation of a 4:1 reconfigurable Dickson Star SC regulator in a 3:1 conversion mode in accordance with some embodiments. In this mode of operation, while the regulator duty-cycles between State0 and State1 as shown in FIG. 12C, the mode switches SW10 1002 and SW11 1004 are also duty-cycled to provide a 3:1 conversion ratio. For example, in State0, the first mode switch SW10 1002 is turned on ("closed") and the second mode switch SW11 1004 is turned off ("open"), and in State1, the first mode switch SW10 1002 is turned off ("open") and the second mode switch SW11 1004 is turned on ("closed").

In some sense, the operation of this 4:1 reconfigurable Dickson Star SC regulator operating in the 3:1 conversion mode is similar to the operation of the fixed conversion mode 3:1 Dickson Star SC regulator 200 in FIG. 2. For example, the switching capacitors $C2_{FLY}$ 206 and $C3_{FLY}$ 802 are tied together in parallel to provide a larger single capacitor, which together operates as $C2_{FLY}$ 206 in FIG. 2. As another example, the switching capacitor $C1_{FLY}$ 204 in FIGS. 12A-12B operates as $C1_{FLY}$ 204 in FIG. 2. Therefore, although the number of capacitors in the 4:1 reconfigurable Dickson Star SC regulator is different from the fixed conversion mode 3:1 Dickson Star SC regulator in FIG. 2, the 4:1 reconfigurable Dickson Star SC regulator can operate in the 3:1 conversion mode through reconfiguration of capacitor arrangements using a plurality of switches.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C2FLY}=V_{C3FLY} \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{IN}202=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}208$$

$$V_{C3FLY}=2\times V_{OUT}208$$

$$V_{OUT}=(1/3)\times V_{IN}$$

Therefore, the reconfigurable Dickson Star SC regulator illustrated in FIGS. 12A-12C operates as a 3:1 step-down Dickson Star SC regulator.

Figure 13B:
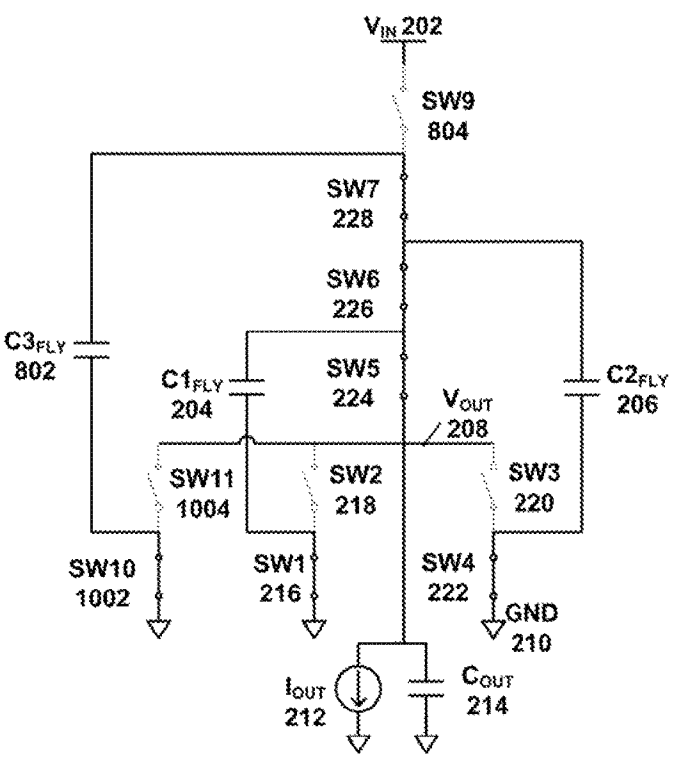
FIGS. 13A-13C illustrate an example of the operation of a 4:1 reconfigurable Dickson Star SC regulator in a 2:1 conversion mode in accordance with some embodiments.
Figure 13A:
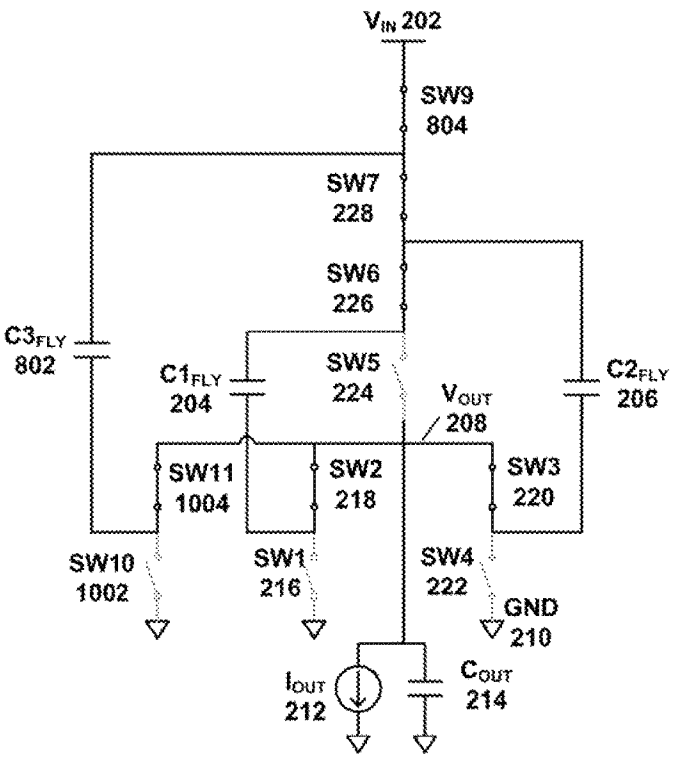
Figure 13C:
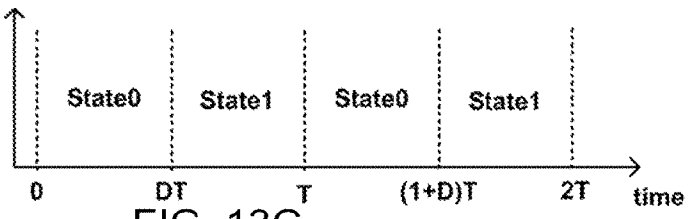

FIGS. 13A-13C illustrate the operation of a 4:1 reconfigurable Dickson Star SC regulator in a 2:1 conversion mode in accordance with some embodiments. In this mode of operation, while the Dickson Star SC regulator duty-cycles between State0 and State1 as shown in FIG. 13C, the mode switches SW10 1002 and SW11 1004 are also duty-cycled to provide a 2:1 conversion ratio. For example, in State0, the first mode switch SW10 1002 is turned off ("open") and the second mode switch SW11 1004 is turned on ("closed"), and in State 1, the first mode switch SW10 1002 is turned on ("closed") and the second mode switch SW11 1004 is turned off ("open").

In some sense, this 4:1 reconfigurable Dickson Star SC regulator operates in a 2:1 conversion mode because the regulator ties together all three switching capacitors $C1_{FLY}$ 204, $C2_{FLY}$ 206, $C3_{FLY}$ 802 in parallel and makes them to operate collectively as a single large capacitor, just as in a traditional 2:1 SC regulator. For example, in a traditional 2:1 SC regulator, a switching capacitor is, or several switching capacitors connected in parallel acting like one switching capacitor are, connected between the input and output voltages in one state, while being connected between the output voltage and ground in another state. By switching between these two states, the output voltage becomes half of the input voltage. The switches in FIGS. 13A-13B are turned on and off accordingly so that the switching capacitors behave like as in a traditional 2:1 SC regulator.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202-V_{OUT}208 \quad \text{State0:}$$

$$V_{C1FLY}=V_{C2FLY}=V_{C3FLY}=V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=(1/2)\times V_{IN}$$

Therefore, the reconfigurable Dickson Star SC regulator illustrated in FIGS. 13A-13C operates as a 2:1 step-down Dickson Star SC regulator.

Figure 14B:
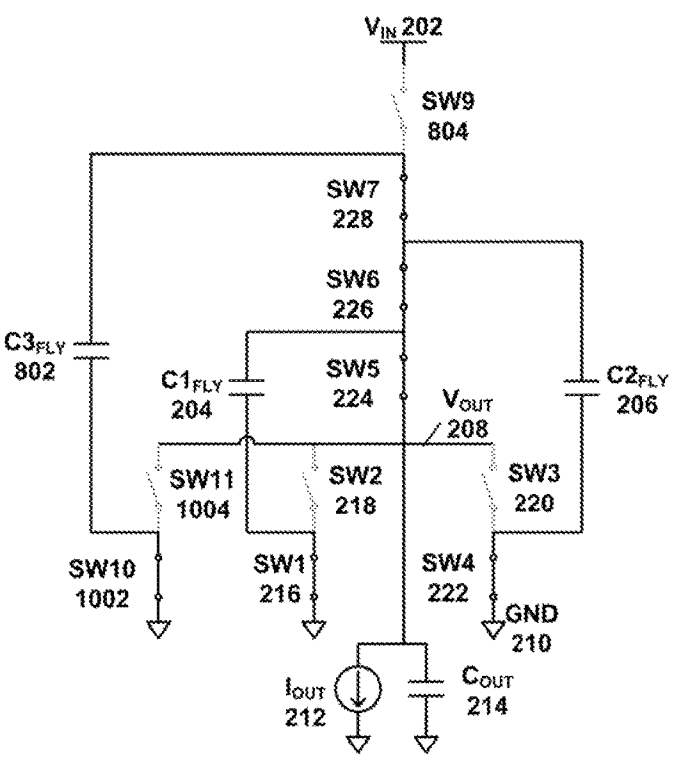
FIGS. 14A-14C illustrate an example of the operation of a 4:1 reconfigurable Dickson Star SC regulator in a 1:1 conversion mode in accordance with some embodiments.
Figure 14A:
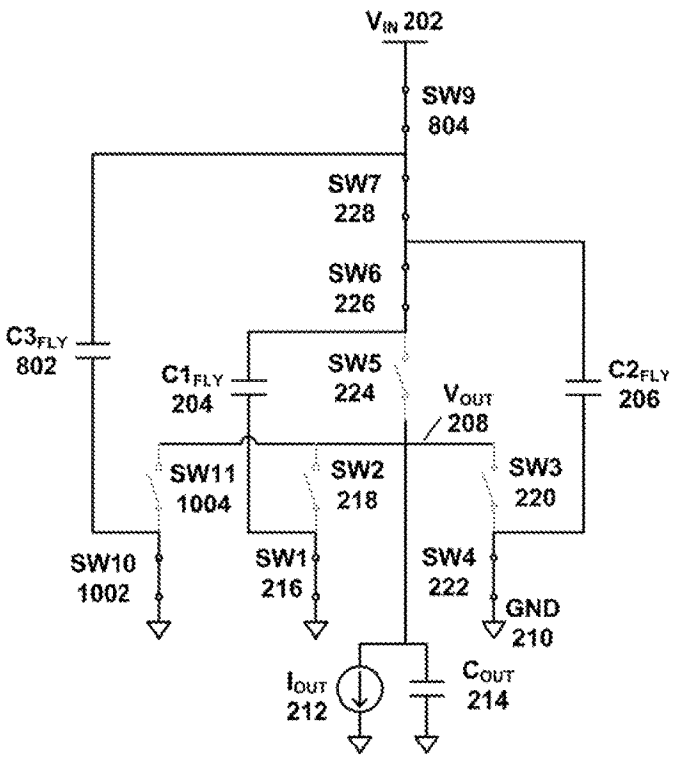
Figure 14C:
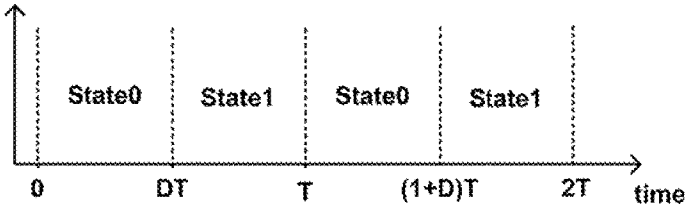

FIGS. 14A-14C illustrate the operation of a 4:1 reconfigurable Dickson Star SC regulator in a 1:1 conversion mode in accordance with some embodiments. In this mode of operation, while the Dickson Star SC regulator duty-cycles between State0 and State1 as shown in FIG. 14C, the mode switches SW10 1002 and SW11 1004 are not duty-cycled. For example, in both State0 and State1, the first mode switch SW10 1002 is turned on ("closed") and the second mode switch SW11 1004 is turned off ("open").

In some sense, this 4:1 reconfigurable Dickson Star SC regulator operates in a 1:1 conversion mode because the regulator ties together all three switching capacitors $C1_{FLY}$ 204, $C2_{FLY}$ 206, $C3_{FLY}$ 802 in parallel and makes them to operate collectively as a single large capacitor, just as in a traditional 1:1 SC regulator. For example, in a traditional 1:1 SC regulator, a switching capacitor is, or several switching capacitors connected in parallel acting like one switching capacitor are, connected between the input voltage and ground in one state, while being connected between the output voltage and ground in another state. By switching between these two states, the output voltage becomes similar to the input voltage. The switches in FIGS. 14A-14B are turned on and off as shown in the figures so that the switching capacitors behave like as in a traditional 1:1 SC regulator.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202 \qquad \text{State0:}$$

$$V_{C1FLY}=V_{C2FLY}=V_{C3FLY}=V_{OUT}208 \qquad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=V_{IN}$$

Therefore, the reconfigurable Dickson Star SC regulator illustrated in FIGS. 14A-14C operates as a 1:1 step-down Dickson Star SC regulator.

In some embodiments, the 3:1 reconfigurable Dickson Star SC regulator 400 illustrated in FIG. 4 and the 4:1 reconfigurable Dickson Star SC regulator 1000 illustrated in FIG. 10 can be extended to an N:1 reconfigurable Dickson Star SC regulator, where N can be any number greater than one.

Figure 15B:
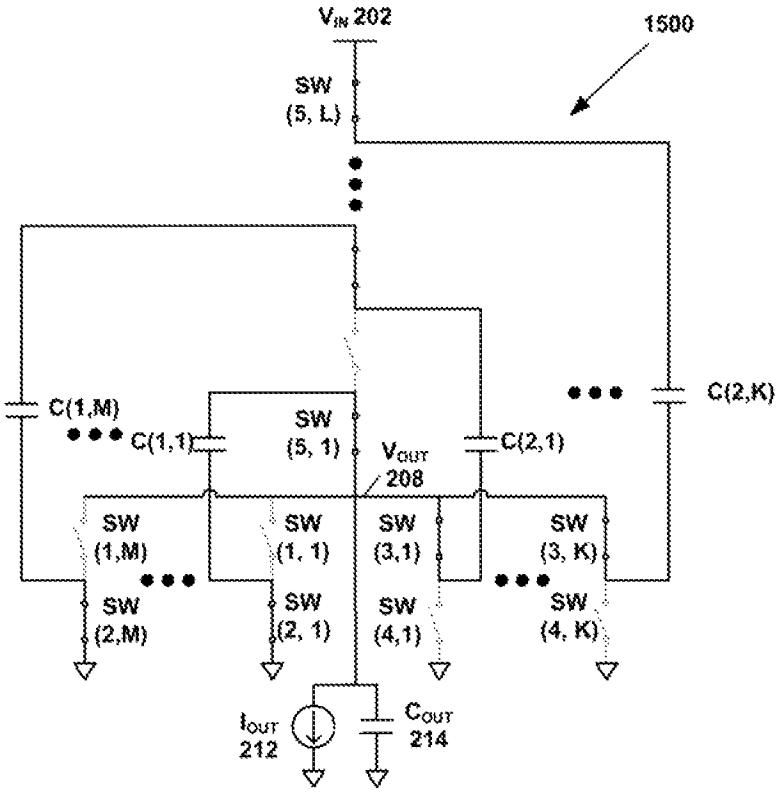
FIGS. 15A-15B illustrate an example of an N:1 reconfigurable Dickson Star SC regulator in accordance with some embodiments.
Figure 15A:
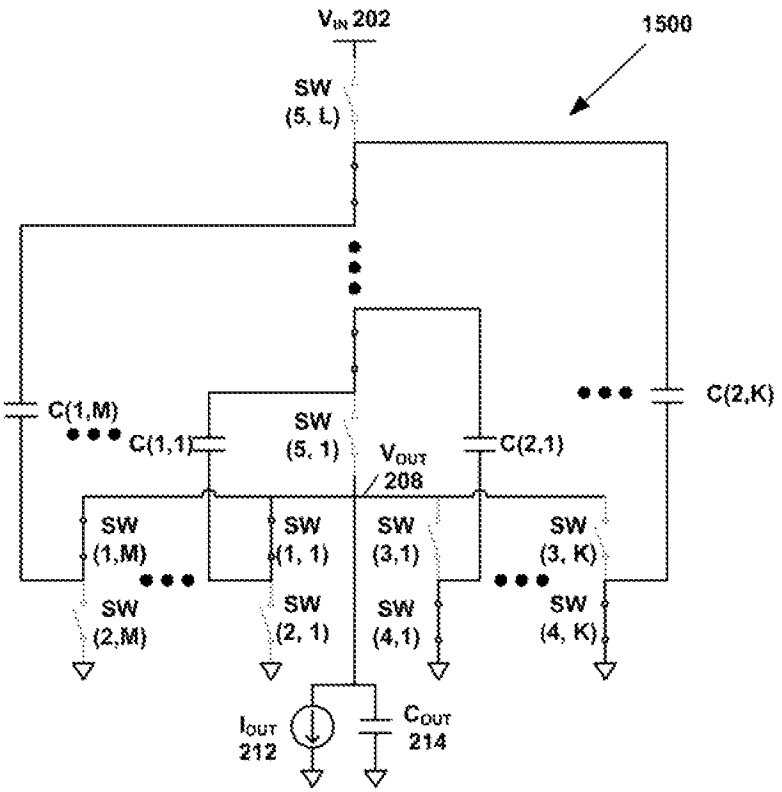

FIGS. 15A-15B illustrate an N:1 reconfigurable Dickson Star SC regulator in accordance with some embodiments.

In some embodiments, the N:1 reconfigurable Dickson Star SC regulator 1500 can include a capacitor matrix (also referred to as a capacitor bank). The capacitor matrix can include a first capacitor sub-matrix and a second capacitor sub-matrix. The capacitors in the first capacitor sub-matrix are referred to as C(1, j), where the first index "1" refers to the "first" capacitor matrix, and the second index "j" refers to the $j^{th}$ capacitor in the first capacitor sub-matrix. Likewise, the capacitors in the second capacitor sub-matrix are referred to as C(2, j). In FIGS. 15A-15B, the first capacitor sub-matrix include M number of capacitors; and the second capacitor sub-matrix include K number of capacitors. In some embodiments, M is equal to floor(N/2), and K is equal to floor((N−1)/2).

In some embodiments, the N:1 reconfigurable Dickson-Star SC regulator 1500 includes a switch matrix having a first switch sub-matrix, a second switch sub-matrix, a third switch sub-matrix, a fourth switch sub-matrix, and a fifth switch matrix.

The switches in the first switch sub-matrix are referred to as SW(1, j), where the first index "1" refers to the "first" switch matrix, and the second index "j" refers to the $j^{th}$ switch in the first switch sub-matrix. Likewise, the switches in the second switch sub-matrix are referred to as SW(2, j); the switches in the third switch sub-matrix are referred to as SW(3, j); the switches in the fourth switch sub-matrix are referred to as SW(4, j); and the switches in the fifth switch sub-matrix are referred to as SW(5, j).

In FIGS. 15A-15B, the first switch sub-matrix and second switch sub-matrix each include M number of switches; the third switch sub-matrix and the fourth switch sub-matrix each include K number of switches; and the fifth switch sub-matrix includes L number of switches. In some embodiments, M is equal to floor(N/2); K is equal to floor((N−1)/2); and L is equal to N.

In some embodiments, regulator 1500 can be duty-cycled between State0 and State1 by turning on and off switches in the switch matrix of the regulator 1500.

Figure 35C:
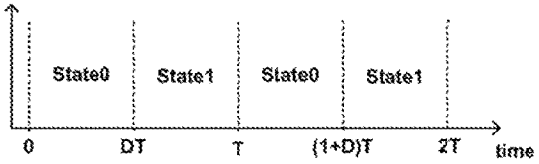

FIGS. 15A-15B show the operation of N:1 reconfigurable Dickson Star SC regulator 1500 in the N:1 conversion mode in accordance with some embodiments. In State0, all switches in the first switch sub-matrix at the bottom left side are turned on, while all switches in the second switch sub-matrix side are turned off. Additionally, all switches in the third switch sub-matrix are turned off, while all switches in the fourth switch sub-matrix are turned on. In the fifth switch sub-matrix, all odd indexed switches are off while all even indexed switches are on. Subsequently, in State1, all switch states are inverted compared to State0. While there are additional switches, including SW(j,1), SW(j,2), SW(j, 3), SW(j,4) where j is larger than 1, the capacitor topologies are similar to the N:1 step-down Dickson Star in FIG. 35.

To operate N:1 reconfigurable Dickson-Star SC regulator 1500 in the (N−1):1 conversion mode, the capacitor with the highest index in the first capacitor sub-matrix (C(1, M)) and the capacitor with the highest index in the second capacitor sub-matrix (C(2, K)) can be tied together in parallel to operate as a single capacitor. This "single" capacitor can work similar to C(1, M) in an (N−1):1 fixed conversion mode Dickson-Star SC regulator—a Dickson-Star SC regulator that is identical to an N:1 fixed conversion mode Dickson-Star SC regulator without C(2, K), which is the capacitor that is connected to $V_{IN}$ 202 through switch SW(5, L), the top switch in the 5th switch matrix, which is SW(5, L), and SW(3, K) and SW(4, K), which are two switches connected to C(2, K).

To operate the N:1 reconfigurable Dickson-Star SC regulator in the (N−2):1 conversion mode, three capacitors that are connected to $V_{IN}$ 202 through the fewest switches in the fifth switch sub-matrix can be tied together in parallel to work like a single capacitor. These three capacitors include, for example, one capacitor with the highest index in the first capacitor sub-matrix C(1, M) and two capacitors with the highest indices in the second capacitor sub-matrix (C(2, K), C(2, K−1)). This "single" capacitor can work similar to C(2, K−1) in an (N−2):1 fixed conversion mode Dickson-Star SC regulator—a Dickson-Star SC regulator that is identical to an N:1 fixed conversion mode Dickson-Star SC regulator without C(1, M) and C(2, K), the top two switches in the 5th switch matrix, which are SW(5, L) and SW(5, L−1), and SW(1,M), SW(2,M), SW(3,K), SW(4,K), which are switches connected to C(1,M) and C(2,K).

More generally, to operate the N:1 reconfigurable Dickson-Star SC regulator in the (N−R):1 conversion mode, "R+1" number of capacitors that are connected to $V_{IN}$ 202 through the fewest switches in the fifth switch sub-matrix can be tied together in parallel to work like a single capacitor, and the remaining switches can be operated as if operating the (N−R):1 fixed conversion mode Dickson-Star SC regulator.

Figure 16:
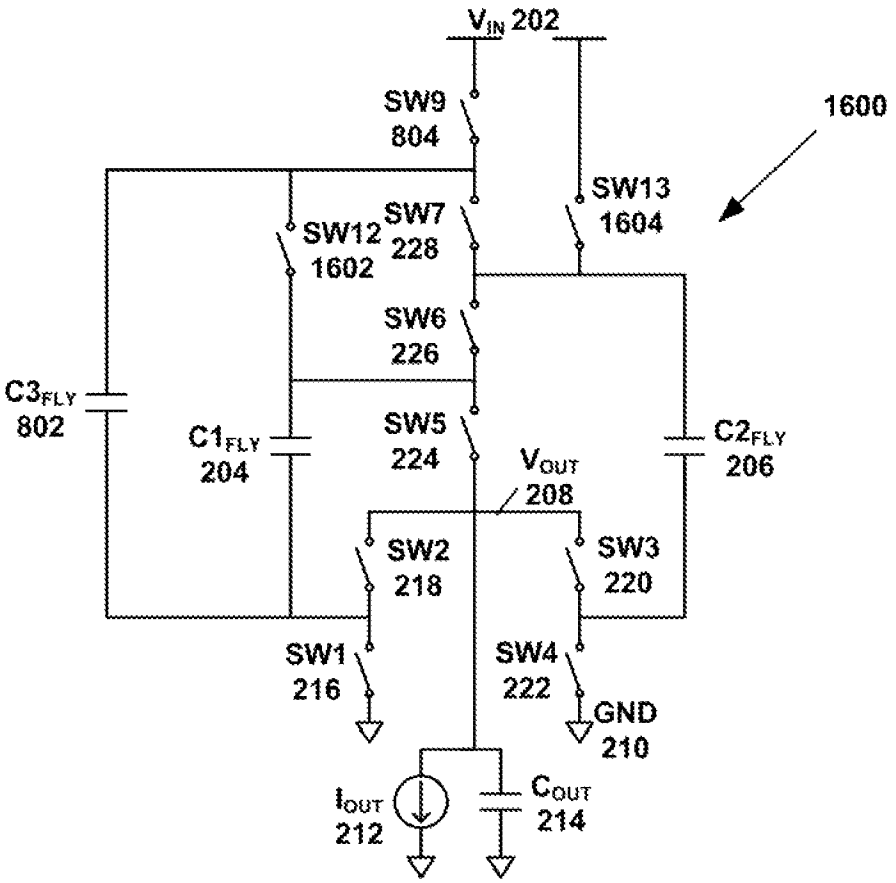
FIG. 16 illustrates an example of a 4:1 reconfigurable Dickson Star SC regulator in accordance with some embodiments.

In some embodiments, another topology of a Dickson Star SC regulator can enable reconfiguration between conversion modes. FIG. 16 illustrates a 4:1 reconfigurable Dickson Star SC regulator 1600 in accordance with some embodiments. 4:1 reconfigurable Dickson Star SC regulator 1000 in FIGS. 10-14 have two additional mode switches SW10 1002 and SW11 1004 compared to a fixed conversion mode 4:1 Dickson Star SC regulator 800 in FIG. 8. FIG. 16 illustrates a different type of 4:1 reconfigurable Dickson Star SC regulator, which uses two additional mode switches SW12 1602 and SW 13 1604 in different locations.

FIGS. 17A-17C illustrate the operation of a 4:1 reconfigurable Dickson Star SC regulator operating in the 4:1 conversion mode in accordance with some embodiments. Although the locations of mode switches are slightly different, the capacitor topology in State0 and State1 is the same as the regulator 1000 in FIGS. 11A-11B. Therefore, the relationships between voltages across capacitors in State0 and State1 in FIGS. 17A-17B are identical to the relationships between voltages across capacitors in State0 and State1 in FIGS. 11A-11B. As in FIGS. 11A-11B, assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{IN}202=V_{C3FLY}+V_{OUT}208 \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{C3FLY}=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}$$

$$V_{C3FLY}=3\times V_{OUT}$$

$$V_{OUT}=(1/4)\times V_{IN}$$

Therefore, the reconfigurable Dickson Star SC regulator illustrated in FIGS. 17A-17B operates as a 4:1 step-down Dickson Star SC regulator.

FIGS. 18A-18C illustrate the operation of a 4:1 reconfigurable Dickson Star SC regulator in the 3:1 conversion mode in accordance with some embodiments. The operating principle in the 3:1 conversion mode is similar to the 3:1 SC regulator illustrated in FIG. 2. The switching capacitors $C1_{FLY}$ 204 and $C3_{FLY}$ 802 are tied together in parallel to operate as a single large capacitor, similar to the capacitor $C1_{FLY}$ 204 in FIG. 2. The switching capacitor $C2_{FLY}$ 206 in FIGS. 18A-18B operates in a similar way as $C2_{FLY}$ 206 in FIG. 2.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C2FLY}=V_{C3FLY} \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{IN}202=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}208$$

$$V_{C3FLY}=2\times V_{OUT}208$$

$$V_{OUT}=(1/3)\times V_{IN}$$

Therefore, the reconfigurable Dickson Star SC regulator illustrated in FIGS. 18A-18C operates as a 3:1 step-down Dickson Star SC regulator.

FIGS. 19A-19C illustrate the operation of a 4:1 reconfigurable Dickson Star SC regulator when it is working in 2:1 mode in accordance with some embodiments. The basic principle is similar to the 4:1 reconfigurable Dickson Star SC regulator illustrated in FIGS. 13A-13B. The switching capacitors $C1_{FLY}$ 204, $C2_{FLY}$ 206, $C3_{FLY}$ 802 are tied in parallel to work like a single large capacitor, just like capacitors $C1_{FLY}$ 204, $C2_{FLY}$ 206, $C3_{FLY}$ 802 were tied in parallel to work like a single large capacitor in FIGS. 13A-13B.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202-V_{OUT}208 \quad \text{State0:}$$

$$V_{C1FLY}=V_{C2FLY}=V_{C3FLY}=V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=(1/2)\times V_{IN}$$

Therefore, the reconfigurable Dickson Star SC regulator illustrated in FIGS. 19A-19C operates as a 2:1 step-down Dickson Star SC regulator.

Figure 20B:
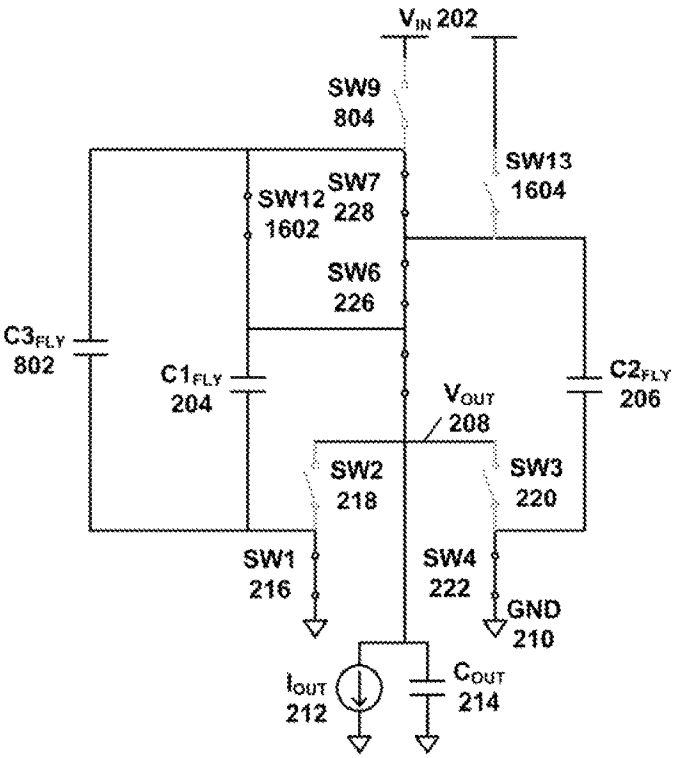
FIGS. 20A-20C illustrate an example of the operation of a 4:1 reconfigurable Dickson Star SC regulator in a 1:1 conversion mode in accordance with some embodiments.
Figure 20A:
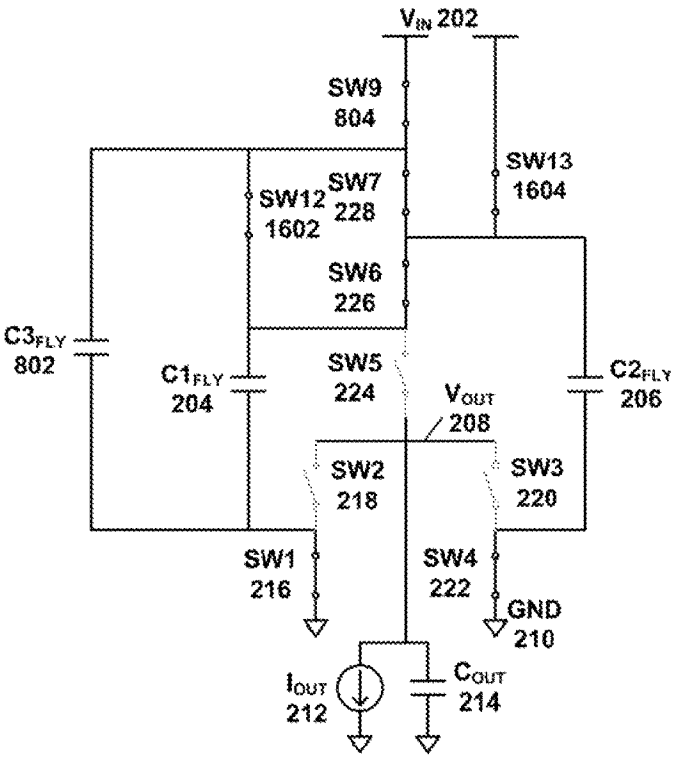
Figure 20C:
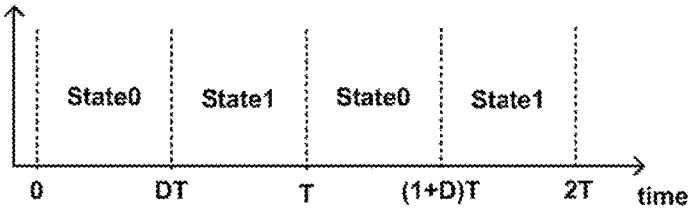

FIGS. 20A-20C illustrate the operation of a 4:1 reconfigurable Dickson Star SC regulator when it is working in 1:1 mode in accordance with some embodiments. The switching capacitors $C1_{FLY}$ 204, $C2_{FLY}$ 206, $C3_{FLY}$ 802 are tied in parallel to work like a single large capacitor, just like capacitors $C1_{FLY}$ 204, $C2_{FLY}$ 206, $C3_{FLY}$ 802 were tied in parallel to work like a single large capacitor in FIGS. 14A-14B.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202 \quad \text{State0:}$$

$$V_{C1FLY}=V_{C2FLY}=V_{C3FLY}=V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=V_{IN}$$

Therefore, the reconfigurable Dickson Star SC regulator illustrated in FIGS. 14A-14C operates as a 1:1 step-down Dickson Star SC regulator.

The regulators in FIGS. 10-14 and the regulators in FIGS. 16-20 use a mode switch matrix with switches located in different positions, but the eventual capacitor arrangements are identical. Therefore, reconfigurable regulator 1000 is functionally identical to reconfigurable regulator 1600.

Figure 21B:
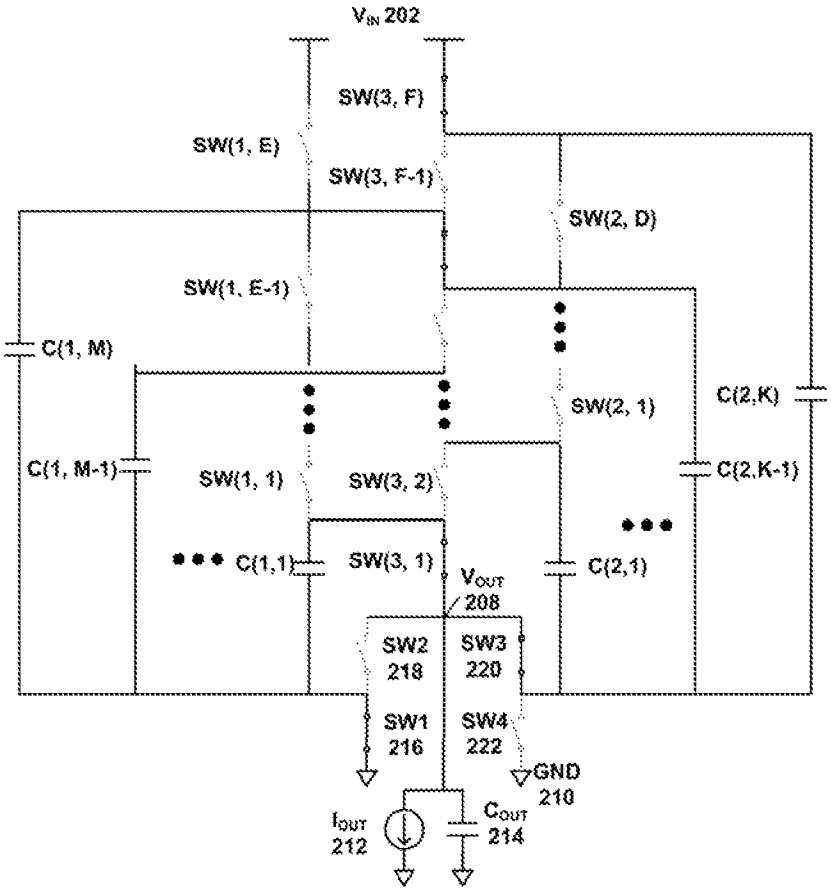
FIGS. 21A-21B illustrate an example of an N:1 reconfigurable Dickson Star SC regulator in accordance with some embodiments.
Figure 21A:
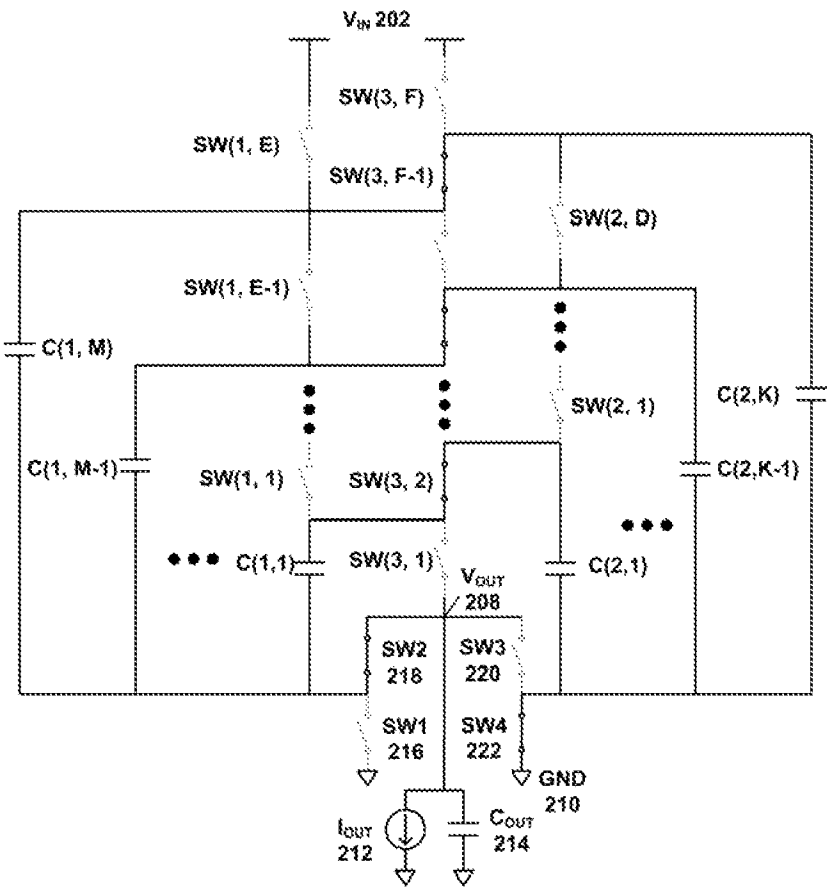

In some embodiments, 4:1 reconfigurable regulator 1600 can be generalized to provide an N:1 reconfigurable regulator where N is greater than one. FIGS. 21A-21C illustrate an N:1 reconfigurable Dickson-Star SC regulator 2100 operating in accordance with some embodiments.

N:1 reconfigurable Dickson-Star SC regulator 2100 can also include a capacitor matrix. The capacitor matrix can include a first capacitor sub-matrix and a second capacitor sub-matrix. The capacitors in the first capacitor sub-matrix are referred to as C(1, j), where the first index "1" refers to the "first" capacitor matrix, and the second index "j" refers to the $j^{th}$ capacitor in the first capacitor sub-matrix. Likewise, the capacitors in the second capacitor sub-matrix are referred to as C(2, j). In FIGS. 21A-21B, the first capacitor sub-matrix include M number of capacitors; and the second capacitor sub-matrix include K number of capacitors. In some embodiments, M is equal to floor(N/2), and K is equal to floor((N−1)/2).

In some embodiments, N:1 reconfigurable Dickson-Star SC regulator 2100 includes a switch matrix having a first switch sub-matrix, a second switch sub-matrix, and a third switch sub-matrix.

The switches in the first switch sub-matrix are referred to as SW(1, j), where the first index "1" refers to the "first" switch matrix, and the second index "j" refers to the $j^{th}$ switch in the first switch sub-matrix. Likewise, the switches in the second switch sub-matrix are referred to as SW(2, j), and the switches in the third switch sub-matrix are referred to as SW(3, j). In FIGS. 21A-21B, the first switch sub-matrix include E number of switches; the second switch sub-matrix include D number of switches; and the third switch sub-matrix include F number of switches. In some embodiments, E is equal to 2× ceiling(N/2)−1; D is equal to floor(N/2); and F is equal to N.

In some embodiments, a switch in the first switch sub-matrix connects two capacitors in the first capacitor sub-matrix. For example, C(1, p) and C(1, p+1) are connected through SW(1, p). Similarly, a switch in the second switch sub-matrix connects two capacitors in the second capacitor sub-matrix. For example, C(2, p) and C(2, p+1) are connected through SW(2, p). A switch in the third switch sub-matrix connects a capacitor in the first capacitor sub-matrix to a capacitor in the second capacitor sub-matrix. For example, C(1, p) and C(2, p) are connected through SW(3, 2×p), and C(1, p+1) and C(2, p) are connected through SW(3, 2×p+1).

In some embodiments, regulator 2100 can be duty-cycled between State0 and State1 by turning on and off switches in the switch matrix of the regulator 2100 as illustrated in FIGS. 21A and 21B.

FIGS. 21A-21B show the operation of N:1 reconfigurable Dickson Star SC regulator 2100 in the N:1 conversion mode in accordance with some embodiments. In State0, in the third switch sub-matrix, all odd indexed switches are off (i.e., open) while all even indexed switches are on (i.e., closed). Subsequently, in State1, all switch states in the third switch sub-matrix are inverted compared to State0. All switches in the first switch sub-matrix and all switches in the second switch sub-matrix side are turned off in both State0 and State1. While there are additional switches including the first and second switch matrices, since all those switches are turned off, the capacitor topologies are similar to the N:1 step-down Dickson Star in FIG. 35.

To operate the N:1 reconfigurable Dickson-Star SC regulator 2100 in the (N−1):1 conversion mode, the capacitor that is connected to $V_{IN}$ 202 through the fewest switches (or, put differently, closest to the input terminal) in the third switch sub-matrix, which is C(2,K) in FIGS. 21A-21B, and the capacitor that is in the same matrix but with a one lower index, which is C(2, K−1) in FIGS. 21A-21B, can be tied together in parallel to operate as a single capacitor. To keep the two capacitors tied into a "single" capacitor, SW(2,D) is always on in State0 and State1. This "single" capacitor can work similar to C(1, M) in an (N−1):1 fixed conversion mode Dickson-Star SC regulator—a Dickson-Star SC regulator that is identical to an N:1 fixed conversion mode Dickson-Star SC regulator without C(2, K), SW(3, F). Since C(2, K) is not independent in this mode (but works with C(2, K−1)), SW(3, F−1) is turned off in both State0 and State1. C(1, M) acts as the top capacitor, so SW(1, E) acts like the top switch, and SW(3, F) is turned off in both State0 and State1. To summarize, SW(2, D) is always on in State0 and State1, SW(3, F−1) and SW(3, F) are always off in State0 and State1, and SW(1, E) switches on and off in State0 and State1, respectively.

To operate the N:1 reconfigurable Dickson-Star SC regulator in the (N−2):1 conversion mode, three capacitors that are connected to $V_{IN}$ 202 through the fewest switches can be tied together in parallel to work like a single capacitor. In FIGS. 21A-21B, these three capacitors are C(2,K), C(1,M), and C(2,K−1). This "single" capacitor can work similar to C(2, K−1) in an (N−2):1 fixed conversion mode Dickson-Star SC regulator—a Dickson-Star SC regulator that is identical to an N:1 fixed conversion mode Dickson-Star SC regulator without C(2, K), C(1,M), SW(3, F), SW(F−1). To keep the three capacitors tied as a "single" capacitor, SW(2, D), SW(3, E−1) are always on in State0 and State1. Since C(2, K) and C(1, M) do not exist independently anymore, SW(3, F−1) and SW(3, F−2) are turned off in both State0 and State1. C(2, K−1) acts as the top capacitor, so SW(3, F) acts like the top switch, and SW(1, E) is turned off in both State0 and State1. To summarize, SW(2, D) and SW(1, E−1) are always on in State0 and State1, SW(3, F−1), SW(3, F−2), SW(1, E) are always off in State0 and State1, and SW(3, F) switches off and on in State0 and State1, respectively.

More generally, to operate the N:1 reconfigurable Dickson-Star SC regulator in the (N−R):1 conversion mode, "R+1" number of capacitors that are connected to $V_{IN}$ 202 through the fewest switches in the third switch sub-matrix can be tied together in parallel to work like a single capacitor, and operate the remaining switches as if operating the (N−R):1 fixed conversion mode Dickson-Star SC regulator.

In some embodiments, the control module is configured to perform the following switch operations to operate the N:1 reconfigurable Dickson-Star SC regulator in the (N−R):1 conversion mode. The control module is configured to turn on the top "R" number of switches in the first and second matrices (e.g., R switches that are closest to the input voltage terminal, or, put another way, R switches that have fewest number of switches between them and the input voltage terminal), excluding the top switch in the first switch sub-matrix SW(1, E) that is directly connected to the input voltage terminal. When a first switch in a first switch sub-matrix and a second switch in a second switch sub-matrix have the same number of switches between them and the input voltage terminal and only one of them can be included in the set of R switches, then the second switch in the second switch sub-matrix would be selected. For example, if R is equal to 3, SW(2, D), SW(1, E−1), SW(2, D−1) are selected as the "3" switches closest to the input voltage terminal. The control module is configured to keep the R switches turned on in both State0 and State1 to tie the top 3 capacitors in parallel.

Also, the control module is configured to turn off the top "R" number of switches in the third switch matrix (e.g., R number of switches that are closest to the input voltage terminal, or, put another way, R number of switches that have the fewest number of switches between them and the input voltage terminal), excluding the top switch SW(3, F) in the third switch sub-matrix that is connected to the input voltage terminal. For example, if R is equal to 3, SW(3, F−1), SW(3, F−2), SW(3, F−3) are always off in State0 and State1.

Also, when R is an odd number, the control module is configured to turn off the top switch SW(3, F) in the third switch sub-matrix and operate the top switch SW(1, E) in the first switch sub-matrix as if the top switch SW(1, E) in the first switch sub-matrix is the top switch of the third switch sub-matrix.

In some embodiments, when R is an even number, the control module is configured to turn off the top switch SW(1, E) in the first switch sub-matrix and operate the top switch SW(3, F) in the third switch sub-matrix as if the top switch SW(3, F) in the third switch sub-matrix is the top switch of the first switch sub-matrix.

In some embodiments, the state of the top switch is inverted compared to the top most switch in the third switch matrix that is not always off. For example, if R is equal to 3, since R is an odd number, SW(3, F) is turned off. Also, SW(3, F−1), SW(3, F−2), SW(3, F−3) are always off. Therefore, the top switch, which is SW(1, E), is in a state that is inverted compared to SW(3, F−4), the top most switch in the third switch matrix that is not always off.

In some embodiments, the reconfigurable Dickson-Star SC regulator can be operated as a part of a voltage regulator system. The voltage regulator system can operate in multiple interleaved phases (e.g., in a time-interleaved manner over a single period), and the reconfigurable Dickson-Star SC regulator can be used to provide an output voltage in one of the interleaved phases. For example, a voltage regulator system can include three reconfigurable Dickson-Star SC regulators that each operate 0 degrees, 120 degrees, 240 degrees out of phase, respectively.

In some embodiments, the reconfigurable Dickson-Star SC regulator can be used for various applications including power management integrated circuits (PMICs), battery chargers, LED drivers, envelope tracking power amplifiers.

In some embodiments, the capacitance of switching capacitors (e.g., $C1_{FLY}$ 204, $C2_{FLY}$ 206, and $C3_{FLY}$ 802) can be set to be proportional to an output current of a reconfigurable Dickson-Star SC regulator. For example, the capacitance of switching capacitors can be in the range of 0.1 nF/mA and 100 nF/mA, depending on the target power efficiency. A reconfigurable Dickson-Star SC regulator can improve its efficiency by using larger capacitance values in some embodiments.

In some embodiments, a reconfigurable Dickson-Star SC regulator can be operated in a reverse configuration (e.g., the input node and the output node of the reconfigurable Dickson-Star SC regulator are switched.) The operational direction of the reconfigurable Dickson-Star SC regulator can be flexibly modified to accommodate various types of input voltage sources and output loads coupled to the input node and the output node of the reconfigurable Dickson-Star SC regulator.

In some embodiments, a reconfigurable Dickson-Star SC regulator can be operated in a reverse direction to operate it as a step-up regulator. For example, an input node of the reconfigurable Dickson-Star SC regulator can be coupled to a target load (e.g., a chip) and an output node of the reconfigurable Dickson-Star SC regulator can be coupled to an input voltage source (e.g., a battery).

Figure 22:
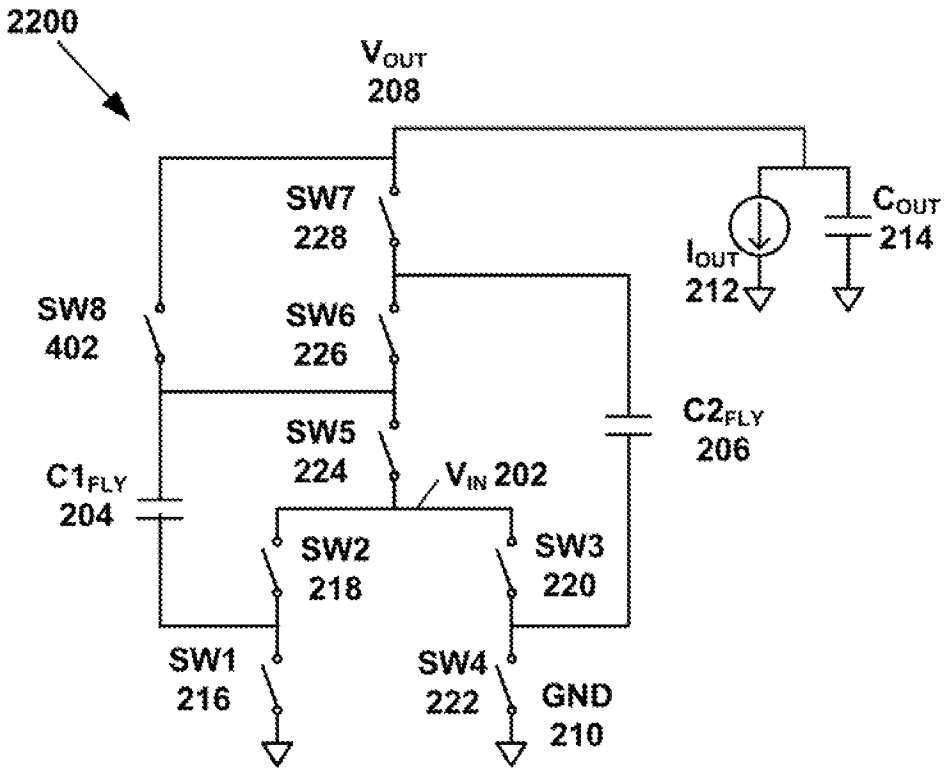
FIGS. 22-24 illustrate an example of step-up reconfigurable Dickson-Star SC regulators in accordance with some embodiments.
Figure 23:
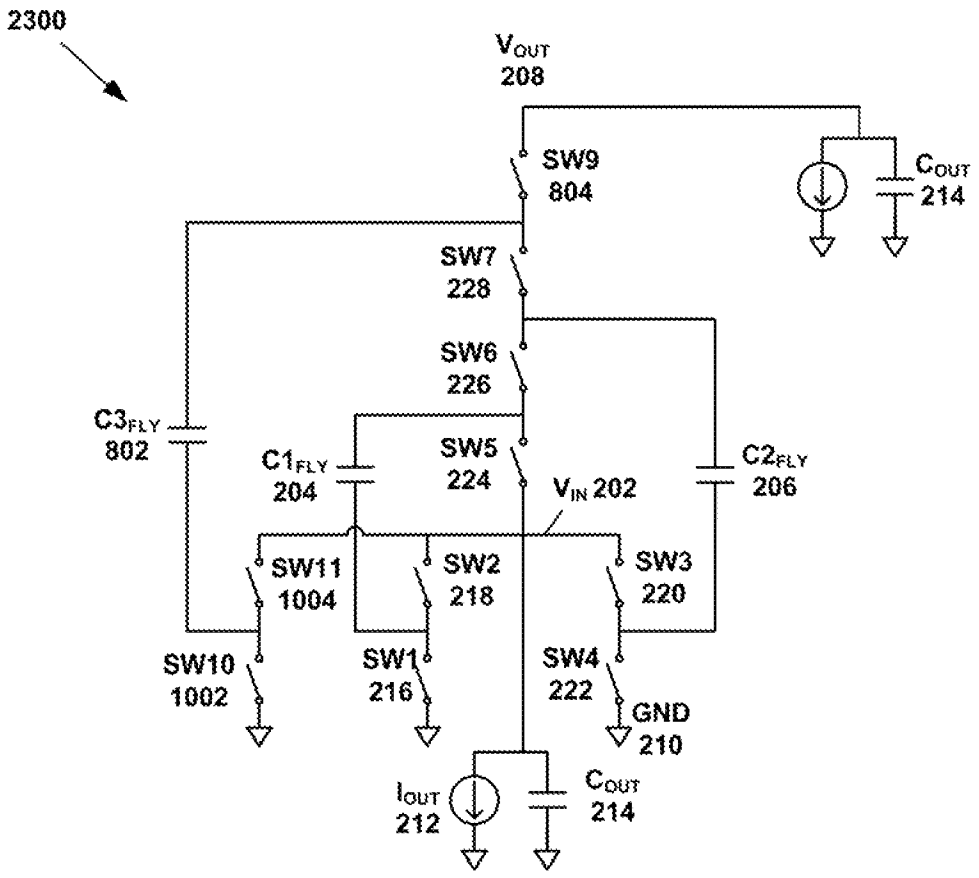
Figure 24:
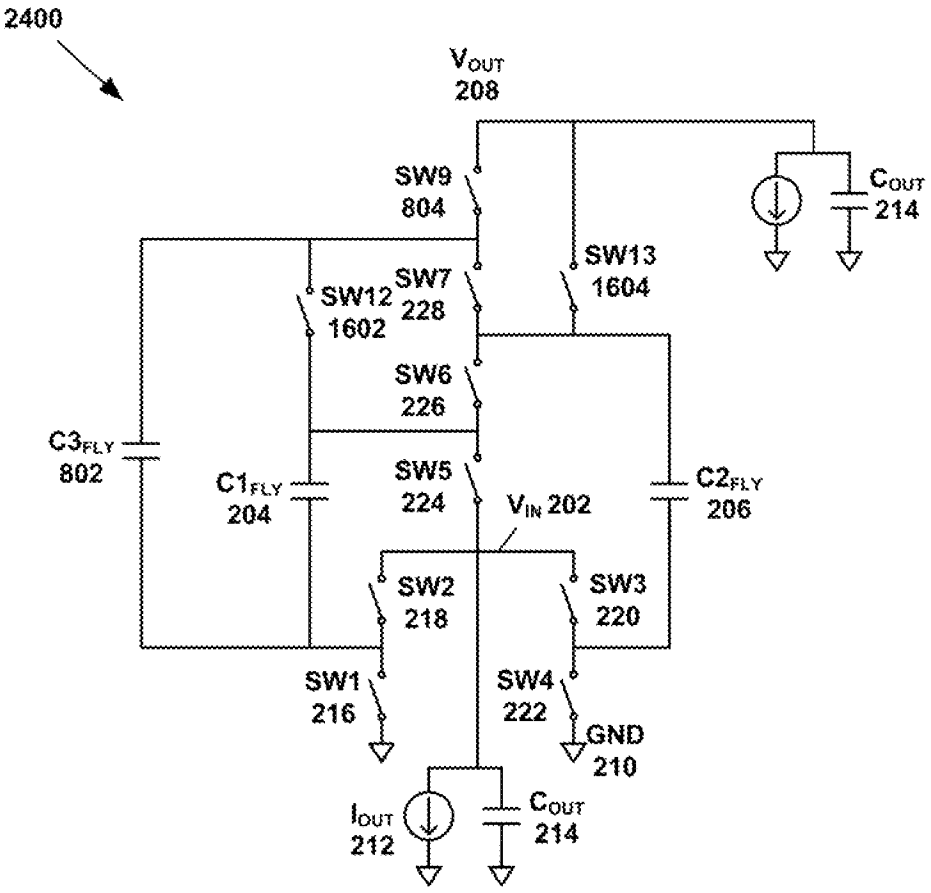

FIGS. 22-24 illustrate step-up reconfigurable Dickson-Star SC regulators 2200, 2300, and 2400, respectively, in accordance with some embodiments. Regulator 2200 is a step-up reconfigurable 1:3 Dickson-Star SC regulator; regulator 2300 is a step-up reconfigurable 1:4 Dickson-Star SC regulator; and regulator 2400 is a step-up reconfigurable 1:4 Dickson-Star SC regulator. The step-up reconfigurable Dickson-Star SC regulators in FIGS. 22-24 are similar to the step-down regulators in FIGS. 6, 10, and 16, respectively, except that the location of $V_{IN}$ 202 and $V_{OUT}$ 208 are swapped and $V_{IN}$ 202 is lower than $V_{OUT}$ 208.

In some embodiments, a reconfigurable Dickson-Star SC regulator can be operated in a reverse direction to operate as a battery charger. For example, an input node of the reconfigurable Dickson-Star SC regulator can be coupled to a power source, e.g., a power line of a Universal Serial Bus (USB), and an output node of the reconfigurable Dickson-Star SC regulator can be coupled to a battery so that the output voltage and the output current of the reconfigurable Dickson-Star SC regulator are used to charge the battery.

In some embodiments, the reconfigurable Dickson-Star SC regulator can be particularly useful in charging batteries in a handheld device. A handheld device, such as a smartphone, can use a Lithium-Ion (Li-Ion) battery that is configured to provide a voltage output within the range of approximately 2.8-4.3V, depending on whether the battery is charged or not (e.g., 4.3V when fully charged, 2.8V when fully discharged). The Li Ion battery in the handheld device can be charged using a Universal Serial Bus (USB). The current version of the USB power line uses 5V (and the future versions of the USB may use even higher voltages), which is higher than the voltage output of the Li Ion battery. Therefore, the voltage from the USB power line should be stepped down before it can be used to charge the Li Ion battery. To this end, the reconfigurable Dickson-Star SC regulator can be configured to receive the power line voltage (and current) from the USB and provide a step-down version of the power line voltage (and current) to the Li-Ion battery so that the Li-Ion battery can be charged based on the voltage and current from the USB.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the reconfigurable Dickson-Star SC regulator can operate in a step-up configuration to step-up the output voltage of the battery to that of the USB power line. This way, the battery in the first device can charge the battery in the second device over the USB power line.

Figure 25:
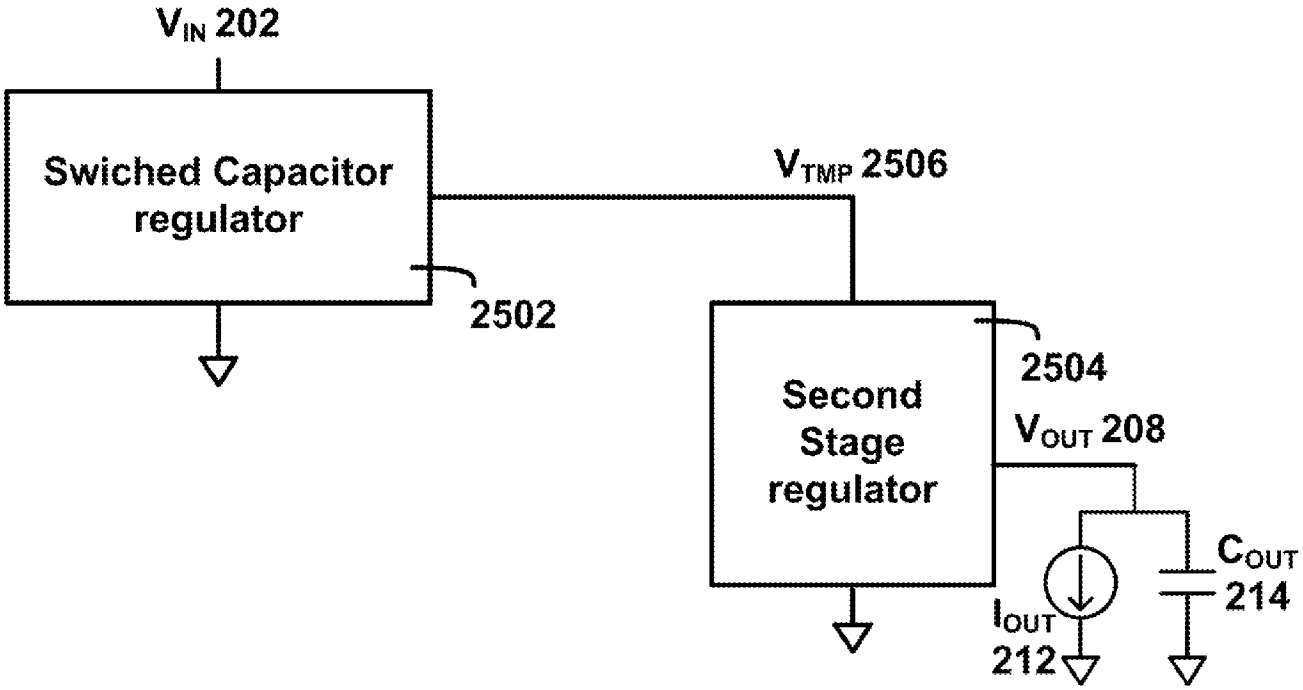
FIG. 25 illustrates an example of a two-stage voltage regulation system in which an SC regulator provides the first stage voltage regulation in accordance with some embodiments.

In some embodiments, an SC regulator, such as a reconfigurable Dickson-Star SC regulator, can be operated in conjunction with another voltage regulator to provide a two-stage voltage regulation. FIG. 25 illustrates a two-stage voltage regulation system in which an SC regulator provides the first stage voltage regulation in accordance with some embodiments. FIG. 25 includes a regulator 2502 and a second-stage voltage regulator 2504. The SC regulator 2502 can be any type of SC regulator, including, for example, one of reconfigurable Dickson-Star SC regulators disclosed herein. In some embodiments, the second-stage voltage regulator 2504 can include one or more of a buck regulator, an SC regulator, a linear regulator, and/or any types of voltage regulators capable of providing voltage regulation.

In some embodiments, the SC regulator 2502 can be operated to provide an output voltage at which the SC regulator 2502 can provide a high efficiency, and subsequently regulate the output voltage of the SC regulator 2502 using the second stage regulator 2504.

For example, the reconfigurable Dickson-Star SC regulator 2502 can convert the input voltage 202 to $V_{TMP}$ 2506, which is a fraction of the input voltage 202 at which the reconfigurable Dickson-Star SC regulator 2502 can provide high efficiency. For example, $V_{TMP}$ 2506 can be $V_{IN}/N$, where N is the step-down ratio. Then the second stage voltage regulator 2504 can receive $V_{TMP}$ 2506 and regulate it to provide $V_{OUT}$ 208.

Figure 26A:
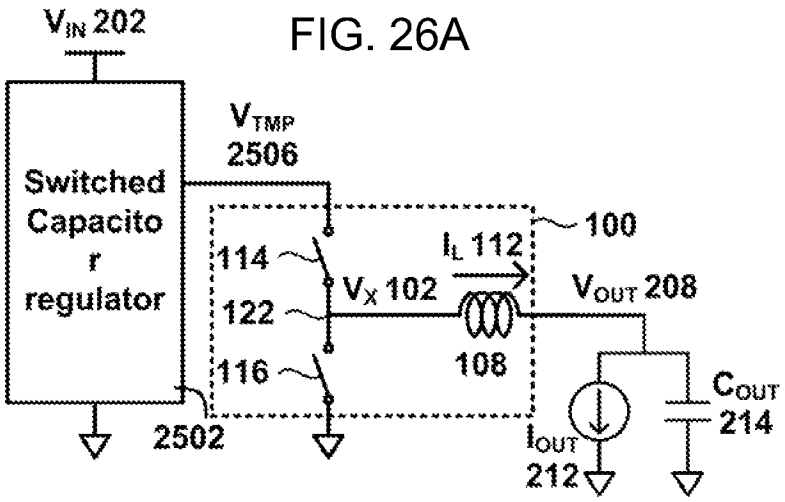
FIGS. 26A-26B illustrate an example of an embodiment of FIG. 25 in which the second stage regulator is a buck converter in accordance with some embodiments.
Figure 26B:
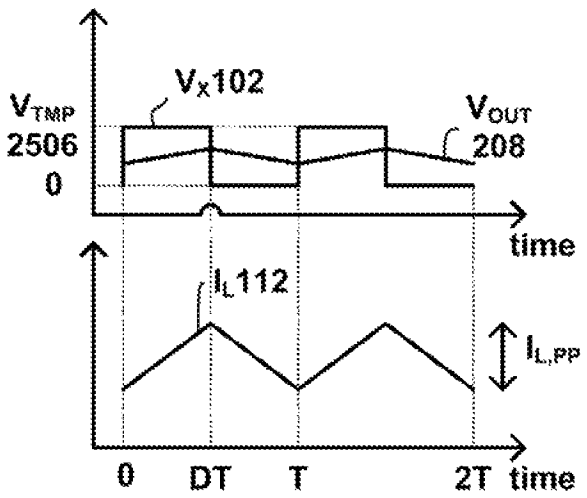

FIG. 26A illustrates an embodiment of FIG. 25 in which the second stage regulator is a buck converter 100 in accordance with some embodiments. Here, $V_{TMP}$ 2506 is regulated by buck converter 100 in fine steps using multiple power switches 114, 116 and one or more inductors 108. FIG. 26B illustrates the timing diagram of signals in the regulator.

The two-stage regulator illustrated in FIGS. 25-26, also referred to as a hybrid regulator, hinges on the fact that SC regulators are good at dividing voltages across predetermined fractional values and that the second stage regulators, such as buck regulators, can be good at regulating across a wide range of output voltage in fine steps. For example, in a 12V-to-1V step-down regulator, the reconfigurable Dickson-Star SC regulator 2502 can receive 12V at $V_{IN}$ 202 and provide a ⅙ step-down, thereby providing 2V at $V_{TMP}$ 2506. Subsequently, the buck regulator 100 can provide a subsequent regulation to regulate 2V to 1V. Since this two-stage regulator reduces the voltage swing at the internal node Vx of buck regulator 100 to $V_{TMP}$ 2506, which can be substantially less than $V_{IN}$ 202, this topology can reduce the capacitive power loss in the buck regulator 100 due to the parasitic capacitance at junction 122.

Figure 27:
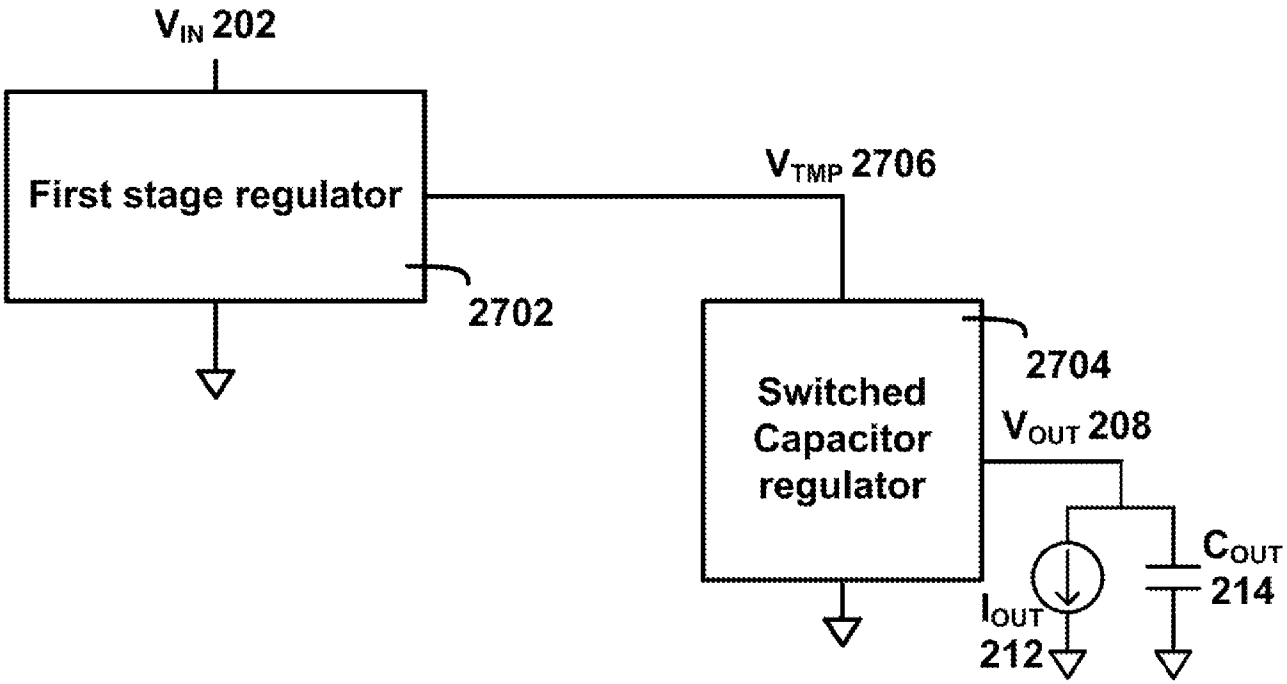
FIG. 27 illustrates an example of a two-stage voltage regulation system in which an SC regulator provides the second stage voltage regulation in accordance with some embodiments.

FIG. 27 illustrates a two-stage voltage regulation system in which an SC regulator provides the second stage voltage regulation in accordance with some embodiments. FIG. 27 includes a first stage voltage regulator 2702 and an SC regulator 2704. SC regulator 2704 can be any type of SC regulator, including, for example, one of the reconfigurable Dickson-Star SC regulators disclosed herein. In some embodiments, the first stage voltage regulator 2702 can include one or more of a buck regulator, an SC regulator, a linear regulator, and/or any types of voltage regulators capable of providing voltage regulation.

In FIG. 27, first stage regulator 2702 receives an input voltage $V_{IN}$ 202, and provides as output $V_{TMP}$ 2706 to SC regulator 2704. SC regulator 2704 can subsequently step-down $V_{TMP}$ 2706 to the desired output voltage 208.

When first stage regulator 2702 is a switched inductor regulator, the two-stage voltage regulation system of FIG. 27 can reduce the inductor resistive loss of the switched inductor regulator by operating the switched inductor regulator at a high switching frequency and with a small amount of current flow through the inductor. This approach can reduce the resistive loss of the switched inductor regulator even with a small inductor with a low inductance. Furthermore, this topology can also reduce the capacitive loss ($CV^2f$ loss) of the switched inductor regulator by limiting the voltage swing across the switches.

Figure 28A:
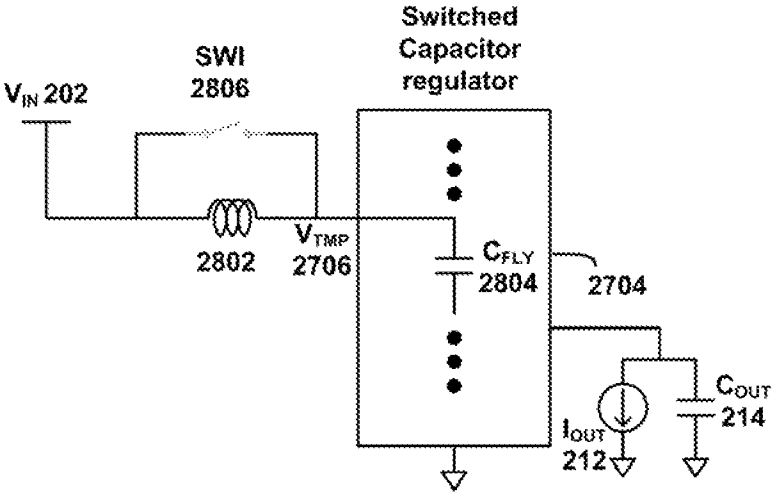
FIGS. 28A-28B illustrate an example of a two-stage voltage regulator in which the first stage regulator consists of an inductor in accordance with some embodiments.
Figure 28B:
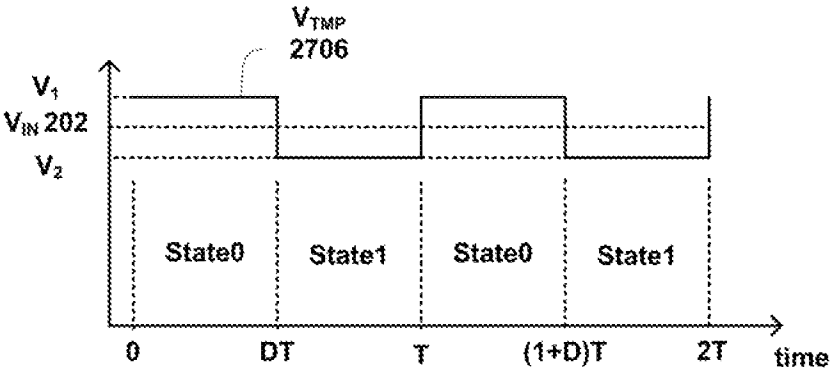

In some embodiments, first stage regulator 2702 can include only an inductor. FIG. 28A illustrates a two-stage voltage regulator in which the first stage regulator consists of an inductor in accordance with some embodiments. FIG. 28B illustrates a timing diagram of signals in the two-stage voltage regulator of FIG. 28A in accordance with some embodiments. Here, the first stage regulator is a single inductor 2802. One terminal of the inductor 2802 is coupled to the input voltage $V_{IN}$ 202, and the other terminal of the inductor 2802 is coupled to an input of SC regulator 2704. The input voltage to the SC regulator 2704 is referred to as $V_{TMP}$ 2706.

In some embodiments, input voltage $V_{TMP}$ 2706 of SC regulator 2704 is connected to one of the plates of a switching capacitor $C_{FLY}$ 2804 in SC regulator 2704. As SC regulator 2704 switches between State0 and State1 (see, e.g., FIGS. 3A-3B), voltage potential $V_{TMP}$ 2706 on the top plate of switching capacitor $C_{FLY}$ 2804 is switched between two voltages $V_1$ and $V_2$. Based on this operation, the following relationship can be derived:

$$V_{IN}202=V_1D+V_2(1-D)$$

The value of $V_1$ and $V_2$ are set by the conversion ratio of SC regulator 2704 and $V_{OUT}$ 208. As a result, the conversion ratio between $V_{IN}$ 202 and $V_{OUT}$ 208 can be finely controlled based on the duty cycle D and the conversion ratio of SC regulator 2704. The advantage of the two-stage regulator in FIG. 28 is that a single-stage SC regulator 2704, which can only provide integer-ratio conversion modes, can be converted into a two-stage regulator capable of providing non-integer-ratio conversion modes, simply by adding a single inductor 2802.

In some embodiments, the two-stage regulator may have a by-pass switch SWI 2806 that is configured to short the inductor 2802 in the first-stage regulator. The by-pass switch SWI 2806 allows the first-stage regulator to be turned off in case its operation is not needed.

Figure 29B:
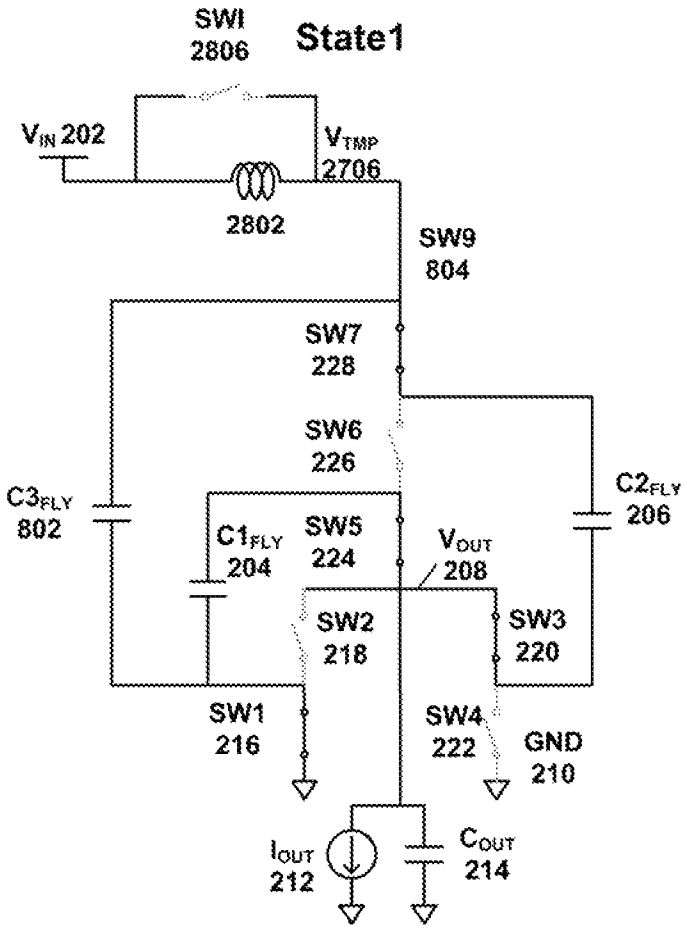
FIGS. 29A-29B illustrate an example of the operation of the two-stage regulator in FIG. 28 in which the SC regulator is a 4:1 Dickson Star switched-capacitor (SC) regulator in accordance with some embodiments.
Figure 29A:
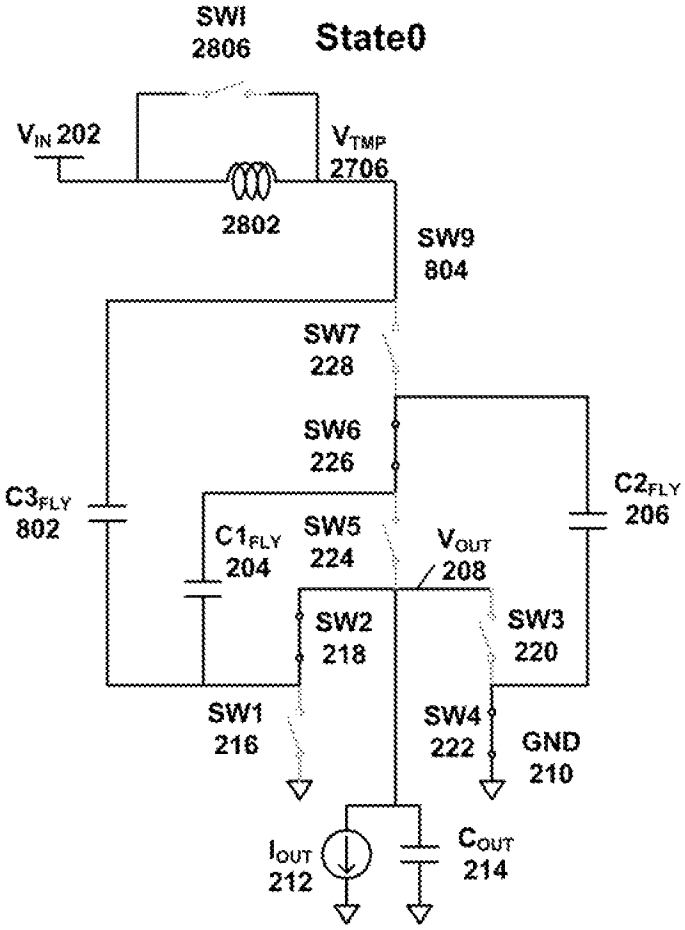

FIGS. 29A-29B illustrate the operation of the two-stage regulator in FIG. 28 in which SC regulator 2704 is a 4:1 Dickson Star switched-capacitor (SC) regulator 800 (like regulator 800 of FIG. 8) in accordance with some embodiments.

In some embodiments, second stage 4:1 regulator 800 is duty-cycled between State0 and State1 to provide voltage regulation, as is also illustrated in FIGS. 9A-9B. Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{TMP}2706=V_{C3FLY}+V_{OUT}208 \quad \text{State0:}$$

$$V_{C2FLY}=V_{C1FLY}+V_{OUT}208 \quad \text{State0:}$$

$$V_{OUT}208=V_{C1FLY} \quad \text{State1:}$$

$$V_{C3FLY}=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C3FLY}$ is a voltage across the third switching capacitor $C3_{FLY}$ 802. These relationships can be reorganized as follows:

$$V_{C2FLY}=2\times V_{OUT}$$

$$V_{C3FLY}=3\times V_{OUT}$$

$$V_{OUT}=(1/4)\times V_{TMP}$$

Figure 30:
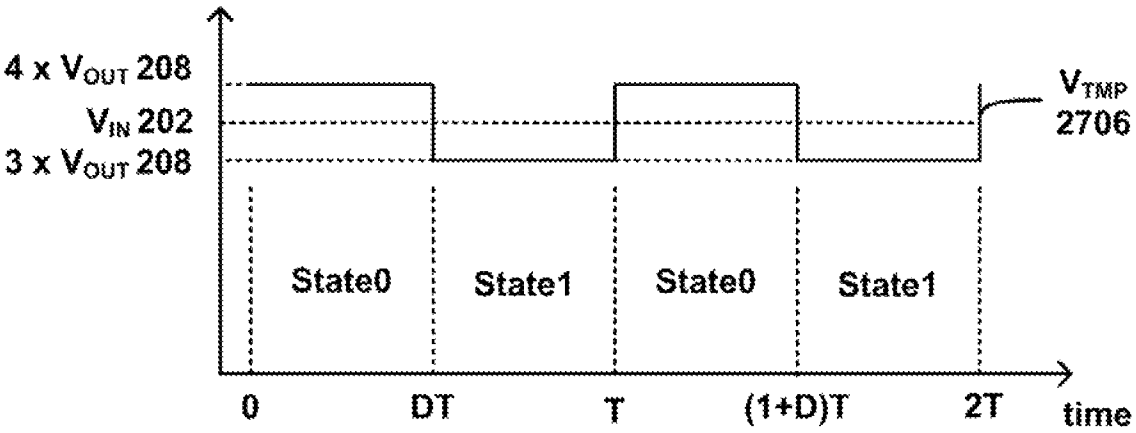
FIG. 30 illustrates an example of the duty-cycling of the second stage regulator and the voltage swing of $V_{TMP}$ in accordance with some embodiments.

Therefore, the second stage SC regulator operates as a 4:1 step-down regulator, and $V_{TMP}$ 2706 swings between $3\times V_{OUT}$ and $4\times V_{OUT}$ in State0 and State1. The duty-cycling of the second stage regulator, as well as the voltage swing of $V_{TMP}$ 2706 is illustrated in FIG. 30.

Since $V_{TMP}$ 2706 swings between $3\times V_{OUT}$ and $4\times V_{OUT}$, this voltage swing is regulated by the inductor 2802 to provide the following relationship:

$$V_{IN}202=(3\times V_{OUT})D+(4\times V_{OUT})(1-D)=(4-D)\times V_{OUT}$$

where D is a value between 0 and 1, and preferably between 0.25 and 0.75. In other words, the two-stage regulator in FIG. 29 allows for the following voltage relationship:

$$V_{OUT}=(1/(4-D))V_{IN}$$

Therefore, a voltage regulator control system can control the duty cycle D between 0 and 1 to fine-tune the relationship between $V_{IN}$ 202 and $V_{OUT}$ 208 beyond integer conversion ratios. In some sense, the first stage regulator and the second stage regulator in FIG. 28 have an identical duty cycle D.

Figure 31:
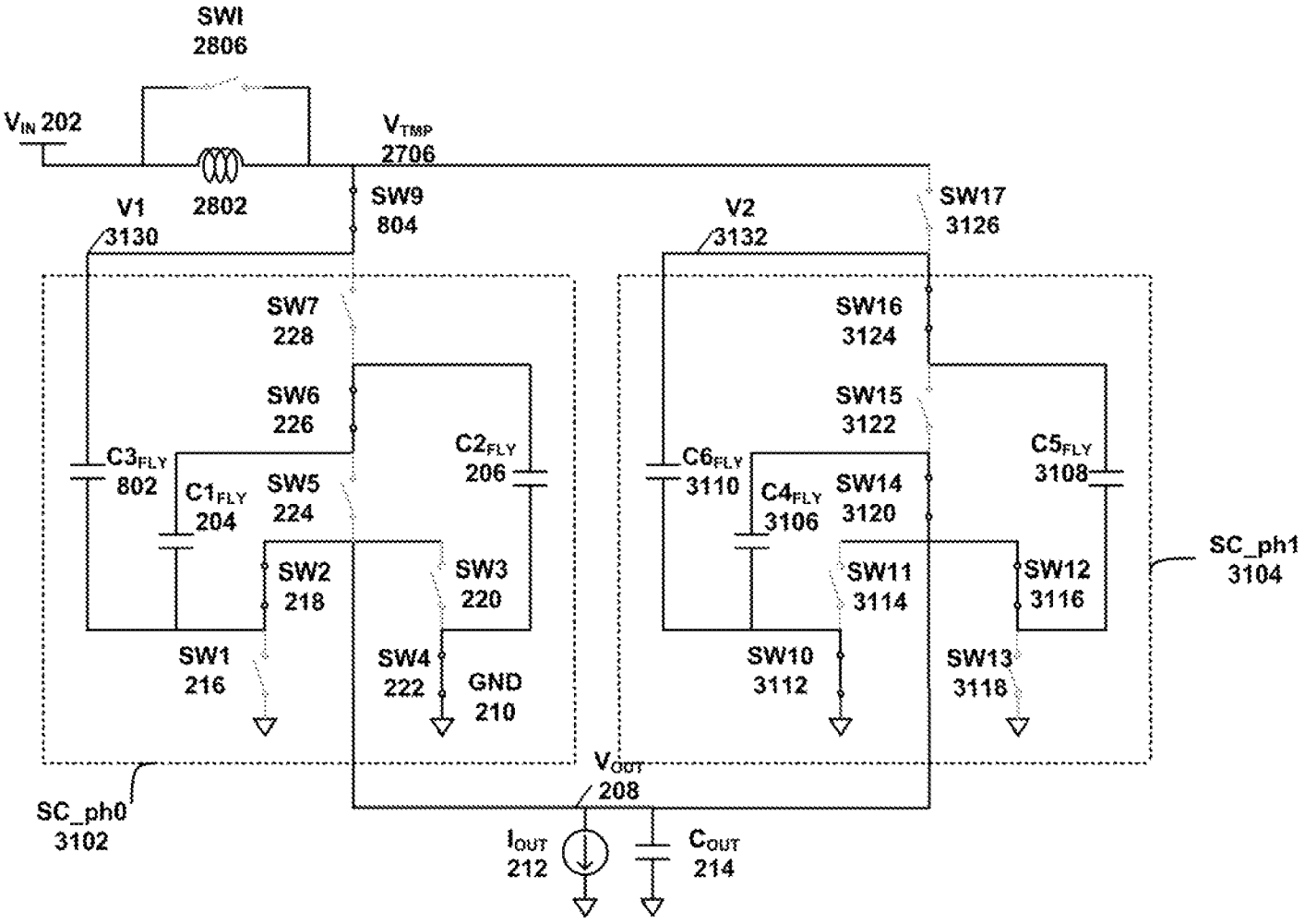
FIG. 31 illustrates an example of a two-stage voltage regulation system in which the second stage regulator is a multi-phase voltage regulator in accordance with some embodiments.

FIG. 31 illustrates a two-stage voltage regulation system in which the second stage regulator is a multi-phase voltage regulator in accordance with some embodiments. The multi-phase voltage regulator in the second stage regulator allows the first stage regulator and the second stage regulator to use independent duty cycles. This may be beneficial in some cases because the efficiency of an SC regulator may degrade when the duty-cycle of the SC regulator deviates from 0.5. By allowing the first stage regulator and the second stage regulator to have independent duty cycles, the second stage regulator can be operated at a high efficiency level (e.g., close to a duty cycle of 0.5) regardless of the desired output voltage of the voltage regulation system.

Figure 32:
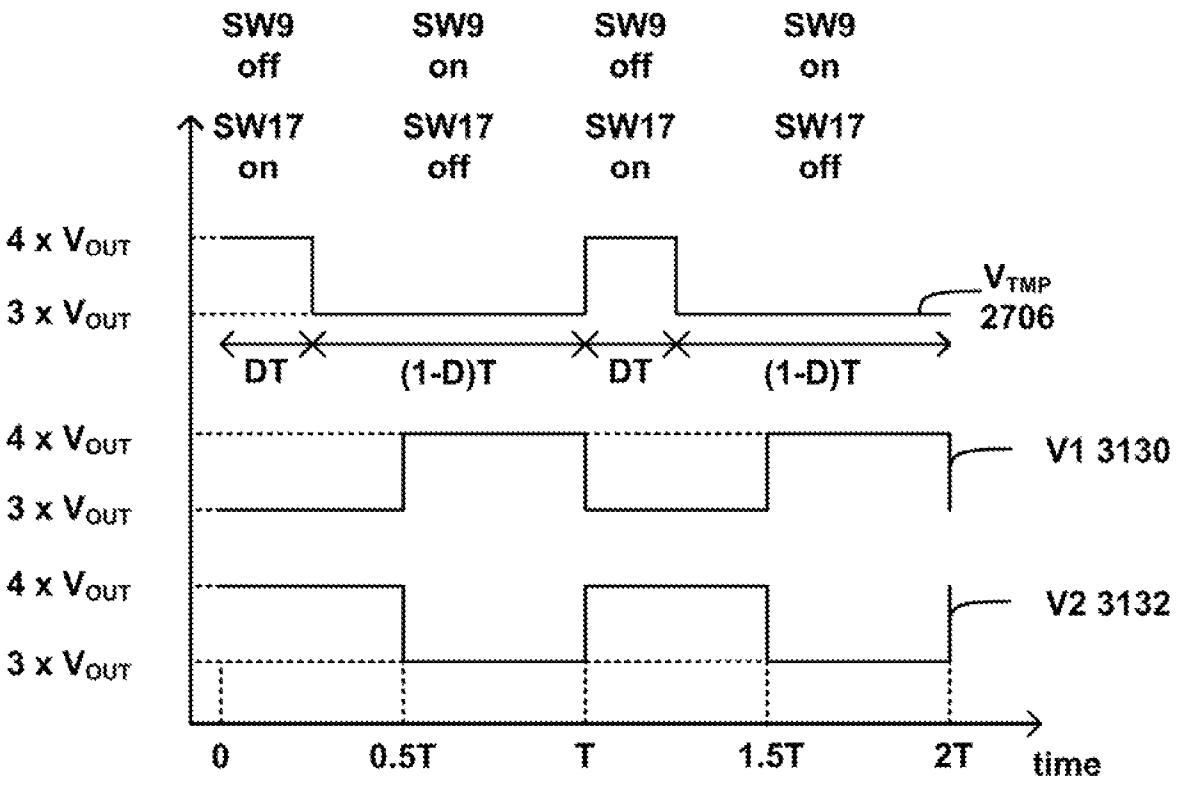
FIG. 32 illustrates an example of the phase relationship between switch capacitors in FIG. 31 in accordance with some embodiments.

As shown in FIG. 31, in some embodiments, the second stage SC regulator has two 4:1 SC regulator modules, SC_ph0 3102 and SC_ph1 3104, where SC_ph0 3102 and SC_ph1 3104 operate with their own phases. In some embodiments, the two SC regulator modules may be 180 degrees out of phase. The phase relationship between SC_ph0 3102 and SC_ph1 3104 is illustrated in FIG. 32 in accordance with some embodiments. In FIG. 32, the two 4:1 SC regulator modules operate at a duty cycle of 0.5, thereby achieving high efficiency.

While the two 4:1 SC regulator modules operate at a duty cycle of 0.5, the duty cycle of the switched-inductor regulator in the first stage regulator can be independently controlled. In particular, the switched-inductor regulator can have its own duty cycle D by switching switches SW9 804 and SW17 3126 out of phase at a duty cycle D, irrespective of the duty cycle of the two 4:1 SC regulator modules.

For example, when both modules SC_ph0 3102 and SC_ph1 3104 operate at a duty cycle of 0.5, voltages V1 3130 and V2 3132 at the top plate of $C3_{FLY}$ 802 and C6FLY 3110 swing between $3\times V_{OUT}$ 208 and $4\times V_{OUT}$ 208 at a duty cycle of 0.5, as illustrated in the waveforms of FIG. 32. Since the voltages V1 3130 and V2 3132 at the top plate of $C3_{FLY}$ 802 and C6FLY 3110 swing between $3\times V_{OUT}$ 208 and $4\times V_{OUT}$ 208 at any given time, the switches SW9 804 and SW17 3126 can turn on and off (out of phase) at a duty cycle D to connect $V_{TMP}$ 2706 to either $3\times V_{OUT}$ 208 or $4\times V_{OUT}$ 208 at a duty cycle D, as shown in FIG. 32. This allows the first stage regulator to operate at a duty cycle D, while the second stage regulator (including the two 4:1 SC regulator modules, SC_ph0 3102 and SC_ph1 3104) operates at a duty cycle of 0.5, thereby improving the operating efficiency of the second stage regulator.

When the switches SW9 804 and SW17 3126 are duty-cycled at a duty cycle of D, the amount of time that one particular SC module is used can depend on the duty cycle D. For example, in FIG. 32, the duty cycle D is less than 0.5. Therefore, the first SC module 3102 is used less than 50% of the time while the second SC module 3104 is used more than 50% of the time. In an extreme case, one SC module could be used 100% of the time while the other SC module is used 0% of the time. To accommodate such extreme scenarios, all switches and capacitors in the two SC modules 3102, 3104 may need to be sized sufficiently large so that a single SC module can deliver the maximum required output power—as if the other SC module does not exist.

In some embodiments, the switches SW9 804 and SW17 3126 can be controlled such that each switch SW9 804 and SW17 3126 is turned on for the same amount of time while maintaining the duty cycle of the first stage regulator. This way, the SC modules in the multi-phase regulator (the second stage regulator) are used the same amount of time regardless of the duty cycle of the first stage regulator. This allows the switches and capacitors in the SC modules to be about half the size compared to the scenario in which a single SC module needs to be able to deliver the maximum required output power.

Figure 33:
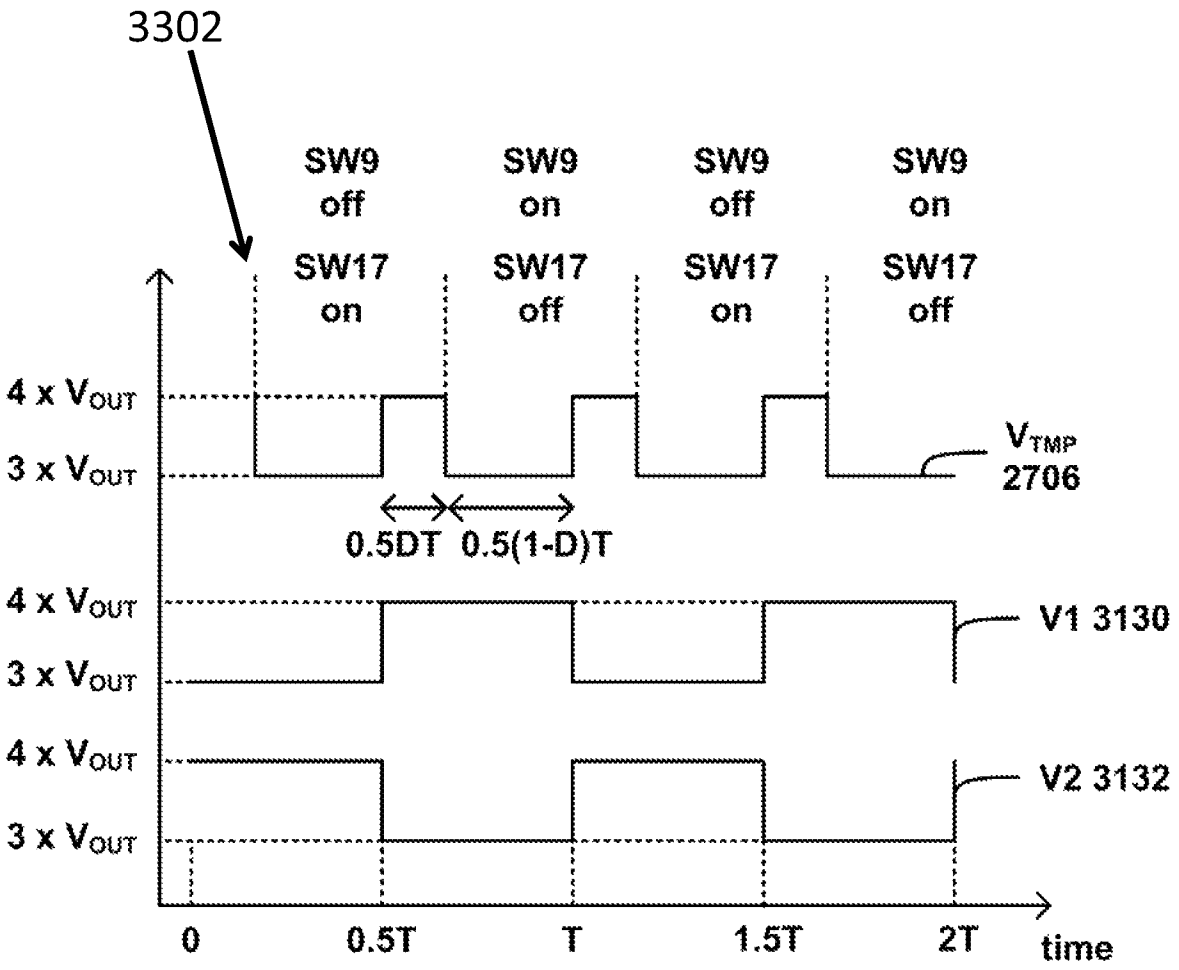
FIG. 33 illustrates an example of a control sequence of switches that allows maintaining the duty cycle of the first stage regulator in accordance with some embodiments.

FIG. 33 illustrates the control sequence of switches that allows each switch SW9 804 and SW17 3126 to be turned on for the same amount of time while maintaining the duty cycle of the first stage regulator in accordance with some embodiments. In a given period, first switch SW9 804 is turned on 50% of the time while keeping second switch SW17 3126 turned off, and second switch SW17 3126 is turned on 50% of the time while keeping first switch SW9 804 turned off. However, the time instance at which the period starts is determined such that the voltage $V_{TMP}$ 2706 swings between $3\times V_{OUT}$ and $4\times V_{OUT}$ at a duty cycle D.

For example, when SW9 804 is turned on and SW17 is turned off, voltage $V_{TMP}$ 2706 is coupled to V1 3130, and when SW9 804 is turned off and SW17 is turned on, voltage $V_{TMP}$ 2706 is coupled to V2 3132. Therefore, by shifting time instance 3302, the duty cycle D during which $V_{TMP}$ 2706 is at $4\times V_{OUT}$ can be controlled. For instance, when time instance 3302 is shifted to the right, the duty cycle D would increase proportionally; when the time instance 3302 is shifted to the left, the duty cycle D would decrease proportionally. One additional benefit of this configuration is that $V_{TMP}$ 2706 switches at twice the frequency of the switched-inductor and switched-capacitor regulators. This feature can enable the use of a smaller inductor 3302 without incurring additional switching loss.

Although the second stage regulator was illustrated using a reconfigurable Dickson Star regulator, other types of SC regulators can also be used for the second stage regulator in FIGS. 27-29, and 31. For example, the second stage regulator can include a ladder SC regulator, a reconfigurable ladder SC regulator, a series-to-parallel SC regulator, a reconfigurable series-to-parallel regulator, and/or any other types of SC regulators.

In some embodiments, the two-stage regulator can be used for various applications including power management integrated circuits (PMICs), battery chargers, LED drivers, envelope tracking power amplifiers.

In some embodiments, the capacitance of the switched capacitor regulator can be set to be proportional to an output current of the two-stage regulator. For example, the capacitance of the switched capacitor regulator can be in the range of 0.1 nF/mA and 100 nF/mA, depending on the target power efficiency. The two-stage regulator can improve its efficiency by using larger capacitance values.

In some embodiments, a two-stage regulator can be operated in a reverse direction to operate as a step-up regulator. For example, an input node of the two-stage regulator can be coupled to a target load (e.g., a chip) and an output node of the two-stage regulator can be coupled to an input voltage source (e.g., a battery).

In some embodiments, a two-stage regulator can be operated in a reverse direction to operate as a battery charger. For example, an input node of the two-stage regulator can be coupled to a power source (e.g., a power line of a Universal Serial Bus (USB)) and an output node of the two-stage regulator can be coupled to a battery.

Various embodiments of the disclosed two-stage regulator can be used as a battery charger in a battery-operated device. For example, an output node of a two-stage regulator can be coupled to a battery so that the output voltage and the output current of the two-stage regulator are used to charge the battery.

The two-stage regulator can be particularly useful in charging batteries in a handheld device. A handheld device, such as a smartphone, can use a Lithium-Ion (Li-Ion) battery that is configured to provide a voltage output within the range of approximately 2.8-4.3V, depending on whether the battery is charged or not (e.g., 4.3V when fully charged, 2.8V when fully discharged). The Li Ion battery in the handheld device can be charged using a Universal Serial Bus (USB). The current version of the USB power line uses 5V (and the future versions of the USB may use even higher voltages), which is higher than the voltage output of the Li Ion battery. Therefore, the voltage from the USB power line should be stepped down before it can be used to charge the Li Ion battery. To this end, the two-stage regulator can be configured to receive the power line voltage and current from the USB and provide a step-down version of the power line voltage and current to the Li-Ion battery so that the Li-Ion battery can be charged based on the voltage and current from the USB.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the two-stage regulator can operate in a step-up configuration to step-up the output voltage of the battery to that of the USB power line. This way, the battery in the first device can charge the battery in the second device over the USB power line.

Figure 34:
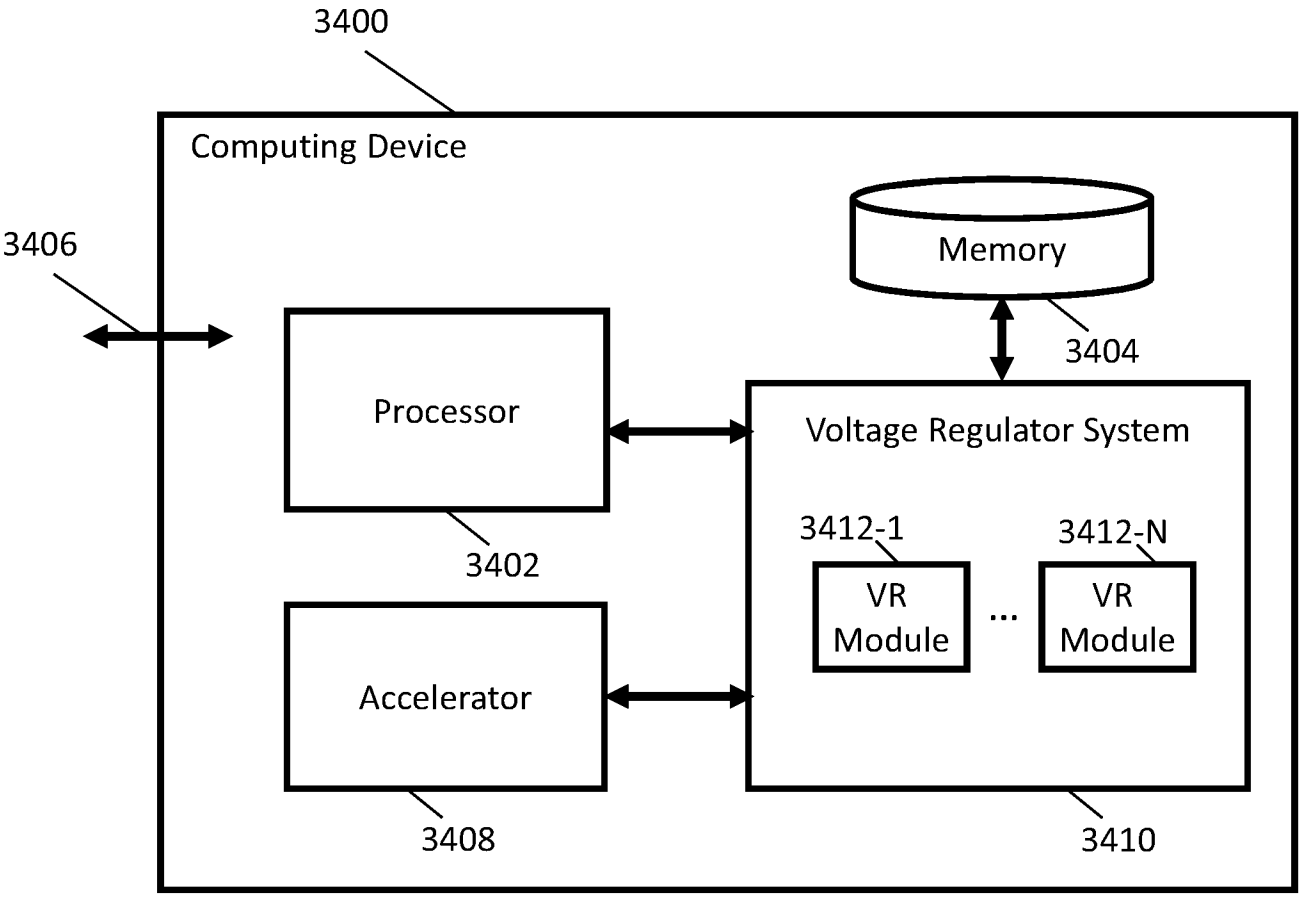
FIG. 34 is an example of a block diagram of a computing device that includes a voltage regulation system in accordance with some embodiments.

FIG. 34 is a block diagram of a computing device that includes a voltage regulation system in accordance with some embodiments. The computing device 3400 includes a processor 3402, memory 3404, one or more interfaces 3406, an accelerator 3408, and a voltage regulator system 3410. The computing device 3400 may include additional modules, fewer modules, or any other suitable combination of modules that perform any suitable operation or combination of operations.

In some embodiments, accelerator 3408 can be implemented in hardware using an application specific integrated circuit (ASIC). Accelerator 3408 can be a part of a system on chip (SOC). In other embodiments, accelerator 3408 can be implemented in hardware using a logic circuit, a programmable logic array (PLA), a digital signal processor (DSP), a field programmable gate array (FPGA), or any other integrated circuit. In some cases, accelerator 3408 can be packaged in the same package as other integrated circuits.

In some embodiments, voltage regulator system 3410 can be configured to provide a supply voltage to one or more of processor 3402, memory 3404, and/or an accelerator 3408. Voltage regulator system 3410 can include one or more voltage regulator (VR) modules 3412-1 . . . 3412-N. In some embodiments, one or more of VR modules 3412-1 . . . 3412-N can be a reconfigurable Dickson-Star SC regulator, for example, as disclosed in FIGS. 4, 10, and 16. In some embodiments, one or more of VR modules 3412-1 . . . 3412-N can be a two-stage regulator, for example, as disclosed in FIGS. 27-29, 31. One or more VR modules 3412-1 . . . 3412-N may operate in multiple interleaved phases.

In some embodiments, voltage regulator system 3410 can include a switch control module that is configured to control the switch configuration in one or more VR modules 3412-1 . . . 3412-N. For example, when the switch control module receives an instruction to operate a 3:1 reconfigurable Dickson Star SC regulator, as shown in FIGS. 5A-5C, in a 3:1 conversion mode, the switch control module can be configured to control switches 216, 218, 220, 222, 224, 226, and 228 and mode switch SW8 402 to operate the reconfigurable Dickson Star SC regulator in a 3:1 conversion mode. As another example, when the switch control module receives an instruction to operate the 3:1 reconfigurable Dickson Star SC regulator, as shown in FIGS. 6A-6C, in a 2:1 conversion mode, the switch control module can be configured to control switches 216, 218, 220, 222, 224, 226, and 228 and mode switch SW8 402 to operate the reconfigurable Dickson Star SC regulator in a 2:1 conversion mode. In some embodiments, the switch control module can be synthesized using hardware programming languages. The hardware programming languages can include Verilog, VHDL, Bluespec, or any other suitable hardware programming language. In other embodiments, the switch control module can be manually designed and can be manually laid-out on a chip.

Computing device 3400 can communicate with other computing devices (not shown) via interface 3406. Interface 3406 can be implemented in hardware to send and receive signals in a variety of mediums, such as optical, copper, and wireless, and in a number of different protocols, some of which may be non-transient.

In some embodiments, computing device 3400 can include user equipment. The user equipment can communicate with one or more radio access networks and with wired communication networks. The user equipment can be a cellular phone having telephonic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, Tizen, Android, or any other suitable operating system. The screen might be a touch screen that is used to input data to the mobile device, in which case the screen can be used instead of the full keyboard. The user equipment can also keep global positioning coordinates, profile information, or other location information. The user equipment can also be a wearable electronic device.

Computing device 3400 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. Computing device 3400 can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. Computing device 3400 can also provide a variety of user interfaces such as a keyboard, a touch screen, a trackball, a touch pad, and/or a mouse. Computing device 3400 may also include speakers and a display device in some embodiments. Computing device 3400 can also include a bio-medical electronic device.

Turning to FIGS. 36A-36C, a hybrid converter 3600 that merges a 2:1 SC regulator and an inductor in accordance with some embodiments is shown. As illustrated in FIG. 36A, converter 3600 can include an inductor 3602, capacitors 3604 and 3606, and switches 3608, 3610, 3612, 3614, and 3616. As also shown in FIG. 36A, a load 3618, illustrated as a current, can be coupled to the output of converter 3600.

Inductor 3602 can be any suitable inductor formed using any suitable technology and having any suitable size in some embodiments. For example, in some embodiments, inductor 3602 can be a discrete inductor formed from wound wire having a size of 2×1.2 mm in some embodiments.

Capacitors 3604 and 3606 can be any suitable capacitors formed using any suitable technology or technologies and having any suitable size or sizes in some embodiments. For example, in some embodiments, these capacitors (and all other capacitors described herein) can be on-chip capacitors such as metal-on-metal (MoM) capacitors, metal-insulator-metal (MiM) capacitors, MOSFET capacitors (capacitors using the gate oxide capacitance of MOSFET), discrete capacitors that are implemented on a chip or circuit board such as Multi-Layer Ceramic Capacitors (MLCC), Tantalum capacitors, aluminum electrolytic capacitors, or film capacitors, or any other suitable capacitors. As another example, capacitors 3604 and 3606 can have sizes of 2×1.2 mm and 1.6×1 mm, respectively, in some embodiments.

Switches 3608, 3610, 3612, 3614, and 3616 can be any suitable switches formed using any suitable technology in some embodiments. For example, in some embodiments, the switches can be formed from transistors, such as MOSFET transistors. More particularly, for example, some of the switches can be implemented using a P-channel MOSFET transistors, and other of the switches can be implemented using an N-channel MOSFET transistors, in some embodiments. In some embodiments, the transistors can be sized to maximize efficiency. For example, larger transistors add switching loss, while smaller transistors add conduction loss. Thus, the sizes can be selected maximize efficiency given a specific application in some embodiments.

Load 3618 can be any suitable load. For example, in some embodiments, load 3618 can a battery for a mobile device.

Converter 3600 has two operating "modes": a 2:1 switched capacitor (SC) mode which using 2:1 SC part 3620; and a hybrid 2:1 (H21) mode that uses inductor 3602 and switch 3610 in conjunction with the 2:1 SC part. This converter can achieve very high efficiencies in the 2:1 SC mode (in which the input voltage ($V_{IN}$) and the output voltage ($V_{OUT}$) of the converter maintain a 2:1 ratio) by adjusting the output of a wall adapter (or other power supply) that is providing the input voltage ($V_{IN}$) using a controller and a connection to the adapter (or other power supply) (not shown). However, there are legacy wall adapters (and other power supplies) that cannot adjust their output voltage continuously to maintain a 2:1 ratio. For example, many wall adapters have a fixed 5V output. Since the output of converter 3600 may be directly connected to a battery, which can have a voltage of 3V to 4.5V, the input to output voltage ratio of the converter, when connected to a 5V $V_{IN}$, can be 5:3 (or ~1.66:1) to 5:4.5 (or ~1.11:1), rather than the desired 2:1. To address a mismatch, the converter can operate in H21 mode, which can support any ratio between 1:1 and 2:1 in some embodiments.

Using a 2:1 SC mode and a H21 mode, the hybrid converter can maintain a high efficiency in 2:1 SC mode (similar to a stand-alone 2:1 SC charger) when an adapter connected to $V_{IN}$ can continuously adjust its output voltage to maintain a ~2:1 $V_{IN}$ to $V_{OUT}$ ratio, and can achieve higher efficiencies than a buck charger when a ~2:1 $V_{IN}$ to $V_{OUT}$ ratio cannot be maintained by going into the H21 mode. When compared to using a 2:1 SC charger and an independent buck charger in parallel, the hybrid converter also reduces solution size and cost by re-using several switches in 2:1 SC mode and H21 mode.

FIGS. 36A and 36B illustrate hybrid converter 3600 when in the H21 mode and in State0 and in State1, respectively. FIG. 36C illustrates how $V_X$ 102 changes as the converter changes between State0 and State1. By adjusting the duty cycle (how much time is spent in State0 vs State1), the hybrid converter can adjust the input voltage to output voltage ratio. The following equation sets the duty cycle (D) of the regulator based on the required input and output voltages:

$D=T_0/(T_0+T_1)$ (Average of $V_X$ 102)=$V_{IN}$ (this is because the average voltage on two nodes of the inductor,$V_{IN}$ and $V_X$, need to be equal in steady state)

(Average of $V_X$ 102)=$2*V_{OUT}*D+V_{OUT}*(1-D)$ (based on FIG. 36B)

$\rightarrow 2*V_{OUT}*D+V_{OUT}*(1-D)=V_{IN}$ $\rightarrow V_{OUT}*D+V_{OUT}=V_{IN}$ $\rightarrow V_{OUT}(1+D)=V_{IN}$ $\rightarrow D=V_{IN}/V_{OUT}-1$ FIGS. 37A-37C illustrate hybrid converter 3600 when in the 2:1 SC mode and in State0 (FIG. 37A) and State1 (FIG. 37B). As shown in these figures, because switch 3610 is open in both State0 and State1 when in the 2:1 SC mode, the inductor is not used.

When hybrid converter 3600 is operating in the H21 mode (as shown in FIGS. 36A-36C), the duty cycle of both the SC part of the hybrid regulator and the inductor part of the regulator need to be equal. The problem with this setup is that the SC part may be most efficient at, for example, a 50% duty cycle, but it might be forced to operate at, for example, 10% duty cycle due to the required input voltage to output voltage ratio.

To overcome this, in some embodiments, the duty cycle of SC part and the inductor can be made independent using a 2-phase hybrid converter 3800 as illustrated in FIGS. 38A-38B and 39A-39E. For example, in some embodiments, the inductor duty cycle can be set according to the required input and output voltage values (following the equations above), while the SC part duty cycle can be set to achieve maximum efficiency (which is often 50% duty cycle).

Similar components of converter 3800 of FIGS. 38A-38B and 39A-39E can be the same as the similar component described in connection with FIGS. 36A-36B above in some embodiments.

Figure 38B:
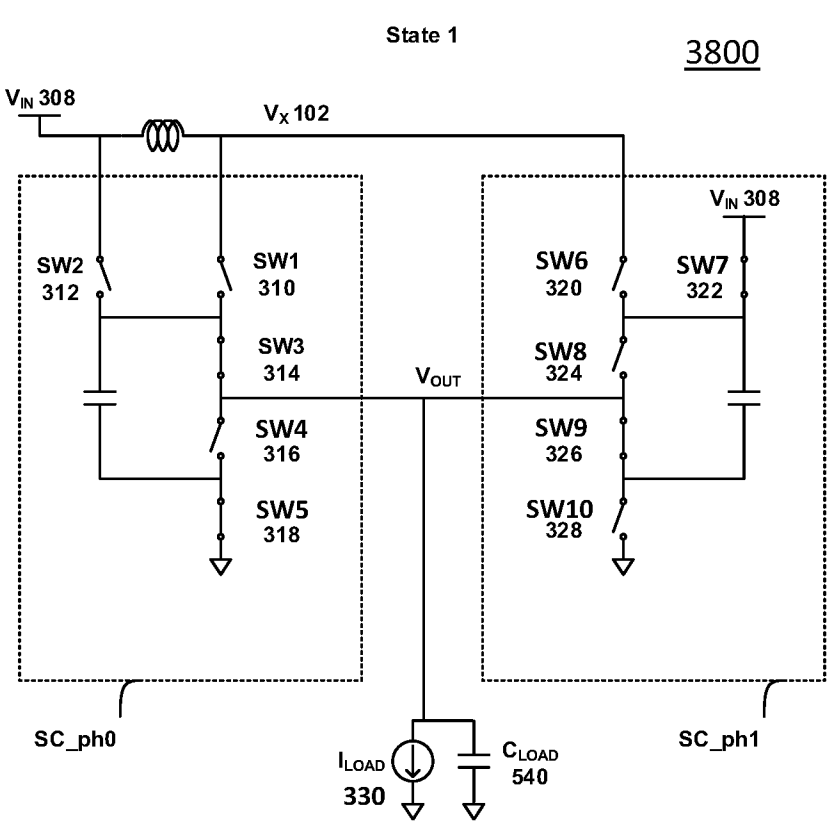
FIGS. 38A-38B illustrate an example of a multi-phase hybrid converter (including an inductor and a 2:1 switch capacitor regulator) and its operation, when in a 2:1 SC mode, in accordance with some embodiments.
Figure 38A:
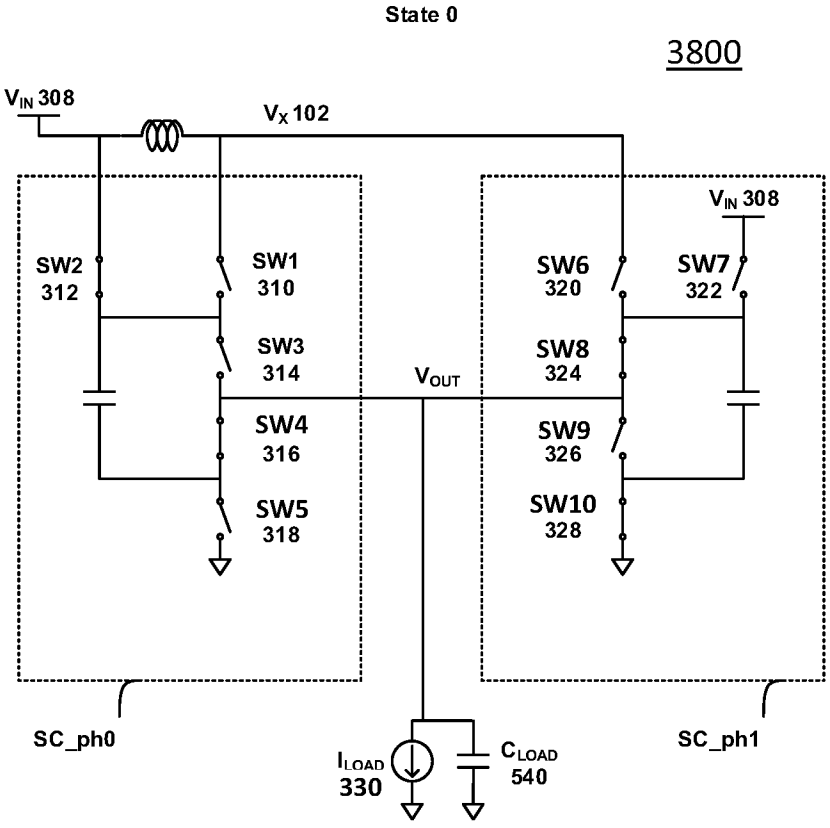
Figure 39B:
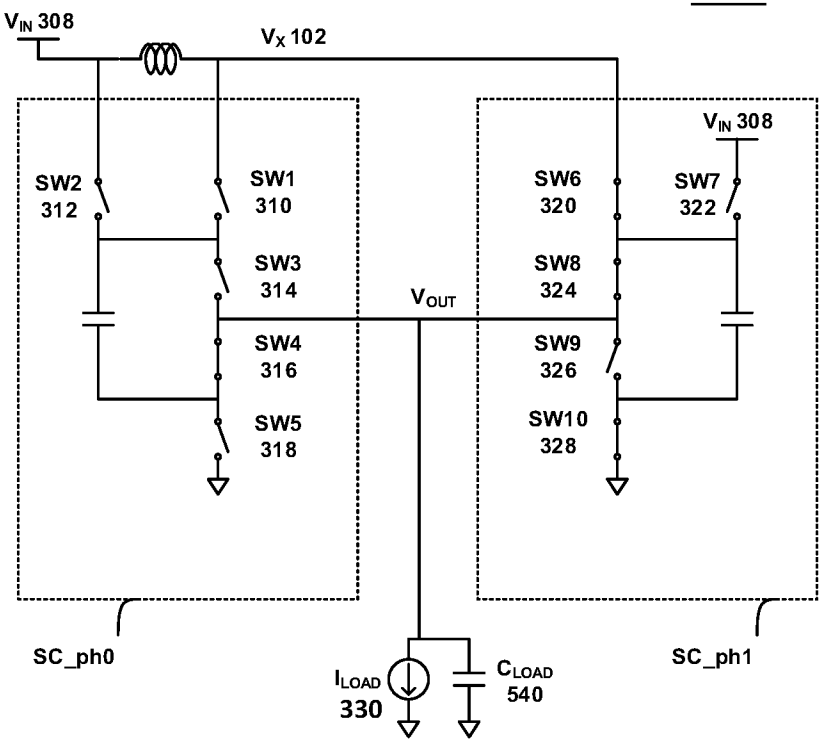
Figure 39A:
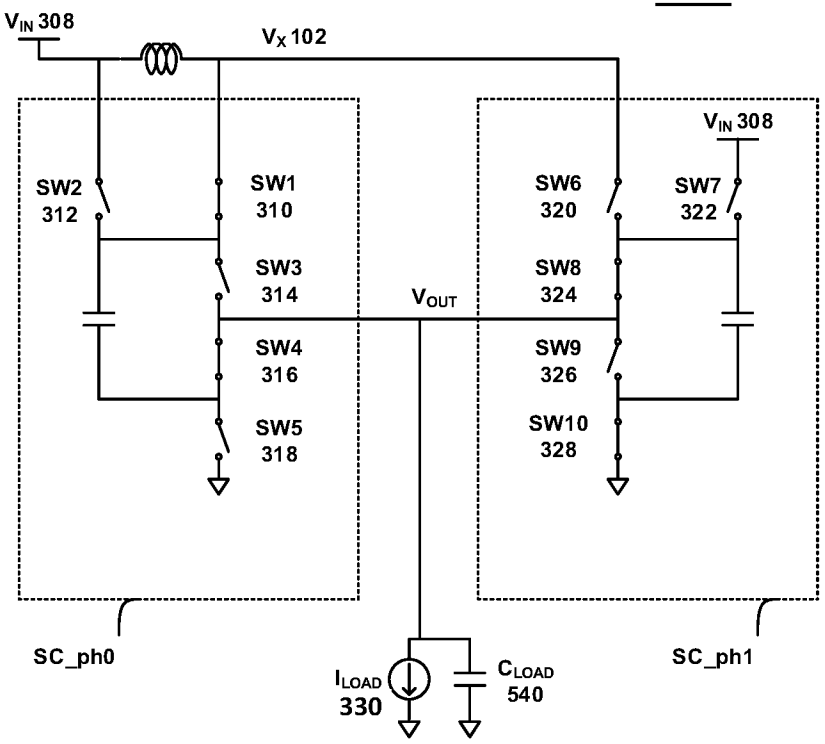

FIGS. 38A-38B illustrate 2-phase hybrid converter 3800 when configured to operate in a 2:1 SC mode. As shown, in this mode, the inductor is not used because switches 310 and 320 are open in: State0, SC_ph0; State0, SC_ph1; State1, SC_ph0; and State1, SC_ph1. Thus, in this mode converter 3800 operates as a 2-phase 2:1 SC regulator. That is, the switches are opened and closed in the four state and phase combinations shown in FIGS. 38A-38B. The states can have any suitable duty cycle, such as 50%, in some embodiments. The switches in the phase1 portion of converter 3800 can switch at any suitable point with respect to the switches in the phase 0 portion of converter 3800 in some embodiments. For example, the switches in the phase 1 portion of converter 3800 can switch 180 degrees out of phase from the switches in the phase 0 portion of converter 3800 in some embodiments.

FIGS. 39A-39E illustrate hybrid converter 3800 when configured to operate in the H21 mode. In FIGS. 39A-39D, switches SW1 310 and SW6 320 are inductor switches, while switches SW2 312, SW3 314, SW4 316, SW5 318, SW7 322, SW8 324, SW9 326, and SW10 328 are SC switches. During operation of converter 3800 in the H21 mode, both the inductor switches and the SC switches have two different states and they iterate between those two states. The two states of the inductor switches are referred to herein as L_state0 and L_state1, and the two states of the SC switches are referred to herein as SC_state0 and SC_state1. For example, the following can be the switch configuration of each of these four states:

| | |
|---|---|
| SW1 on,SW6 off | L_state0: |
| SW1 off,SW6 on | L_state1: |
| (SW4,SW8,SW10)on,(SW3,SW5,SW9)off | SC_state0: |
| (SW4,SW8,SW10)off,(SW3,SW5,SW9)on | SC_state1: |

SW2 and SW7 are always off. How much time is spent in L_state0 versus L_state1 determines the inductor duty cycle. How much is spent in SC_state0 versus SC_state1 determines the SC duty cycle. In some embodiments, the inductor switches can iterate between L_state0 and L_state1 at one duty cycle and the SC switches can iterate between SC_state0 and SC_state1 at a different duty cycle.

FIG. 39E shows a timing diagram in accordance with which hybrid converter 3800 can iterate between State0-3 in some embodiments. Each of these states operates as follows:

| | |
|---|---|
| L_state0,SC_state0 | State 0: |
| L_state1,SC_state0 | State 1: |
| L_state1,SC_state1 | State 2: |
| L_state0,SC_state1 | State 3: |

In this particular example as shown in FIG. 39E, the duty cycle of the SC part is fixed at 50%, but this can any suitable value, and the duty cycle of inductor switches is D. The inductor switches can adjust D independently of the duty cycle of the SC part by adjusting the time spent in each State 0-3. If the efficiency of the SC part is maximized at a 50% duty cycle, the SC duty cycle can be fixed at 50%, while the inductor duty cycle D can be adjusted to support various input to output voltage ratios.

In some cases, certain switches can be removed to reduce area allocated for transistors in exchange for limited operating modes. For example, switch 3608 in FIG. 36A and SW2 312 and SW7 322 in FIGS. 39A-D can be removed if it is fine for the converter to only work in H21 and disable 2:1 SC mode.

The switches in FIGS. 36A, 36B, 37A, 37B, 38A, 38B, and 39A-39D can be controlled by any suitable controller. For example, when these switches are implemented as MOSFET, these switches can be controlled by a controller applying a suitable voltage to the gates of the MOSFETs so that an opened or closed connection is provided between the sources and the drains of the MOSFETs. The controller can be any suitable device or circuit. For example, the controller can be a hardware processor that executes software loaded into the hardware processor from memory. As another example, the controller can be dedicated logic circuits, a field programmable gate array, and/or any other suitable device or circuit for providing suitable control signals.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, apparatuses, systems, and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A circuit, comprising:

an inductor having a first side and a second side, wherein the first side is connected to an input voltage;

a first switch having a first side and a second side, wherein the first side is connected to the second side of the inductor;

a second switch having a first side and a second side, wherein the first side is connected to the input voltage;

a first capacitor having a first side and a second side, wherein the first side is connected to the second side of the second switch;

a third switch having a first side and a second side, wherein the first side is connected to the second side of the first switch;

a fourth switch having a first side and a second side, wherein the first side is connected to the second side of the third switch;

a fifth switch having a first side and a second side, wherein the first side is connected to the second side of the first capacitor and to the second side of the fourth switch, and wherein the second side is coupled to a voltage source; and a second capacitor having a first side and a second side, wherein the first side is connected to the first side of the fourth switch, and wherein the second side is connected to the second side of the fifth switch.

2. The circuit of claim 1, wherein at least one of the first switch, the second switch, the third switch, the fourth switch, and the fifth switch is a transistor.

3. The circuit of claim 2, wherein at least one of the first switch, the second switch, the third switch, the fourth switch, and the fifth switch is a MOSFET.

4. The circuit of claim 2, wherein the at least one of the first switch, the second switch, the third switch, the fourth switch, and the fifth switch is controlled by a controller.

5. The circuit of claim 1, *further comprising a controller,* wherein:

when the circuit is in a first state, *the controller causes*:

the first switch [is] *to be* closed;

the second switch [is] *to be* open;

the third switch [is] *to be* open;

the fourth switch [is] *to be* closed; and the fifth switch [is] *to be* open; and when the circuit is in a second state, *the controller causes*:

the first switch [is] *to be* closed;

the second switch [is] *to be* open;

the third switch [is] *to be* closed;

the fourth switch [is] *to be* open; and the fifth switch [is] *to be* closed.

6. The circuit of claim 5, wherein:

when the circuit is in a third state, *the controller causes*:

the first switch [is] *to be* open;

the second switch [is] *to be* closed;

the third switch [is] *to be* open;

the fourth switch [is] *to be* closed; and the fifth switch [is] *to be* open; and when the circuit is in a fourth state, *the controller causes*:

the first switch [is] *to be* open;

the second switch [is] *to be* open;

the third switch [is] *to be* closed;

the fourth switch [is] *to be* open; and the fifth switch [is] *to be* closed.

7. The circuit of claim 1, further comprising:

a sixth switch having a first side and a second side, wherein the first side is connected to the second side of the inductor;

a seventh switch having a first side and a second side, wherein the first side is connected to the input voltage;

a third capacitor having a first side and a second side, wherein the first side is connected to the second side of the seventh switch;

[a] *an* eighth switch having a first side and a second side, wherein the first side is connected to the second side of the sixth switch;

a ninth switch having a first side and a second side, wherein the first side is connected to the second side of the eighth switch; and a tenth switch having a first side and a second side, wherein the first side is connected to the second side of the third capacitor and to the second side of the ninth *switch*, and wherein the second side is coupled to the voltage source.

8. The circuit of claim 7, wherein:

when the circuit is in a first state, *the controller causes*:

the first switch [is] *to be* open;

the second switch [is] *to be* closed;

the third switch [is] *to be* open;

the fourth switch [is] *to be* closed;

the fifth switch [is] *to be* open;

the sixth switch [is] *to be* open;

the seventh switch [is] *to be* open;

the eighth switch [is] *to be* closed;

the ninth switch [is] *to be* open; and the tenth switch [is] *to be* closed; and when the circuit is in a second state, *the controller causes*:

the first switch [is] *to be* open;

the second switch [is] *to be* open;

the third switch [is] *to be* closed;

the fourth switch [is] *to be* open;

the fifth switch [is] *to be* closed;

the sixth switch [is] *to be* open;

the seventh switch [is] *to be* closed;

the eighth switch [is] *to be* open;

the ninth switch [is] *to be* closed; and the tenth switch [is] *to be* open.

9. The circuit of claim 8, wherein:

when the circuit is in a third state, *the controller causes*:

the first switch [is] *to be* closed;

the second switch [is] *to be* open;

the third switch [is] *to be* open;

the fourth switch [is] *to be* closed;

the fifth switch [is] *to be* open;

the sixth switch [is] *to be* open;

the seventh switch [is] *to be* open;

the eighth switch [is] *to be* closed;

the ninth switch [is] *to be* open; and the tenth switch [is] *to be* closed;

when the circuit is in a fourth state, *the controller causes*:

the first switch [is] *to be* open;

the second switch [is] *to be* open;
the third switch [is] *to be* open;
the fourth switch [is] *to be* closed;
the fifth switch [is] *to be* open;
the sixth switch [is] *to be* closed;
the seventh switch [is] *to be* open;
the eighth switch [is] *to be* closed;
the ninth switch [is] *to be* open; and
the tenth switch [is] *to be* closed;

when the circuit is in a fifth state, *the controller causes*:
the first switch [is] *to be* open;
the second switch [is] *to be* open;
the third switch [is] *to be* closed;
the fourth switch [is] *to be* open;
the fifth switch [is] *to be* closed;
the sixth switch [is] *to be* closed;
the seventh switch [is] *to be* open;
the eighth switch [is] *to be* open;
the ninth switch [is] *to be* closed; and
the tenth switch [is] *to be* open; and when the circuit is in a sixth state, *the controller causes*:
the first switch [is] *to be* closed;
the second switch [is] *to be* open;
the third switch [is] *to be* closed;
the fourth switch [is] *to be* open;
the fifth switch [is] *to be* closed;
the sixth switch [is] *to be* open;
the seventh switch [is] *to be* open;
the eighth switch [is] *to be* open;
the ninth switch [is] *to be* closed; and
the tenth switch [is] *to be* open.

*10. The circuit of claim 1, wherein the second side of the second switch is connected to the second side of the first switch.*

*11. The circuit of claim 7, wherein the second side of the seventh switch is connected to the second side of the sixth switch.*

*12. The circuit of claim 1, wherein the first capacitor is implemented on-chip.*

*13. The circuit of claim 12, wherein the first capacitor is one of:*
*a metal-on-metal (MoM) on-chip capacitor;*
*a metal-insulator-metal (MiM) on-chip capacitor; and*
*a MOSFET on-chip capacitor.*

*14. The circuit of claim 1, wherein the first capacitor is implemented on a circuit board.*

*15. The circuit of claim 14, wherein the first capacitor is one of:*
*a multi-layer ceramic capacitor;*
*a tantalum capacitor;*
*an aluminum electrolytic capacitor; and*
*a film capacitor.*

*16. The circuit of claim 1, wherein the inductor is a discrete inductor.*

*17. A circuit, comprising:*
*an inductor having a first side and a second side, wherein the first side is connected to an input voltage node;*
*a first switch having a first side and a second side, wherein the first side of the first switch is connected to the second side of the inductor;*
*a second switch having a first side and a second side, wherein the first side of the second switch is connected to the first side of the inductor, and wherein the second side of the second switch is connected to the second side of the first switch;*
*a first capacitor having a first side and a second side, wherein the first side of the first capacitor is connected to the second side of the second switch;*
*a third switch having a first side and a second side, wherein the first side of the third switch is connected to the second side of the first switch;*
*a fourth switch having a first side and a second side, wherein the first side of the fourth switch is connected to the second side of the third switch;*
*a fifth switch having a first side and a second side, wherein the first side of the fifth switch is connected to the second side of the first capacitor and to the second side of the fourth switch, and wherein the second side is coupled to a voltage source node; and*
*a second capacitor having a first side and a second side, wherein the first side is connected to the first side of the fourth switch, and wherein the second side is connected to the second side of the fifth switch.*

*18. The circuit of claim 17, wherein the inductor is a discrete inductor.*

*19. The circuit of claim 17, wherein at least one of the first switch, the second switch, the third switch, the fourth switch, and the fifth switch is a transistor.*

*20. The circuit of claim 19, wherein at least one of the first switch, the second switch, the third switch, the fourth switch, and the fifth switch is a MOSFET.*

*21. The circuit of claim 19, wherein the at least one of the first switch, the second switch, the third switch, the fourth switch, and the fifth switch is controlled by a controller.*

*22. The circuit of claim 17, further comprising a controller, wherein:*
*when the circuit is powered and in a first state, the controller causes:*
*the first switch to be closed;*
*the second switch to be open;*
*the third switch to be open;*
*the fourth switch to be closed; and*
*the fifth switch to be open; and*
*when the circuit is powered and is in a second state, the controller causes:*
*the first switch to be closed;*
*the second switch to be open;*
*the third switch to be closed;*
*the fourth switch to be open; and*
*the fifth switch to be closed.*

*23. The circuit of claim 22, wherein:*
*when the circuit is powered and is in a third state, the controller causes:*
*the first switch to be open;*
*the second switch to be closed;*
*the third switch to be open;*
*the fourth switch to be closed; and*
*the fifth switch to be open; and*
*when the circuit is powered and is in a fourth state, the controller causes:*
*the first switch to be open;*
*the second switch to be open;*
*the third switch to be closed;*
*the fourth switch to be open; and*
*the fifth switch to be closed.*

*24. The circuit of claim 17, the circuit further comprising:*
*a third capacitor having a first side and a second side;*
*a sixth switch having a first side and a second side, wherein the first side of the sixth switch is connected to the first side of the first switch;*
*a seventh switch having a first side and a second side, wherein the first side of the seventh switch is connected*

*to the input voltage node, wherein the second side of the seventh switch is connected to the second side of the sixth switch, and wherein the second side of the seventh switch is connected to first side of the third capacitor;*

*an eighth switch having a first side and a second side, wherein the first side of the eighth switch is connected to the second side of the sixth switch;*

*a ninth switch having a first side and a second side, wherein the first side of the ninth switch is connected to the second side of the eighth switch; and*

*a tenth switch having a first side and a second side, wherein the first side of the tenth switch is connected to the second side of the ninth switch, and wherein the first side of the tenth switch is connected to the second side of the third capacitor.*

*25. The circuit of claim 24, wherein the second side of the tenth switch is connected to the voltage source node.*

*26. The circuit of claim 24, wherein:*

*when the circuit is powered and is in a first state, the controller causes:*
*the first switch to be open;*
*the second switch to be closed;*
*the third switch to be open;*
*the fourth switch to be closed;*
*the fifth switch to be open;*
*the sixth switch to be open;*
*the seventh switch to be open;*
*the eighth switch to be closed;*
*the ninth switch to be open; and*
*the tenth switch to be closed; and*

*when the circuit is powered and is in a second state, the controller causes:*
*the first switch to be open;*
*the second switch to be open;*
*the third switch to be closed;*
*the fourth switch to be open;*
*the fifth switch to be closed;*
*the sixth switch to be open;*
*the seventh switch to be closed;*
*the eighth switch to be open;*
*the ninth switch to be closed; and*
*the tenth switch to be open.*

*27. The circuit of claim 26, wherein:*

*when the circuit is powered and is in a third state, the controller causes:*
*the first switch to be closed;*
*the second switch to be open;*
*the third switch to be open;*
*the fourth switch to be closed;*
*the fifth switch to be open;*
*the sixth switch to be open;*
*the seventh switch to be open;*
*the eighth switch to be closed;*
*the ninth switch to be open; and*
*the tenth switch to be closed;*

*when the circuit is powered and is in a fourth state, the controller causes:*
*the first switch to be open;*
*the second switch to be open;*
*the third switch to be open;*
*the fourth switch to be closed;*
*the fifth switch to be open;*
*the sixth switch to be closed;*
*the seventh switch to be open;*
*the eighth switch to be closed;*
*the ninth switch to be open; and*
*the tenth switch to be closed;*

*when the circuit is powered and is in a fifth state, the controller causes:*
*the first switch to be open;*
*the second switch to be open;*
*the third switch to be closed;*
*the fourth switch to be open;*
*the fifth switch to be closed;*
*the sixth switch to be closed;*
*the seventh switch to be open;*
*the eighth switch to be open;*
*the ninth switch to be closed; and*
*the tenth switch to be open; and*

*when the circuit is powered and is in a sixth state, the controller causes:*
*the first switch to be closed;*
*the second switch to be open;*
*the third switch to be closed;*
*the fourth switch to be open;*
*the fifth switch to be closed;*
*the sixth switch to be open;*
*the seventh switch to be open;*
*the eighth switch to be open;*
*the ninth switch to be closed; and*
*the tenth switch to be open.*

*28. The circuit of claim 17, wherein the first capacitor is implemented on-chip.*

*29. The circuit of claim 28, wherein the first capacitor is one of:*

*a metal-on-metal (MoM) on-chip capacitor;*
*a metal-insulator-metal (MiM) on-chip capacitor; and*
*a MOSFET on-chip capacitor.*

*30. The circuit of claim 17, wherein the first capacitor is implemented on a circuit board.*

*31. The circuit of claim 30, wherein the first capacitor is one of:*

*a multi-layer ceramic capacitor;*
*a tantalum capacitor;*
*an aluminum electrolytic capacitor; and*
*a film capacitor.*

* * * * *